US010069644B2

(12) United States Patent
Ichijo et al.

(10) Patent No.: US 10,069,644 B2
(45) Date of Patent: Sep. 4, 2018

(54) METHOD AND PROGRAM FOR CONTROLLING PORTABLE INFORMATION TERMINAL

(71) Applicant: Panasonic Intellectual Property Corporation of America, Torrance, CA (US)

(72) Inventors: Ayaka Ichijo, Osaka (JP); Motoji Ohmori, Osaka (JP); Yuichi Futa, Ishikawa (JP); Yuji Unagami, Osaka (JP); Natsume Matsuzaki, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 166 days.

(21) Appl. No.: 14/896,723

(22) PCT Filed: Jun. 27, 2014

(86) PCT No.: PCT/JP2014/003434
§ 371 (c)(1),
(2) Date: Dec. 8, 2015

(87) PCT Pub. No.: WO2014/208099
PCT Pub. Date: Dec. 31, 2014

(65) Prior Publication Data
US 2016/0156482 A1 Jun. 2, 2016

(30) Foreign Application Priority Data

Jun. 28, 2013 (JP) .................................. 2013-135842

(51) Int. Cl.
*H04L 12/28* (2006.01)
*H04Q 9/00* (2006.01)
(Continued)

(52) U.S. Cl.
CPC .......... *H04L 12/2816* (2013.01); *G08C 17/02* (2013.01); *H04L 12/2803* (2013.01);
(Continued)

(58) Field of Classification Search
CPC ............. H04L 12/2816; H04L 12/2818; H04L 12/2803
See application file for complete search history.

(56) References Cited

U.S. PATENT DOCUMENTS

2004/0088364 A1* 5/2004 Yamadaji ............ H04L 12/2803
709/208
2004/0177072 A1* 9/2004 Salminen ............ G07C 9/00111
(Continued)

FOREIGN PATENT DOCUMENTS

JP 2002-267487 9/2002
JP 2003-74942 3/2003
(Continued)

*Primary Examiner* — Jeong S Park
(74) *Attorney, Agent, or Firm* — Wenderoth, Lind & Ponack, L.L.P.

(57) ABSTRACT

Address information of a mail to be transmitted by a mail communication function is extracted from the mail to be transmitted; a transmission time of the mail to be transmitted is extracted from a portable information terminal; and judgment is made as to whether the address information matches predetermined address information and whether the transmission time belongs to a predetermined time zone. When the address information matches the predetermined address information, and the address information belongs to the predetermined time zone, an activation time at which a household appliance is to be activated is determined on the basis of the transmission time, and a control command for activating the household appliance at the activation time is transmitted to a network.

19 Claims, 49 Drawing Sheets

(51) Int. Cl.
*G08C 17/02* (2006.01)
*H04L 12/58* (2006.01)
*H04L 12/64* (2006.01)

(52) U.S. Cl.
CPC ...... *H04L 12/2818* (2013.01); *H04L 12/6418* (2013.01); *H04L 51/18* (2013.01); *H04L 51/28* (2013.01); *H04Q 9/00* (2013.01)

(56) References Cited

U.S. PATENT DOCUMENTS

| | | | | |
|---|---|---|---|---|
| 2006/0237550 | A1* | 10/2006 | Yasutani | F24D 19/1051 236/12.12 |
| 2011/0046751 | A1* | 2/2011 | Lee | G05B 15/02 700/19 |
| 2013/0041951 | A1* | 2/2013 | Lee | G05B 15/02 709/204 |
| 2013/0060360 | A1* | 3/2013 | Yamamoto | H04L 12/2814 700/90 |
| 2015/0136379 | A1* | 5/2015 | Takeda | F24D 19/1084 165/237 |

FOREIGN PATENT DOCUMENTS

| | | |
|---|---|---|
| JP | 2003-102077 | 4/2003 |
| JP | 2005-244373 | 9/2005 |

\* cited by examiner

| DEVICE NAME | OPERATION STATE (ON/OFF/COMPLETE) |
|---|---|
| FIRST AIR CONDITIONER | ON |
| SECOND AIR CONDITIONER | OFF |
| ... | |
| WATER HEATER | COMPLETE |
| RICE COOKER | OFF |
| ... | |

F400

HEADER:DATE
{DEVICE; MAIL TRANSMITTED/ON/OFF/COMPLETE; TIME}

2013.2.21(THURS)
...
{PORTABLE TERMINAL;        MAIL TRANSMITTED;  18:10}
{WATER HEATER(FILL HOT WATER);  ON;           18:35}
{RICE COOKER;              ON;                18:45}
{WATER HEATER(FILL HOT WATER);  COMPLETE;     18:55}
{ILLUMINATION DEVICE 2;    ON;                19:00}
{RICE COOKER;              COMPLETE;          19:30}
...

| {TARGET DEVICE TO BE CONTROLLED;COMPLETE COMPLETE REQUIRED TIME PERIOD;CONTROL START TIME PERIOD} |
|---|
| {WATER HEATER(FILL HOT WATER);   20MIN;    20MIN LATER} |
| {RICE COOKER;                    45MIN;    30MIN LATER} |
| ... |

| PREDETERMINED TIME ZONE | PREDETERMINED ADDRESSEE |
|---|---|
| 18:00—20:00 | tsuma@carrier.co.jp | ADDRESS OF WIFE B |
| | musume@carrier.co.jp | ADDRESS OF DAUGHTER C |

HOUSEHOLD APPLIANCE NAME
OPERATION STATE(ON/OFF/COMPLETE)
CURRENT STATE(CURRENT WATER LEVEL/CURRENT TEMPERATURE)
SET STATE   (SET WATER LEVEL/SET TEMPERATURE)
------------------------------------------------------------
WATER HEATER
ON
100L    30°C
160L    39°C

HOUSEHOLD APPLIANCE NAME
OPERATION STATE(ON/OFF/COMPLETE)
CURRENT STATE(CURRENT TEMPERATURE)
SETTING STATE OF WARMING(TEMPERATURE/AIR VOLUME/WIND DIRECTION)
SETTING STATE OF COOLING(TEMPERATURE/AIR VOLUME/WIND DIRECTION)
------------------------------------------------------------
FIRST AIR CONDITIONER
ON
8°C
■WARMING 20°C STRONG AUTOMATIC WIND DIRECTION
☐COOLING 27°C WEAK AUTOMATIC WIND DIRECTION
...

FIG. 15

GENERAL EXAMPLE 1500

| DEVICE NAME | TYPE OF NOTIFICATION | TIME |
|---|---|---|

WHEN MAIL IS TRANSMITTED 1500

| PORTABLE TERMINAL | MAIL TRANSMITTED | 18:10 |
|---|---|---|

FIG. 17A

HOME RETURNING TIME
AROUND 19:00 WHEN HOME RETURNING TIME IS EARLY
AROUND 21:00 WHEN HOME RETURNING TIME IS LATE

·SEND MAIL TO WIFE OR DAUGHTER
WHEN TRANSFERRING AT STATION S
·30 MINUTES FROM STATION S TO STATION T
NEAREST TO HOME BY TRAIN,
AND THEN 15 MINUTES WALKING TO HOME

FIG. 17B

DAY WHEN HOME RETURNING TIME IS EARLY

========= (AFTER LEAVING OFFICE) ==========

| | |
|---|---|
| 18:10 | SEND MAIL TO WIFE AT STATION S |
| 18:35 | WIFE TURNS ON WATER HEATER, AND FILLS HOT WATER IN BATHTUB |
| 18:45 | WIFE STARS COOKING RICE USING RICE COOKER |
| 18:55 | A RETURNS HOME |
| 19:00 | A TAKES BATH |
| 19:30 | A FINISHES BATH RICE IS COOKED |
| 19:35 | TAKE SUPPER |

FIG. 20

WHEN WATER HEATER IS TURNED ON

1500

| WATER HEATER | ON | 18:35 |
|---|---|---|

WHEN RICE COOKER IS TURNED ON

1500

| RICE COOKER | ON | 18:45 |
|---|---|---|

FIG. 25A

GENERAL EXAMPLE

2500

| DEVICE NAME | TYPE OF NOTIFICATION | CONTROL START TIME PERIOD (MINUTES AFTER) | SET TEMPERATURE | HOUSEHOLD APPLIANCE TO BE TURNED ON |
|---|---|---|---|---|

WHEN HEATER WATER IS TURNED ON 25 MINUTES LATER

2500

| PORTABLE TERMINAL | ON TIMER NOTIFICATION | 25 | 39°C | WATER HEATER |
|---|---|---|---|---|

| PORTABLE TERMINAL | ON TIMER NOTIFICATION | CONTROL START TIME PERIOD | SET TEMPERATURE | AIR CONDITIONER |

2500

| PORTABLE TERMINAL | ON TIMER NOTIFICATION | CONTROL START TIME PERIOD | SET TEMPERATURE | RICE COOKER |

2500

| PORTABLE TERMINAL | ON TIMER NOTIFICATION | CONTROL START TIME PERIOD | SET TEMPERATURE | MICROWAVE OVEN |

2500

| PORTABLE TERMINAL | ON TIMER NOTIFICATION | CONTROL START TIME PERIOD | SET TEMPERATURE | STEAM COOKER |

FIG. 26

GENERAL EXAMPLE

2600

| HOUSEHOLD APPLIANCE NAME | TYPE OF NOTIFICATION |
|---|---|
|  |  |

WHEN WATER HEATER IS TURNED ON

2600

| WATER HEATER | ON CONTROL COMPLETE |
|---|---|
|  |  |

{TARGET DEVICE TO BE CONTROLLED;COMPLETE
 COMPLETE REQUIRED TIME PERIOD}
--------------------------------------------------------------
-

{WATER HEATER(FILL HOT WATER);   20MIN}
{RICE COOKER;                    45MIN}
...

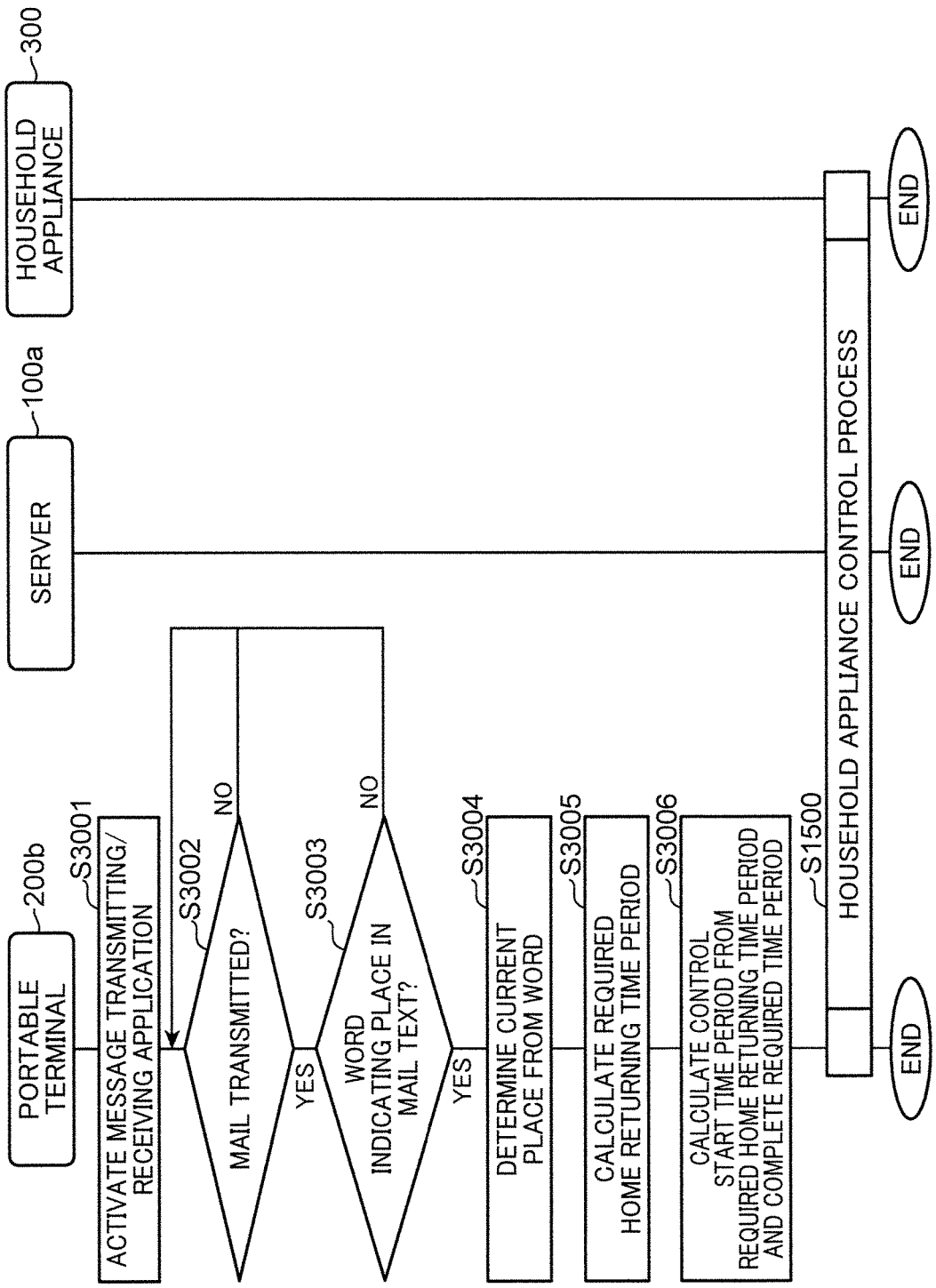

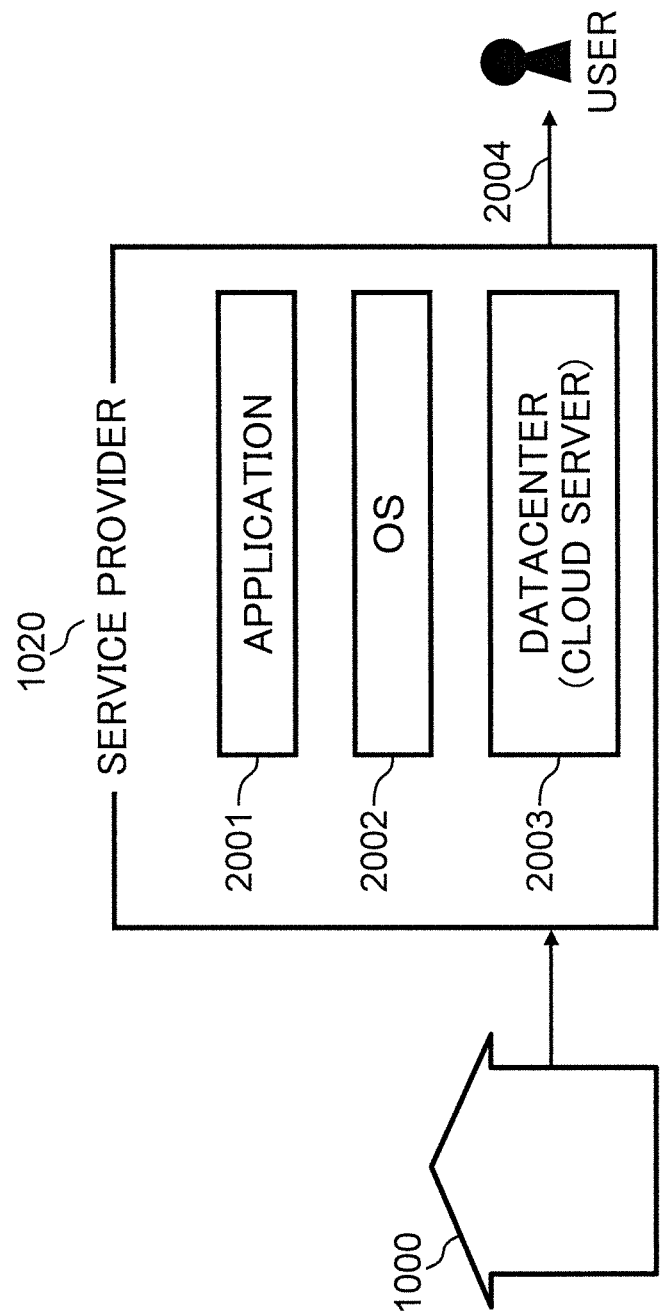

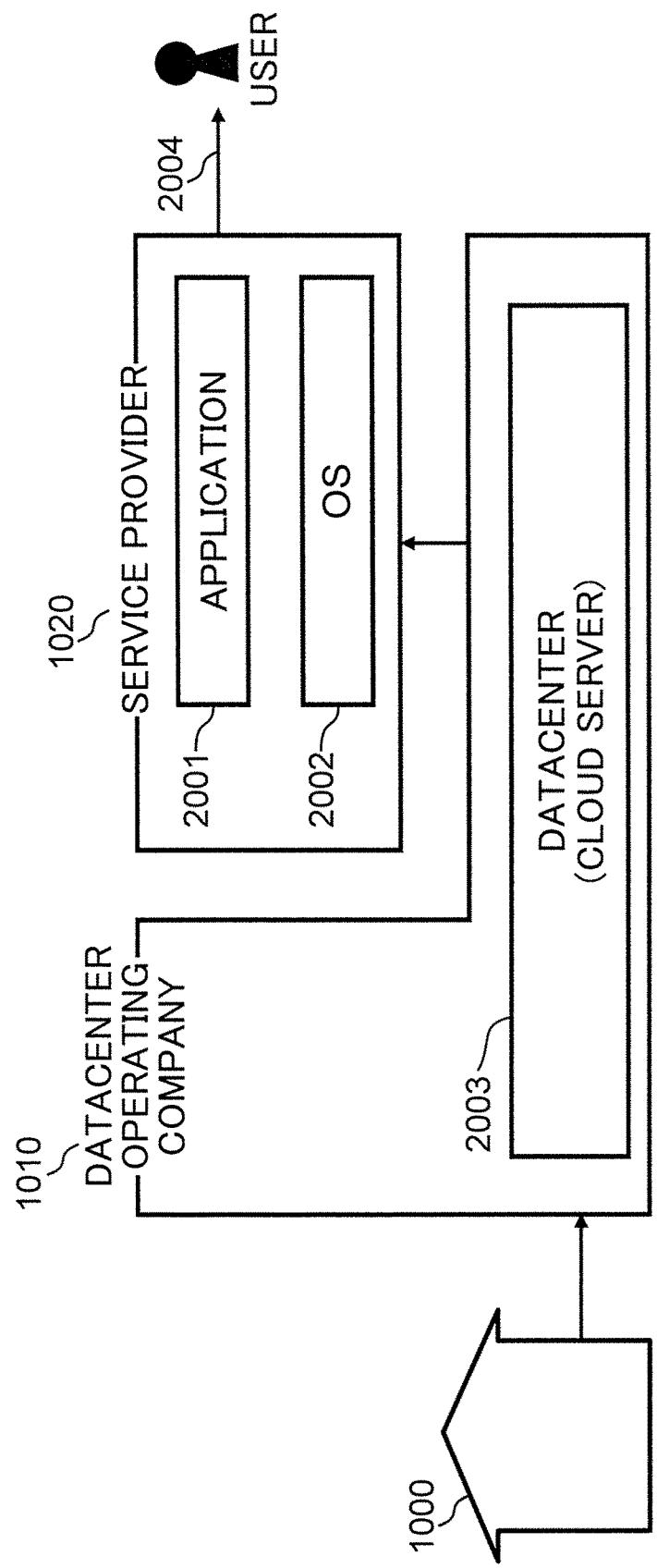

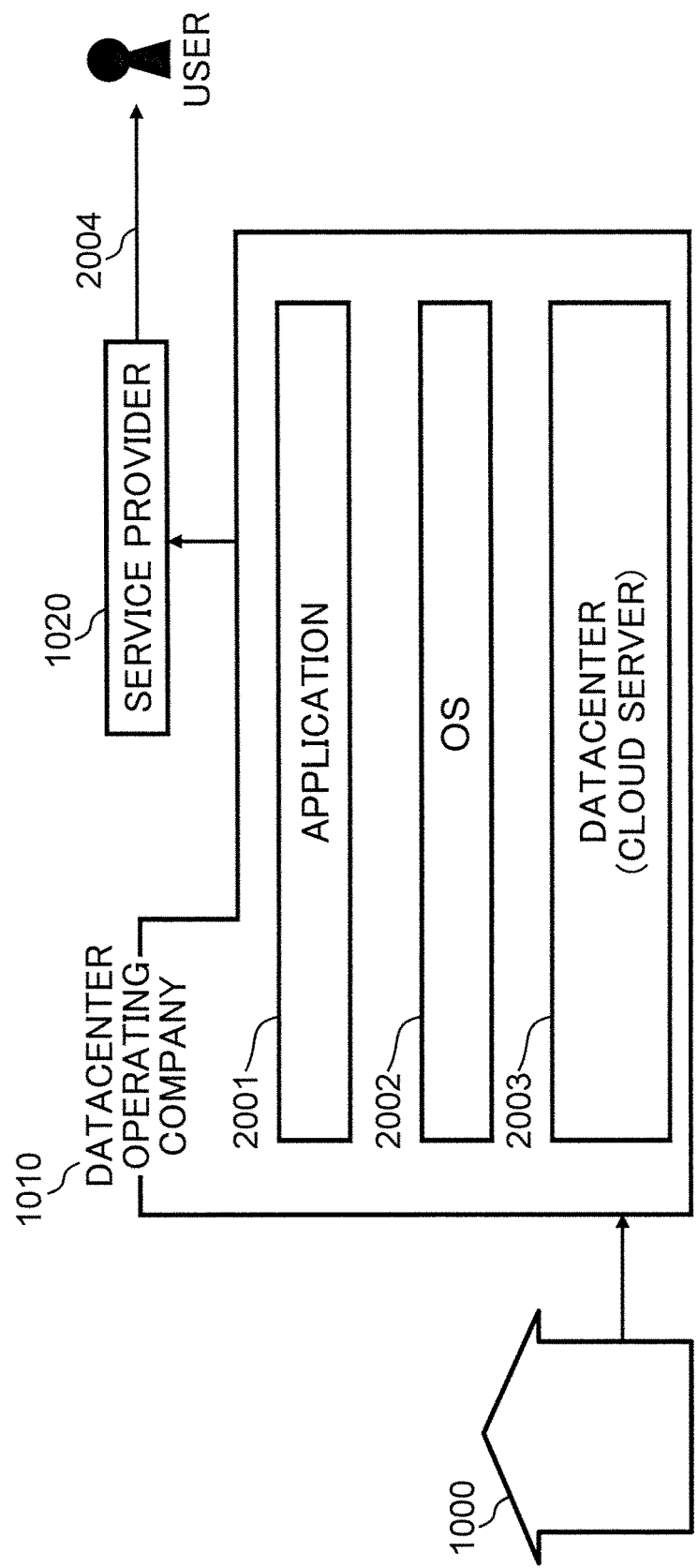

METHOD AND PROGRAM FOR CONTROLLING PORTABLE INFORMATION TERMINAL

TECHNICAL FIELD

The present disclosure relates to a method and a program for controlling a portable information terminal.

BACKGROUND ART

In recent years, there are proposed a control system for controlling household appliances installed in a house from outside the house before the user returns home, with use of a portable information terminal such as a smartphone or a tablet PC, and an application for a portable information terminal constituting the control system.

For instance, Patent Literature 1 discloses the following technique. Specifically, an air conditioner is operated at a time earlier than the timer-set time of the air conditioner designated by the user by a predetermined time period. Meanwhile, when the user transmits an electronic mail instructing to change the timer-set time from a portable information terminal, the timer-set time is changed, and the air conditioner is operated at a time earlier than the timer-set time after the change by a predetermined time period. Further, when the user transmits an electronic mail instructing to operate the air conditioner from the portable information terminal, the air conditioner is operated.

The technique disclosed in Patent Literature 1, however, needs further improvement.

CITATION LIST

Patent Literature

Patent Literature 1: Japanese Patent No. 4,422,932

SUMMARY OF INVENTION

In view of the above, a portable information terminal control method according to an aspect is a method for controlling a portable information terminal connectable to a network, to which a target device in a house, or a server for controlling the target device is connected, the portable information terminal being provided with a mail communication function, the control method causing a computer of the portable information terminal to:

extract, from a mail to be transmitted by the mail communication function, address information of the mail to be transmitted when it is detected that the mail communication function is activated;

extract a transmission time of the mail to be transmitted from the portable information terminal;

judge whether the address information matches predetermined address information, with use of a first database in which the predetermined address information is registered;

judge whether the transmission time belongs to a predetermined time zone, with use of a second database in which the predetermined time zone is registered; and determine an activation time at which the target device is to be activated on the basis of the transmission time, and transmit, to the network, a control command for activating the target device at the activation time when it is judged that the address information matches the predetermined address information and that the transmission time belongs to the predetermined time zone.

The aforementioned configuration provides further improvement.

BRIEF DESCRIPTION OF DRAWINGS

FIG. 3 is a diagram illustrating an example of an owner household appliance file;

FIG. 5 is a diagram illustrating an example of a life pattern file:

FIG. 8 is a diagram illustrating an example of a predetermined condition file;

FIG. 11 is a diagram illustrating an example of a state file;

FIG. 12 is a diagram illustrating an example of the state file:

FIG. 15 is a diagram illustrating an example of a data configuration of notification data;

FIG. 17A is a diagram illustrating an example of the daily life of the user;

FIG. 17B is a diagram illustrating an example of the daily life of the user;

FIG. 20 is a diagram illustrating an example of a data configuration of notification data to be transmitted from a household appliance to a server;

FIG. 25A is a diagram illustrating an example of a data configuration of an ON timer notification;

FIG. 25B is a diagram illustrating an example of data configurations of ON timer notifications for various types of household appliances;

FIG. 26 is a diagram illustrating an example of notification data;

FIG. 36 is a diagram illustrating an example of a life pattern file;

FIG. 38 is a sequence diagram illustrating a household appliance control operation on the basis of a life pattern file;

FIG. 40 is a diagram illustrating an overview of services to be provided by a household appliance control system of service type 1 (a cloud service provided by a datacenter of the applicant's company);

FIG. 41 is a diagram illustrating an overview of services to be provided by a household appliance control system of service type 2 (a cloud service utilizing IaaS);

FIG. 43 is a diagram illustrating an overview of services to be provided by a household appliance control system of service type 4 (a cloud service utilizing SaaS).

Figure 1:
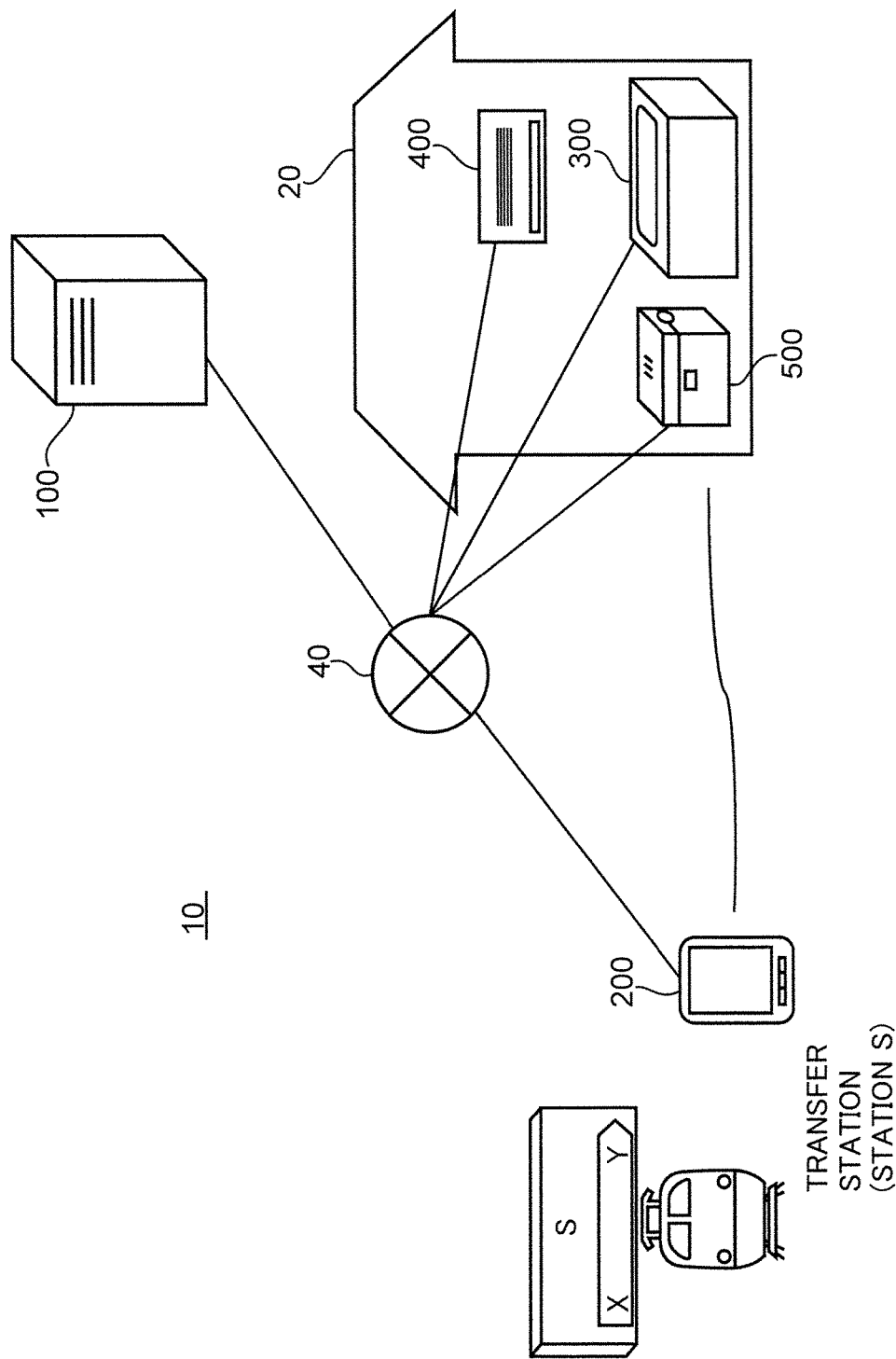
FIG. 1 is a diagram illustrating an overall configuration of a household appliance control system in a first embodiment.

DESCRIPTION OF EMBODIMENTS (Findings Based on which the Invention has been Made)

When the user implements a control system for controlling household appliances installed in the house from outside the house, and implements an application for a portable information terminal constituting the control system, it is assumed that the user controls the household appliances installed in the house from outside the house, assuming the user's behavior after returning home. For instance, when it is assumed that the user takes a bath immediately after returning home, the user may control a water heater in such a manner that supplying hot water to a bathtub is completed by the time when the user returns home. Further, when it is assumed that the user takes a meal about thirty minutes later after returning home, the user may control a rice cooker in such a manner that cooking rice by the rice cooker is completed thirty minutes later after returning home so that the user can eat hot steamed rice.

Meanwhile, it is presumed that the user's daily behavior is roughly fixed. For instance, it is possible to set a pattern for each user regarding how many minutes it takes for the user to arrive home after leaving the office when the user returns home, whether the user takes a bath first or takes a meal first after returning home, or by what time schedule the user does these things. When the user does these things, the user may control the household appliances from outside the house every time in the same way. If the user is required to control the household appliances from outside the house each time the user returns home, the user may feel it cumbersome to control the household appliances.

Further, not a few users may inform the family that the user is coming home, using an electronic mail function of a portable information terminal when the user leaves the office.

Patent Literature 1 discloses a technique of remote controlling an air conditioner by changing the timer-set time of the air conditioner or by operating the air conditioner with use of an electronic mail function of a portable information terminal.

In Patent Literature 1, unless the user transmits an electronic mail writing specific operation contents for the air conditioner, it is impossible for the user to operate the air conditioner. Thus, Patent Literature 1 requires to transmit an electronic mail writing the contents to operate the air conditioner, each time the user returns home. This may fail to solve the aforementioned drawbacks.

In view of the above, the inventors have achieved the following improved configuration in order to enhance the functions of a portable information terminal under the circumstances as described above.

A portable information terminal control method according to an aspect is a method for controlling a portable information terminal connectable to a network, to which a target device in a house, or a server for controlling the target device is connected, the portable information terminal being provided with a mail communication function, the control method causing a computer of the portable information terminal to:

extract, from a mail to be transmitted by the mail communication function, address information of the mail to be transmitted when it is detected that the mail communication function is activated;

extract a transmission time of the mail to be transmitted from the portable information terminal;

judge whether the address information matches predetermined address information, with use of a first database in which the predetermined address information is registered;

judge whether the transmission time belongs to a predetermined time zone, with use of a second database in which the predetermined time zone is registered; and determine an activation time at which the target device is to be activated on the basis of the transmission time, and transmit, to the network, a control command for activating the target device at the activation time when it is judged that the address information matches the predetermined address information and that the transmission time belongs to the predetermined time zone.

According to the aforementioned configuration, when it is judged that the address information of the mail matches the predetermined address information, and that the transmission time of the mail belongs to the predetermined time zone, the activation time at which the target device is to be activated is determined on the basis of the transmission time, and a control command for activating the target device at the activation time is transmitted to the network.

In the aforementioned configuration, for instance, as a behavior pattern of the user of the portable information terminal, following the user's behavior of sending a mail informing the family of the user's returning home, the user intends to activate a target device in the house such as turning on a water heater or an air conditioner. In this case, the target device in the house is activated on the basis of transmission of the mail, without the need of another operation by the user.

Thus, another application having a function of instructing activation of the target device in the house, which is likely to occur in response to execution of the application having the mail communication function, is executed. This makes it possible to execute the functions of two applications by one operation of the user. Therefore, it is possible to execute intended two applications, while reducing the processing load of a target device when the target device in the house is remote controlled from the portable information terminal, without requesting the portable information terminal to operate the two applications.

In the aforementioned configuration, for instance, the portable information terminal may include a memory which manages management information indicating that the target device is to be activated after elapse of a predetermined time period from the transmission time of the mail including the predetermined address information, and the activation time at which the target device is to be activated on the basis of the transmission time may be determined on the basis of the management information.

According to the aforementioned configuration, for instance, it is possible to activate a household appliance according to the user's behavior after the user returns home, with use of the management information in which it is recorded, for instance, how many minutes, it takes to activate the target device from the transmission time of a mail.

In the aforementioned configuration, for instance, the management information may be received from the server via the network.

According to the aforementioned configuration, for instance, it is possible to collect log information indicating a change in the operation state of the target device by the server, and to acquire management information generated by the server with use of the log information by the portable information terminal. Therefore, it is possible for the portable information terminal to acquire the management information that accurately reflects the user's behavior pattern, without managing the log information, and to activate the target device at an optimum timing. Further, it is possible to reduce the consumption amount of the memory.

In the aforementioned configuration, for instance, the control command may be transmitted to the target device via the network through the server.

According to the aforementioned configuration, the control command is transmitted to the target device via the server. Therefore, it is possible for the server to manage the state of the target device by acquiring the control command.

In the aforementioned configuration, for instance, the control command may be transmitted to the target device via the network.

According to the aforementioned configuration, the control command is directly transmitted to the target device from the portable information terminal through e.g. a home network. This makes it possible to promptly transmit the control command to the portable information terminal without depending on the processing ability of the server.

In the aforementioned configuration, for instance, the target device in the house may be a water heater for supplying water to a bathtub in the house, and the control command may be an instruction to supply water from the water heater to the bathtub.

According to the aforementioned configuration, it is possible to instruct the water heater to supply water to the bathtub on the basis of transmission of the mail by the user when the user returns home.

In the aforementioned configuration, for instance, the control command may include information indicating a set temperature of the water to be supplied.

According to the aforementioned configuration, it is possible to supply water at the set temperature included in the control command by the water heater.

In the aforementioned configuration, for instance, the control command may include information indicating a time at which supplying water from the water heater to the bathtub is started.

According to the aforementioned configuration, it is possible to start supplying water by the water heater at the time included in the control command.

In the aforementioned configuration, for instance, the target device in the house may be an air conditioner which adjusts a temperature of at least one room in the house, and the control command may be an instruction to adjust the temperature of the one room to a predetermined temperature by the air conditioner.

According to the aforementioned configuration, it is possible to control the air conditioner in such a manner that the room temperature reaches the temperature designated by the control command.

In the aforementioned configuration, for instance, the control command may include information indicating a time at which adjusting the temperature of the one room is started by the air conditioner.

According to the aforementioned configuration, it is possible to start temperature adjustment by the air conditioner at the time included in the control command.

In the aforementioned configuration, for instance, the target device in the house may be a cooking heater which performs heat-controlled cooking, and the control command may be an instruction to start the heat-controlled cooking by the cooking heater.

According to the aforementioned configuration, it is possible to start cooking by the cooking heater on the basis of the mail to be transmitted at the time when the user returns home.

In the aforementioned configuration, for instance, the control command may include information indicating a time at which the heat-controlled cooking by the cooking heater is started.

According to the aforementioned configuration, it is possible to start cooking by the cooking heater at the time included in the control command.

In the aforementioned configuration, for instance, the cooking heater may be a rice cooker.

According to the aforementioned configuration, it is possible to start cooking by the rice cooker on the basis of the mail to be transmitted at the time when the user returns home.

In the aforementioned configuration, for instance, the cooking heater may be provided with a microwave generating means.

According to the aforementioned configuration, it is possible to start cooking by the cooking heater provided with the microwave generating means on the basis of the mail to be transmitted at the time when the user returns home.

In the aforementioned configuration, for instance, the cooking heater may be a steam cooker provided with a steam generating means.

According to the aforementioned configuration, it is possible to start cooking by the cooking heater provided with the steam generating means on the basis of the mail to be transmitted at the time when the user returns home.

In the aforementioned configuration, for instance, the control method may further include:

collecting control start time periods, each of which indicates a time period from the transmission time of the mail until the time at which the target device is to be activated, and recording a control start time period having a high frequency among the collected control start time periods in the management information.

According to the aforementioned configuration, it is possible to activate the target device at a typical time at which the target device is to be activated on the basis of the transmission time of the mail. This is advantageous in controlling the target device, taking into consideration the user's life pattern.

Further, another aspect is directed to a method for controlling a portable information terminal connectable to a network, to which a target device in a house, or a server for controlling the target device is connected, the portable information terminal being provided with a mail communication function, the control method causing a computer of the portable information terminal to:

judge whether a mail to be transmitted by the mail communication function includes a predetermined word, with use of a first database in which the predetermined word is registered, when it is detected that the mail communication function is activated;

extract a transmission time of the mail to be transmitted from the portable information terminal;

judge whether the transmission time belongs to a predetermined time zone, with use of a second database in which the predetermined time zone is registered; and determine an activation time at which the target device is to be activated on the basis of the transmission time, and transmit, to the network, a control command for activating the target device at the activation time when it is judged that the mail includes the predetermined word and that the transmission time belongs to the predetermined time zone.

According to the aforementioned configuration, when it is judged that the mail includes the predetermined word and the transmission time of the mail belongs to the predetermined time zone, the activation time at which the target device is to be activated is determined on the basis of the transmission time, and a control command for activating the target device at the activation time is transmitted to the network.

In the aforementioned configuration, for instance, as a behavior pattern of the user of the portable information terminal, following the user's behavior of sending, to the family, a mail including a fixed message to be used when the user returns home, the user may intend to activate a target device in the house such as turning on a water heater or an air conditioner. In this case, the target device in the house is activated on the basis of transmission of the mail, without the need of another operation by the user.

Thus, another application having a function of instructing activation of the target device in the house, which is likely to occur in response to execution of the application having the mail communication function, is executed. This makes it possible to execute the functions of two applications by one operation of the user. Therefore, it is possible to execute intended two applications, while reducing the processing load of a target device when the target device in the house is remote controlled from the portable information terminal, without requesting the portable information terminal to operate the two applications.

Further, yet another aspect is directed to a method for controlling a portable information terminal connectable to a network, to which a target device in a house, or a server for controlling the target device is connected, the portable information terminal being provided with a mail communication function, the control method causing a computer of the portable information terminal to:

judge whether a mail to be transmitted by the mail communication function includes a predetermined word indicating a place, with use of a first database in which the predetermined word is registered, when it is detected that the mail communication function is activated;

extract a transmission time of the mail to be transmitted from the portable information terminal;

determine a position of the portable information terminal at the transmission time of the mail on the basis of the word indicating the place, with use of a database which manages the word indicating the place and position information in association with each other;

calculate a time period required for a user of the portable information terminal to return home on the basis of the transmission time and on the basis of the position information;

calculate an activation time of the target device for use in setting the target device to a predetermined state at a predetermined time after elapse of the required time period, on the basis of the transmission time and on the basis of the required time period; and transmit, to the network, a control command for activating the target device at the calculated activation time.

According to the aforementioned configuration, when it is judged that a mail includes a word indicating a predetermined place, a time period required for the user to return home from the place is calculated, and an activation time at which the target device is set to a predetermined state at a predetermined time (including a point of time when the user returns home) after the user returns home is calculated. Then, a control command for activating the target device at the activation time is transmitted to the network.

In the aforementioned configuration, for instance, as a behavior pattern of the user of the portable information terminal, following the user's behavior of sending, to the family, a mail including a text including a word indicating a place when the user returns home, the user may intend to activate a target device in the house such as turning on a water heater or an air conditioner. In this case, the target device in the house is activated on the basis of transmission of the mail, without the need of another operation by the user.

Thus, another application having a function of instructing activation of the target device in the house, which is likely to occur in response to execution of the application having the mail communication function, is executed. This makes it possible to execute the functions of two applications by one operation of the user. Therefore, it is possible to execute intended two applications, while reducing the processing load of a target device when the target device in the house is remote controlled from the portable information terminal, without requesting the portable information terminal to operate the two applications.

Further, a required home returning time period from the place indicated by the word included in the mail is calculated. This makes it possible to activate the target device according to the user's life pattern, even if the user sends a mail from a place where the user usually does not send a mail when the user returns home.

(Overview of Services to be Provided)

In the following, embodiments of the present disclosure are described referring to the accompanying drawings. The following embodiments are examples embodying the invention, and do not limit the technical scope of the invention.

First of all, an overview of services to be provided by a household appliance control system embodying the invention is described.

Figure 39A:
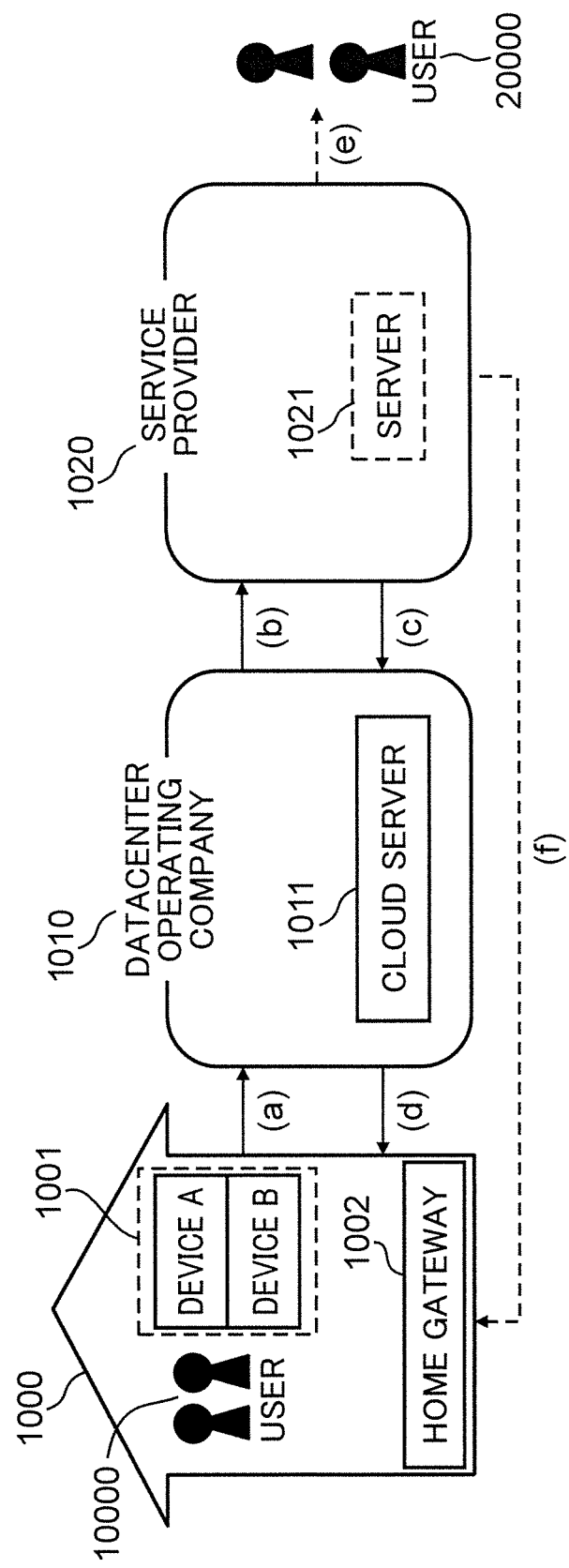
FIG. 39A is a diagram illustrating an example of an overview of services to be provided by a household appliance control system embodying the invention.

FIG. 39A is a diagram illustrating an overview of services to be provided by the household appliance control system embodying the invention. The household appliance control system is provided with a group 1000, a datacenter operating company 1010, and a service provider 1020.

The group 1000 is, for instance, a company, a party, or a home. The scale of the group 1000 does not matter. The group 1000 is provided with a number of devices 1001 including a first device A and a second device B, and a home gateway 1002. The devices 1001 include devices (e.g. a smartphone, a personal computer (PC) or a TV receiver) connectable to the Internet. Further, the devices 1001 include devices (e.g. an illumination device, a washing machine, or a refrigerator) incapable of being connected to the Internet by themselves. The devices 1001 may include devices which are not connectable to the Internet by themselves, but are connectable to the Internet via the home gateway 1002. Further, users 10000 use the devices 1001 within the group 1000.

The datacenter operating company 1010 is provided with a cloud server 1011. The cloud server 1011 is a virtual server connectable to a variety of types of devices via the Internet. The cloud server 1011 mainly manages big data, which is difficult to be handled by an ordinary database management tool or a like tool. The datacenter operating company 1010 manages data, manages the cloud server 1011, and operates a datacenter which performs these services. The details of the services to be provided by the datacenter operating company 1010 will be described later.

Figure 39B:
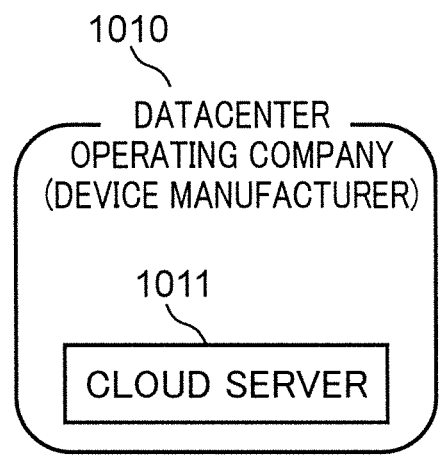
FIG. 39B is a diagram illustrating an example, in which a device manufacturer corresponds to a datacenter operating company.
Figure 39C:
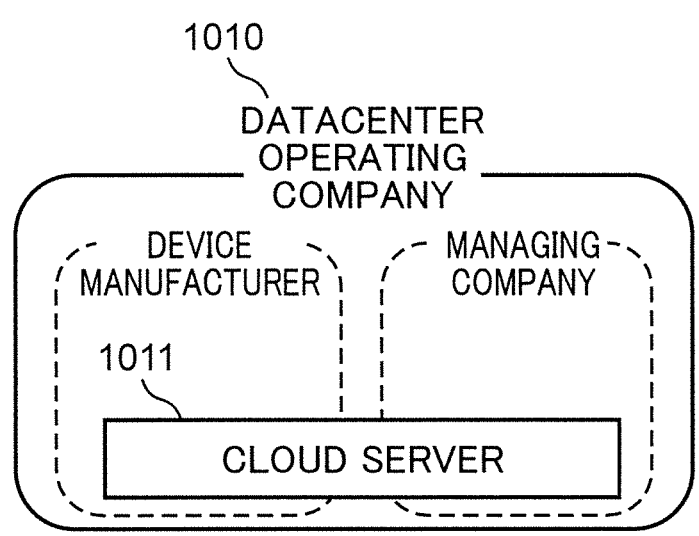
FIG. 39C is a diagram illustrating an example, in which both of or one of a device manufacturer and a managing company corresponds to a datacenter operating company.

The datacenter operating company 1010 is not limited to a company which manages data or manages the cloud server 1011. For instance, as illustrated in FIG. 39B, in the case where a device manufacturer which develops or manufactures one of the devices 1001 manages data or manages the cloud server 1011, the device manufacturer corresponds to the datacenter operating company 1010. Further, the number of datacenter operating companies 1010 is not limited to one. For instance, as illustrated in FIG. 39C, when a device manufacturer and a managing company jointly or sharingly manage data or manages the cloud server 1011, both or one of the device manufacturer and the managing company corresponds to the datacenter operating company 1010.

The service provider 1020 is provided with a server 1021. The scale of the server 1021 does not matter. For instance, the server 1021 includes a memory in a PC for personal use. Further, the service provider 1020 may not be provided with the server 1021.

In the aforementioned household appliance control system, the home gateway 1002 is not an essential element. For instance, when the cloud server 1011 manages all the data, the home gateway 1002 is not necessary. Further, when all the devices in a house are connected to the Internet, a device incapable of being connected to the Internet by itself may not exist. In this case, the service provider 1020 is provided with another device that functions as the server 1021.

Next, a flow of information in the household appliance control system is described.

The first device A or the second device B in the group 1000 individually transmits log information thereof to the cloud server 1011 in the datacenter operating company 1010. The cloud server 1011 accumulates the log information of the first device A or of the second device B (see the arrow (a) in FIG. 39A). The log information is information indicating e.g. operation conditions or operation dates and times of the devices 1001. For instance, the log information includes a viewing history of TV, video recording reservation information in a recorder, a date and time when a washing machine is operated, a quantity of laundry, a date and time when a refrigerator is opened and closed, or the number of times of opening and closing a refrigerator. The log information is not limited to these information, and may include a variety of types of information acquirable from a variety of types of devices. The log information may be directly provided from the devices 1001 themselves to the cloud server 1011 via the Internet. Further, the log information may be temporarily accumulated in the home gateway 1002 from the devices 1001, and may be provided from the home gateway 1002 to the cloud server 1011.

Next, the cloud server 1011 in the datacenter operating company 1010 provides the accumulated log information to the service provider 1020 unit by unit. The unit may be the amount of information, by which the datacenter operating company 1010 can organize and provide the accumulated information to the service provider 1020, or may be the amount of information required from the service provider 1020. Further, in the embodiments, information is provided unit by unit. Alternatively, information may not be provided by a fixed amount, and the amount of information to be provided may vary depending on a condition. The log information is stored in the server 1021 owned by the service provider 1020, as necessary (see the arrow (b) in FIG. 39A).

The service provider 1020 organizes the log information into information appropriate for the service to be provided to the user, and provides the organized information to the user. The user to whom information is provided may be a user 10000 who uses the devices 1001, or may be an outsider user 20000. The information providing method to the users 10000 and 20000 may be such that information is directly provided to the users 10000 and 20000 from the service provider 1020 (see the arrows (e) and (f) in FIG. 39A). Further, the information providing method to the user 10000 may be such that information is provided to the user 10000 via the cloud server 1011 in the datacenter operating company 1010 (see the arrows (c) and (d) in FIG. 39A). Further, the cloud server 1011 in the datacenter operating company 1010 may organize the log information into information appropriate for the service to be provided to the user, and may provide the organized information to the service provider 1020.

The user 10000 may be identical to or different from the user 20000.

1. First Embodiment

In this section, a household appliance control system 10 (an example of a device control system) in the first embodiment is described referring to the drawings. In the embodiment, the addressee of a mail and a time zone when the mail is transmitted are used as a predetermined condition that satisfies a mail, based on which household appliance control is started. The predetermined condition is set by the user in advance. A predetermined addressee as the predetermined condition is the addressee of a mail, based on which household appliance control is started. A predetermined time zone as the predetermined condition is a time zone such that the user is not supposed to return home earlier than the start time of the time zone, or a time zone during which household appliance control is not started when the user returns home earlier than the start time of the time zone. The time zone may be set in advance by the user.

Figure 27A:
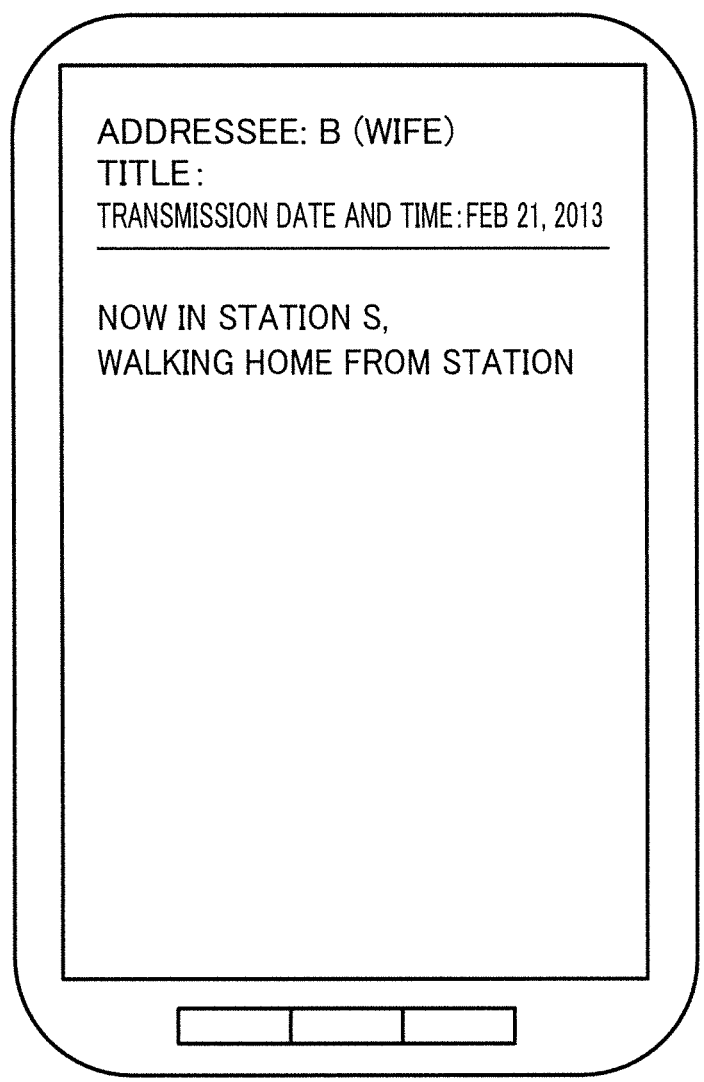
FIG. 27A is a diagram illustrating an example of a mail, based on which household appliance control is started.

FIG. 27A is a diagram illustrating an example of a mail screen G271 of a mail, based on which household appliance control is started. In this example, a husband on the way home sends a mail to his wife B, using his portable terminal, informing that he is now in Station S and is returning home soon. For instance, when it is assumed that the predetermined addressee is his wife B and his daughter C, and the predetermined time zone is from 18:00 to 20:00, the portable terminal checks whether the addressee of the mail is his wife B or his daughter C, and whether the mail transmission time belongs to the time zone from 18:00 to 20:00. In this case, the mail addressee is his wife B, and the transmission time is 18:10, which satisfy the predetermined condition. Therefore, the portable terminal transmits a mail transmission notification to a server.

1.1 Overall Configuration of Household Appliance Control System 10

FIG. 1 is a diagram illustrating an overall configuration of the household appliance control system 10 in the first embodiment. The household appliance control system 10 is provided with a cloud server (hereinafter, simply called as a "server") 100, a portable terminal 200, a household appliance 300, a household appliance 400, and a household appliance 500.

In FIG. 1, only the household appliance 300, the household appliance 400, and the household appliance 500 are illustrated in a house 20. The present disclosure, however, is not specifically limited to the above. For instance, the house 20 may be provided with four or more household appliances, or may be provided with two or less household appliances. Each of the portable terminal 200, the household appliance 300, the household appliance 400, and the household appliance 500 is communicatively connected to the server 100 via a network 40. The network 40 is, for instance, the Internet.

In FIG. 1, the household appliance 300 (an example of a target device) is a water heater for a bathroom, the household appliance 400 (an example of a target device) is an air conditioner such as a heating and cooling device, an air cleaner, or a dehumidifier, and the household appliance 500 (an example of a target device) is a cooking heater. This is merely an example. The household appliances 300 to 500 may be the other devices (e.g. AV equipment such as a TV receiver or a video recorder, a microwave oven, a water heater, a washing machine, an illumination device, or an electronic shutter device). The household appliance 400 corresponds to the device 1001 in FIG. 39A.

The embodiment is described based on the following scenario.

In the evening, the user A who owns the portable terminal 200 sends a mail to wife B who is in the house 20 as their home from station S as a transfer station when he returns home. It takes thirty minutes from station S to the station nearest to the house of the user A by train, and it takes fifteen minutes to his house from the nearest station on foot. A mail transmission notification is transmitted from the portable terminal 200 to the server 100, and is recorded by the server 100. The user A inputs a predetermined condition in advance. When the mail transmission time and the mail addressee satisfy the predetermined condition, the portable terminal 200 transmits a mail transmission notification to the server 100. When the predetermined condition is not satisfied, the portable terminal 200 does not transmit a mail transmission notification to the server 100. When the server 100 receives a mail transmission notification from the portable terminal 200, the server 100 controls the household appliances on the basis of a daily control pattern of the household appliances in the house of the user A.

In the embodiment, household appliance control is started on the basis of transmission of a mail. Alternatively, household appliance control may be started on the basis of receiving a mail.

1.2 Configuration of Server 100

Figure 2:
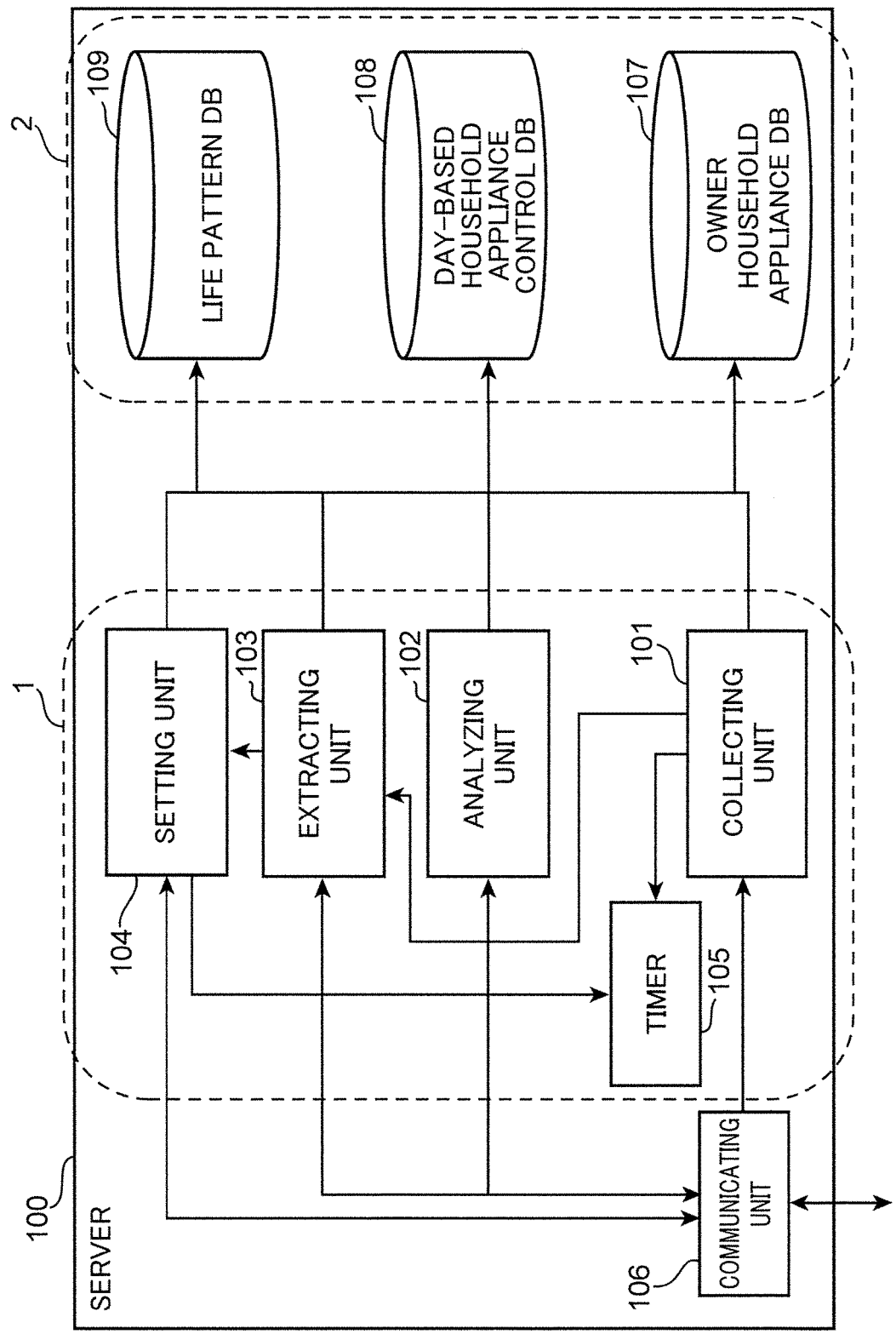
FIG. 2 is a block diagram illustrating a configuration of a server in the household appliance control system in the first embodiment.

FIG. 2 is a block diagram illustrating a configuration of the server 100 in the household appliance control system 10. The server 100 is provided with a collecting unit 101, an analyzing unit 102, an extracting unit 103, a setting unit 104, a timer 105, a communicating unit 106, an owner household appliance database (DB) 107, a day-based household appliance control database 108, and a life pattern database 109. Alternatively, the collecting unit 101, the analyzing unit 102, the extracting unit 103, the setting unit 104, and the timer 105 may be implemented by providing a controller 1 in the server 100 with the functions of these elements. An example of the controller is a processor such as a CPU or a microcontroller. Further, the owner household appliance database 107, the day-based household appliance control database 108, and the life pattern database 109 are stored in a memory 2 of the server 100, for instance. An example of the memory 2 is a rewritable non-volatile storage device.

1.2.1 Communicating Unit 106

The communicating unit 106 receives, from the portable terminal 200, a control start notification notifying that control of the household appliance 300, 400, or 500 is started. Further, the communicating unit 106 receives, from the household appliances 300 to 500, information indicating the time at which the operation states of the household appliances 300 to 500 have changed, and information indicating operation states after the change. Further, the communicating unit 106 transmits a life pattern file F500 (see FIG. 5) to be described later to the portable terminal 200. Further, the communicating unit 106 transmits a control signal for turning on or off the household appliances 300 to 500 to the household appliances 300 to 500.

1.2.2 Collecting Unit 101

The collecting unit 101 collects information received from the portable terminal 200 via the communicating unit 106 and indicating a mail transmission notification by the portable terminal 200; information received from the household appliances 300 to 500, and indicating the times at which the operation states of the household appliances 300 to 500 have changed; and information indicating operation states after the change. The collecting unit 101 stores the collected information in the day-based household appliance control database 108, as a day-based household appliance control file F400 (see FIG. 4).

Further, when it is judged that the operation states of the household appliances 300 to 500 have changed on the basis of the collected information, the collecting unit 101 changes the operation states of the associated household appliances in an owner household appliance file F300 (see FIG. 3) within the owner household appliance database 107 to the operation states after the change. Further, when the collecting unit 101 receives a mail transmission notification from the portable terminal 200, the collecting unit 101 outputs the mail transmission notification to the extracting unit 103.

When the finishing condition of a day is satisfied, the day-based household appliance control file F400 is saved as a file for a day. Assuming that twenty-four hours is one day, and a time period from 0:00 on a certain day to 0:00 on the next day is one day, when the time is 0:00 on the next day, the finishing condition of a day is satisfied. The collecting unit 101 judges that the finishing condition of a day is satisfied when the time is 0:00 on the next day, and finishes recording in the day-based household appliance control file F400, which is stored in the day-based household appliance control database 108. Then, when the time is 0:00 on the next day, the collecting unit 101 generates a day-based household appliance control file F400 of the next day, and records information on the next day in the generated day-based household appliance control file F400 of the next day.

The details of the owner household appliance file and of the day-based household appliance control file will be described later in the section 1.2.7 and in the section 1.2.8. In this section, a change in the operation states to be recorded in the day-based household appliance control file F400, and operation states of household appliances to be recorded in the owner household appliance file F300 are described.

Regarding the operation states to be recorded in the day-based household appliance control file F400, and the operation states of household appliances to be recorded in the owner household appliance file F300, the following operation states are included in each of the household appliances. Specifically, the operation states of each of the household appliances are ON, OFF, and COMPLETE. For instance, the illumination device has operation states i.e. ON and OFF. The portable terminal 200 has an operation state i.e. transmitting a mail.

The operation state of the portable terminal 200 is not recorded in the owner household appliance file F300, and is recorded only in the day-based household appliance control file F400. Further, regarding the operation states of the household appliances 300 to 500, ON indicates a state that the household appliances 300 to 500 are turned on, and OFF indicates a state that the household appliances 300 to 500 are turned off. Further, COMPLETE indicates a state that the household appliances 300 to 500 reach a set state after the household appliances 300 to 500 are turned on.

In the following, the operation state COMPLETE is described using an example. For instance, it is assumed that the household appliance is a water heater for supplying heated water to a bathtub in a house, and the water heater accepts an instruction to supply heated water of a predetermined temperature to a predetermined water level in the bathtub. In this case, the water heater starts supplying heated water to the bathtub, and continues to supply heated water until the heated water to be supplied reaches the predetermined water level and the predetermined temperature. In this case, the operation state of the water heater is changed from OFF to ON when the water heater starts supplying heated water to the bathtub, and the operation state of the water heater is changed from ON to COMPLETE when the heated water to be supplied reaches the predetermined water level and the predetermined temperature.

1.2.3 Analyzing Unit 102

The analyzing unit 102 analyzes the order in which the household appliances are turned on, and a difference in times at which the respective household appliances are turned on after the user returns home, on the basis of the day-based household appliance control file F400 in the day-based household appliance control database 108. Further, the analyzing unit 102 analyzes a time period (COMPLETE required time period) required for each of the household appliances to change from ON to COMPLETE. Further, the analyzing unit 102 analyzes the order in which household appliance control is started and control start time periods after a mail is transmitted.

More specifically, the analyzing unit 102 analyzes a pattern regarding a time period from the time at which a mail is transmitted until the time at which each of the household appliances is turned on or off, and a pattern regarding a COMPLETE required time period. Then, the analyzing unit 102 specifies the times at which the household appliances are frequently turned on, arranges the specified times chronologically, and generates a typical life pattern with respect to each of the household appliances, from the analysis result. Thus, a user's life pattern for a day is configured. Then, the analyzing unit 102 stores the generated life pattern in the life pattern database 109, as the life pattern file F500 (see FIG. 5). The details of the life pattern file F500 will be described later in the section 1.2.9.

The timing at which the analyzing unit 102 analyzes a life pattern using the day-based household appliance control file F400 may be a timing at which day-based household appliance control files F400 for a certain number of days are collected. The certain number of days may be, for instance, one week or two weeks, which is a time period to be handled easily.

1.2.4 Extracting Unit 103

When the server 100 controls the household appliances, in response to input of a mail transmission notification from the collecting unit 101, the extracting unit 103 reads out the life pattern file F500 of the associated user from the life pattern database 109, and outputs the readout life pattern file F500 to the setting unit 104.

1.2.5 Setting Unit 104

The setting unit 104 turns on a household appliance on the basis of the life pattern file F500, which is input from the extracting unit 103. For instance, it is assumed that a certain time period is recorded in the life pattern file F500, as a control start time period indicating a time period from a mail transmission time until the time at which a certain household appliance is turned on. Then, the setting unit 104 transmits an ON control signal to the household appliance when the certain time period has elapsed. Further, after a certain household appliance is turned on, in response to receiving an interrupt notification for interrupting control of the household appliance from the portable terminal 200, the setting unit 104 transmits an OFF control signal to the household appliance so as to turn off the household appliance. Further, in response to receiving a resume notification for resuming control of the household appliance after an interrupt notification is transmitted, the setting unit 104 transmits an ON control signal to the household appliance.

1.2.6 Timer 105

The timer 105 counts the current time. The timer 105 is used for allowing the collecting unit 101 to specify the times at which the operation states of the portable terminal 200 and of the household appliances 300 to 500 have changed. Further, the timer 105 is used for acquiring the current time when the extracting unit 103 extracts a life pattern file F500. Further, the timer 105 is used for acquiring the times by the setting unit 104. The times at which the operation states have changed may be transmitted from the portable terminal 200 and from the household appliances 300 to 500.

1.2.7 Owner Household Appliance Database 107

The owner household appliance database 107 stores the owner household appliance file F300, in which the names of the household appliances installed in the house 20, and a current operation state of each of the household appliances are recorded in association with each other. FIG. 3 is a diagram illustrating an example of the owner household appliance file F300. In the example of the owner household appliance file F300 illustrated in FIG. 3, the operation states of two air conditioners, of a water heater, and of a rice cooker are recorded. Since the first air conditioner is operated, "ON" is recorded as the operation state of the first air conditioner. Since the second air conditioner is not operated, "OFF" is recorded as the operation state of the second air conditioner. Since the water heater completed supplying heated water of a predetermined temperature to a predetermined water level in the bathtub, "COMPLETE" is recorded as the operation state of the water heater. Further, since the rice cooker is not operated, "OFF" is recorded as the operation state of the rice cooker. FIG. 3 illustrates the owner household appliance file F300 in the house 20 illustrated in FIG. 1. Note that the owner household appliance database 107 accumulates one or more owner household appliance files F300 of each of the houses 20 to which the present service is applied.

1.2.8 Day-based Household Appliance Control Database 108

The day-based household appliance control database 108 stores a day-based household appliance control file F400, in which a transmission time of a mail from the portable terminal 200 that satisfies the predetermined condition, an operation state of each of the household appliances whose operation state has changed to one of ON, OFF, and COMPLETE after the mail transmission time, and a time at which the change has occurred are recorded each day. Specifically, the day-based household appliance control database 108 manages information indicating a time at which the operation state of each of the household appliances has changed, and information indicating operation states after the change each day.

Figure 4:
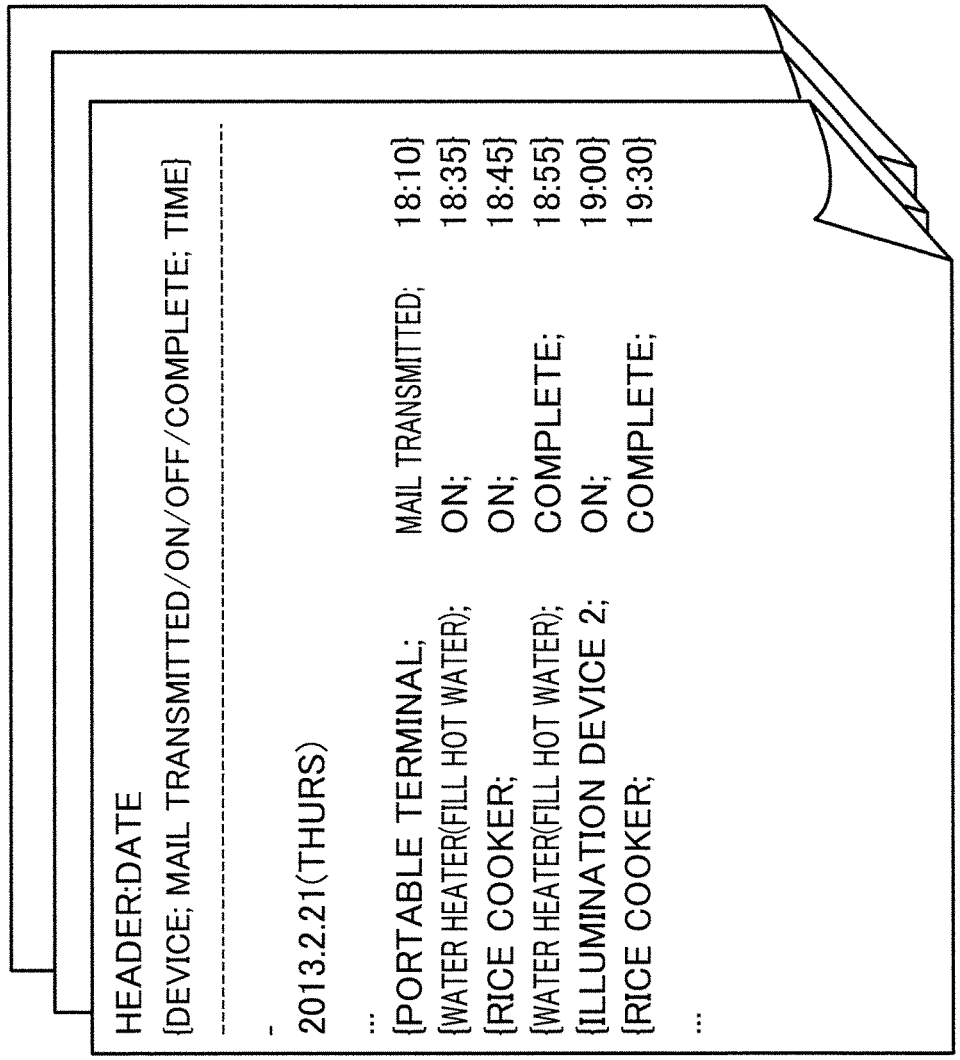
FIG. 4 is a diagram illustrating an example of a day-based household appliance control file.

FIG. 4 is a diagram illustrating an example of the day-based household appliance control file F400. The example of the day-based household appliance control file F400 in FIG. 4 illustrates a change in the operation state of each of the household appliances from the time at which a mail that satisfies the predetermined condition was transmitted until the time at which the rice cooker cooked rice on Feb. 21, 2013 (Thursday).

More specifically, in the upper part of the day-based household appliance control file F400 illustrated in FIG. 4, "Feb. 21, 2013 (THURS)" is recorded. This clearly illustrates that the day-based household appliance control file F400 is a file for Feb. 21, 2013 (Thursday). A mail that satisfies the predetermined condition was transmitted at 18:10 on this day. Therefore, "PORTABLE TERMINAL; MAIL TRANSMITTED; 18:10" is recorded. Thereafter, the water heater started filling hot water at 18:35. Therefore, "WATER HEATER (FILL HOT WATER); ON; 18:35" is recorded. Thereafter, the rice cooker was turned on at 18:45. Therefore, "RICE COOKER; ON: 18:45" is recorded. Thereafter, the water heater reached the set state at 18:55. Therefore, "WATER HEATER (FILL HOT WATER); COMPLETE; 18:55" is recorded. Thereafter, an illumination device 2 was turned on at 19:00. Therefore, "ILLUMINATION DEVICE 2; ON; 19:00" is recorded. Thereafter, the rice cooker reached the set state. Therefore, "RICE COOKER; COMPLETE; 19:30" is recorded. FIG. 4 illustrates a day-based household appliance control file F400 in one house 20. Note that the day-based household appliance control database 108 accumulates one or more day-based household appliance control files F400 for each of the houses 20 to which the present service is applied.

1.2.9 Life Pattern Database 109

The life pattern database 109 stores a life pattern file F500 to be generated by the analyzing unit 102. The analyzing unit 102 analyzes the day-based household appliance control file F400 in the day-based household appliance control database 108, extracts the order in which the household appliances are turned on, and a difference in times at which the respective household appliances are turned on. The analyzing unit 102 generates a life pattern file F500 representing a life pattern having a high frequency. A life pattern having a high frequency indicates a typical life pattern represented by a control start time period having a high frequency and a COMPLETE required time period having a high frequency.

FIG. 5 is a diagram illustrating an example of the life pattern file F500. In the example of the life pattern file F500 illustrated in FIG. 5, a COMPLETE required time period and a control start time period are recorded for each of the water heater and the rice cooker.

Regarding the water heater, a COMPLETE required time period having a high frequency is twenty minutes, and a control start time period having a high frequency is twenty minutes. Therefore, "WATER HEATER (FILL HOT WATER); 20 MIN; 20 MIN LATER" is recorded. Further, regarding the rice cooker, a COMPLETE required time period having a high frequency is 45 minutes, and a control start time period having a high frequency is 30 minutes. Therefore, "RICE COOKER; 45 MIN; 30 MIN LATER" is recorded.

1.3 Portable Terminal 200

Figure 6:
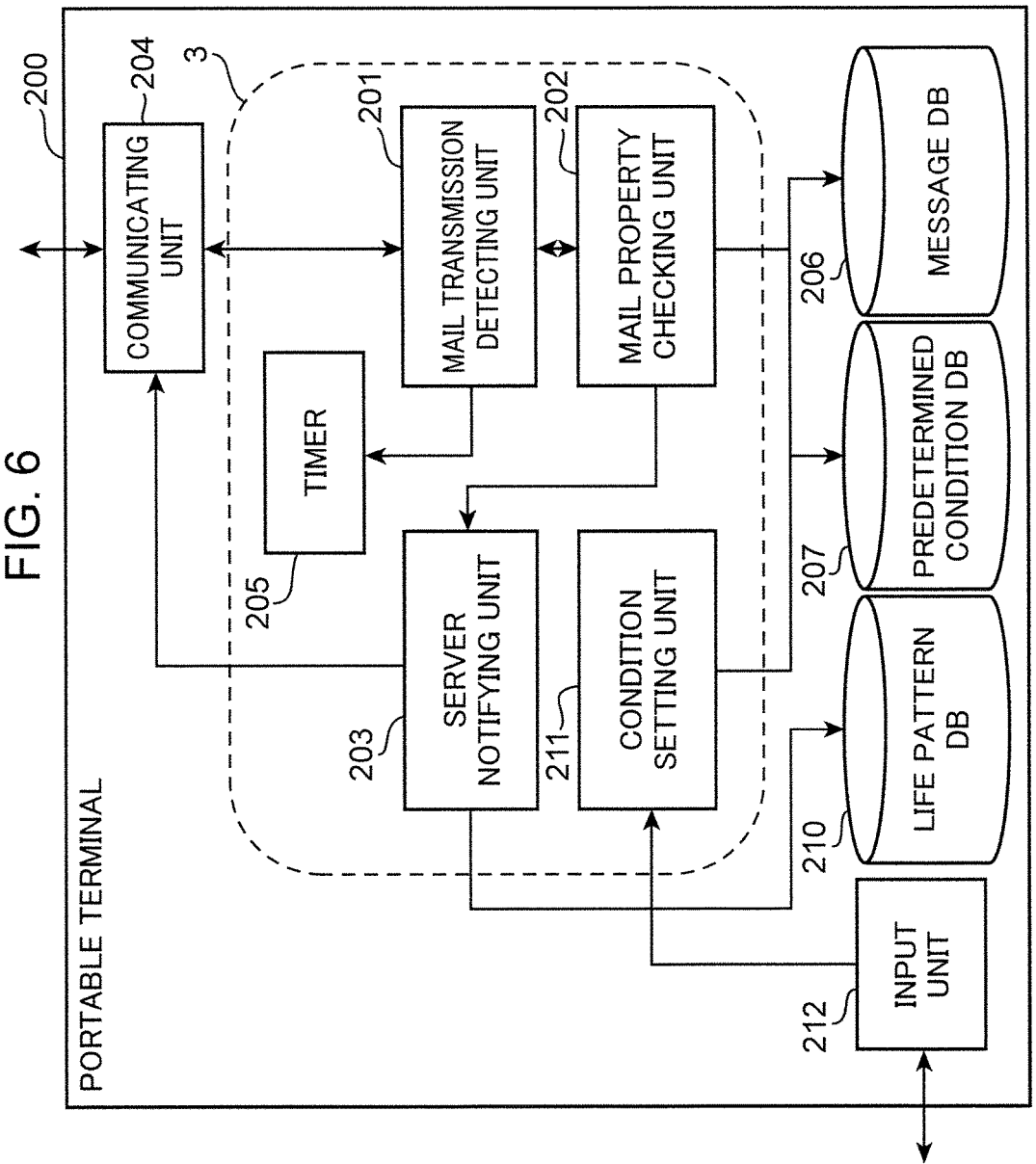
FIG. 6 is a block diagram illustrating a configuration of a portable terminal in the household appliance control system in the first embodiment.

FIG. 6 is a block diagram illustrating a configuration of the portable terminal 200 in the household appliance control system 10. The portable terminal 200 is provided with a mail transmission detecting unit 201, a mail property checking unit 202, a server notifying unit 203, a communicating unit 204, a timer 205, a message database 206, a predetermined condition database 207, a life pattern database 210, a condition setting unit 211, and an input unit 212. Alternatively, the mail transmission detecting unit 201, the mail property checking unit 202, the server notifying unit 203, the timer 205, and the condition setting unit 211 may be implemented by providing a controller 3 in the portable terminal 200 with the functions of these elements. In the embodiment, the portable terminal 200 corresponds to an example of a portable information terminal.

Figure 7:
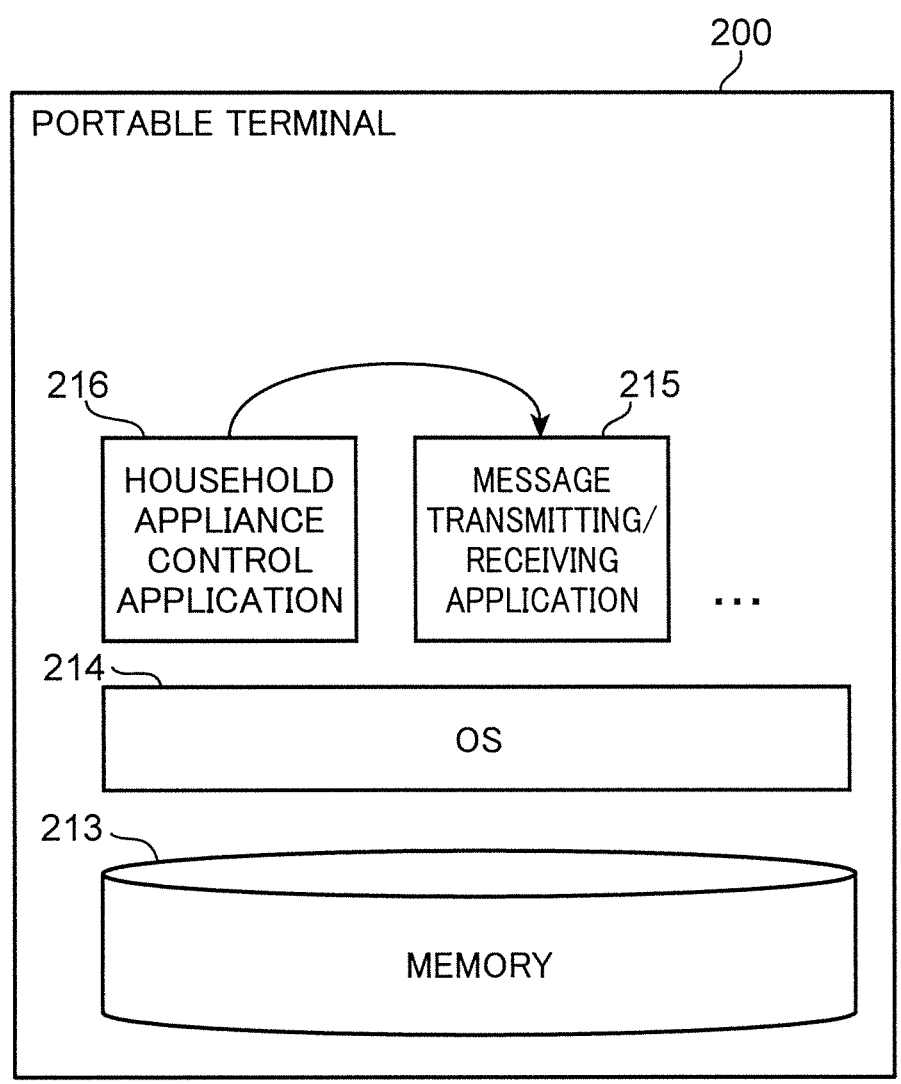
FIG. 7 is a block diagram illustrating a software configuration of the portable terminal.

FIG. 7 is a block diagram illustrating a software configuration of the portable terminal 200. The portable terminal 200 is provided with a memory 213, an OS 214, and a household appliance control application 216 and a message transmitting/receiving application 215 as at least two applications. The message transmitting/receiving application 215 is an application for use in transmitting and receiving a mail. The portable terminal 200 activates the message transmitting/receiving application 215, and transmits a mail. The household appliance control application 216 transmits an ON timer notification to the server 100 when the addressee of the mail and the transmission time of the mail satisfy the predetermined condition. The ON timer notification also has the function of a mail transmission notification.

1.3.1 Mail Transmission Detecting Unit 201

The mail transmission detecting unit 201 checks whether a mail was transmitted. When it is confirmed that a mail was transmitted, the mail transmission detecting unit 201 outputs a mail transmission notification to the mail property checking unit 202.

1.3.2 Mail Property Checking Unit 202

The mail property checking unit 202 checks the property of a mail in response to input of a mail transmission notification from the mail transmission detecting unit 201. When checking the mail property, the mail property checking unit 202 checks whether the latest mail in the message database 206 satisfies the contents of a predetermined condition file F800 (see FIG. 8) in the predetermined condition database 207. When the addressee of the latest mail matches a certain addressee recorded in the predetermined condition file F800, and when the transmission time of the latest mail is within a predetermined time zone recorded in the predetermined condition file F800, the predetermined condition is satisfied. When the predetermined condition is satisfied, the mail property checking unit 202 outputs a mail transmission notification to the server notifying unit 203. When a plurality of different addressees are recorded in the predetermined condition file F800, and if the addressee of the latest mail matches at least one of the recorded addressees, the mail property checking unit 202 determines that the latest mail satisfies the predetermined condition regarding the addressee.

1.3.3 Server Notifying Unit 203

The server notifying unit 203 stores the life pattern file F500 in the life pattern database 210 when receiving the life pattern file F500 from the server 100 via the communicating unit 204. Further, in response to input of a mail transmission notification from the mail property checking unit 202, the server notifying unit 203 generates an ON timer notification on the basis of the life pattern file F500 in the life pattern database 210, and transmits the generated ON timer notification to the server 100 via the communicating unit 204.

1.3.4 Communicating Unit 204

The communicating unit 204 transmits, to the server 100, a control start notification indicating start of controlling the household appliance 300, 400, or 500. Further, the communicating unit 204 receives the life pattern file F500 from the server 100.

1.3.5 Timer 205

The timer 205 counts the current time. The timer 205 is used for acquiring the date and time when a mail was transmitted by the mail transmission detecting unit 201.

1.3.6 Message Database 206

The message database 206 stores mails that were transmitted from and received by the portable terminal 200.

1.3.7 Predetermined Condition Database 207

The predetermined condition database 207 stores the predetermined condition file F800, in which information indicating a predetermined time zone that is set in advance by the user, and information indicating an addressee. FIG. 8 is a diagram illustrating an example of the predetermined condition file F800. The predetermined condition file F800 is an example of a first database in which predetermined address information is registered, and a second database in which a predetermined time zone is registered. In the embodiment, the first database and the second database are represented by one predetermined condition file F800. This is merely an example. Alternatively, the predetermined condition file F800 may be divided into two sub files, and predetermined address information may be registered in one of the sub files, and a predetermined time zone may be registered in the other of the sub files. In the example of the predetermined condition file F800 illustrated in FIG. 8, "18:00-20:00" is recorded as the predetermined time zone, and the mail address of wife B and the mail address of daughter C are recorded as the predetermined addressee.

1.3.8 Life Pattern Database 210

The life pattern database 210 stores the life pattern file F500 that is received from the server 100 via the communicating unit 204.

1.3.9 Condition Setting Unit 211

Figure 9A:
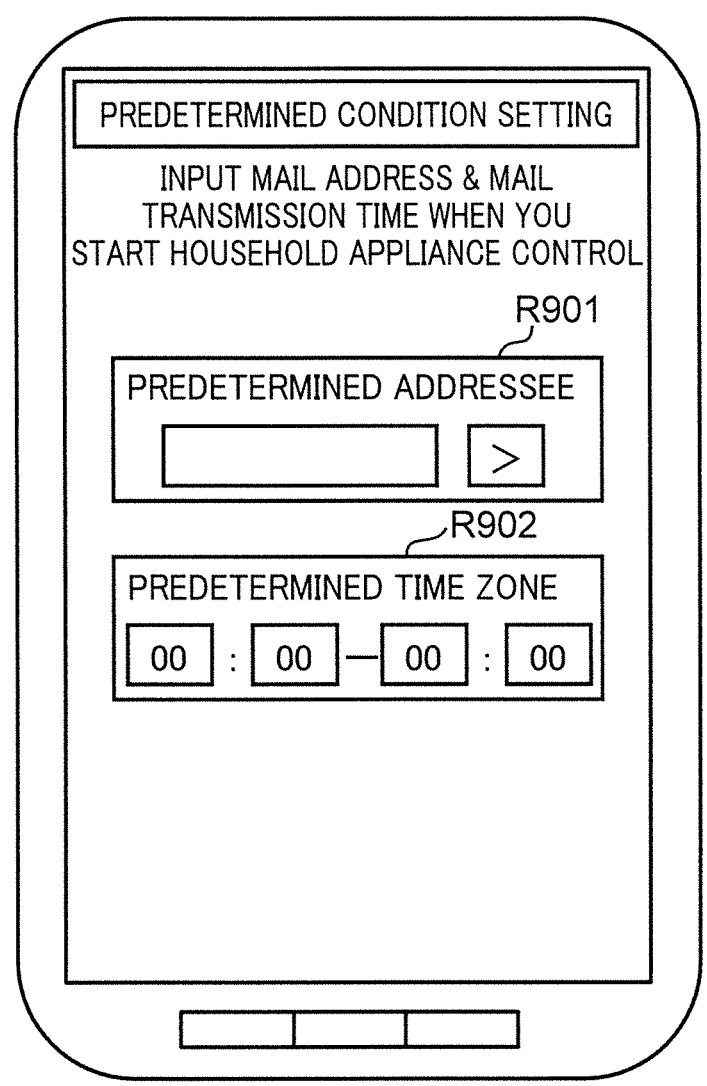
FIG. 9A is a diagram illustrating an example of a predetermined condition setting screen for use when the user inputs a predetermined condition.

The condition setting unit 211 generates a predetermined condition file F800, in which information input by the user through the input unit 212 is recorded as the predetermined condition for use in transmitting a mail transmission notification from the portable terminal 200 to the server 100. The condition setting unit 211 stores the predetermined condition file F800 in the predetermined condition database 207. FIG. 9A is a diagram illustrating an example of a predetermined condition setting screen G900 for use when the user inputs the predetermined condition. An addressee input section R901 for use in inputting a predetermined addressee, and a time zone input section R902 for use in inputting a predetermined time zone are provided in the predetermined condition setting screen G900. The user inputs a predetermined addressee in the addressee input section R901, and inputs a predetermined time zone in the time zone input section R902. When inputting a predetermined addressee and a predetermined time zone, the user may select and input a predetermined address from among the addresses registered in a phonebook provided in the portable terminal 200, or may directly input a predetermined address by operating the input unit 212.

Figure 9B:
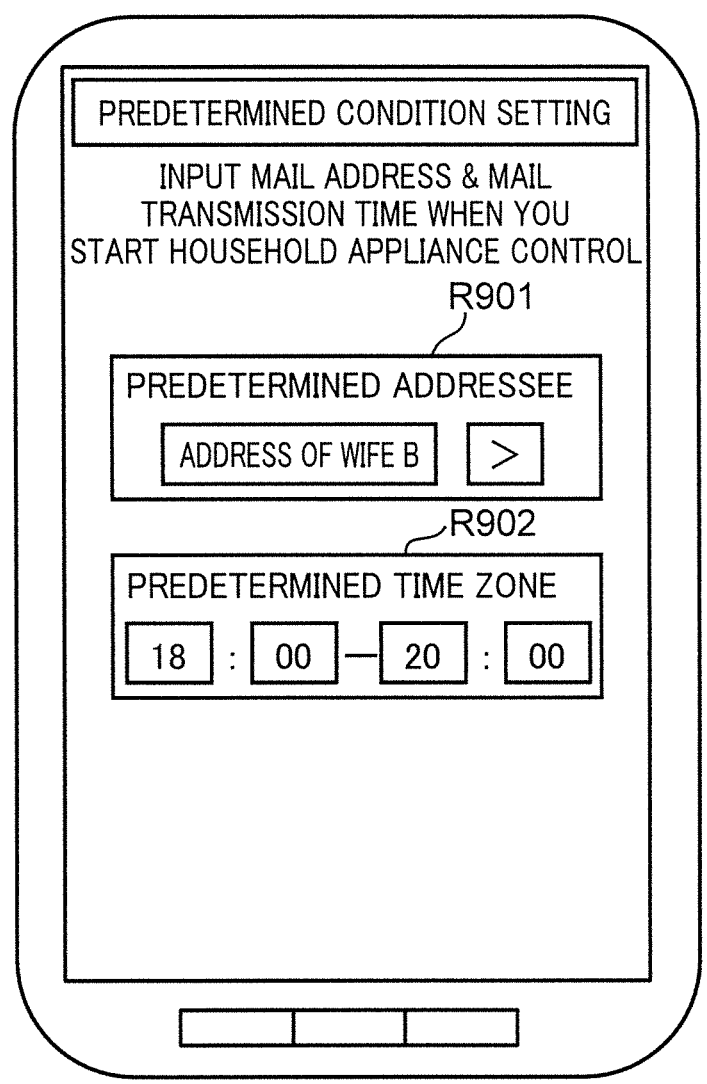
FIG. 9B is a diagram illustrating an example of a predetermined condition setting screen after input.

FIG. 9B is a diagram illustrating an example of a predetermined condition setting screen G900 after input. In the example illustrated in FIG. 9B, the address of wife B is input as the predetermined addressee. Therefore, "WIFE B" is displayed in the addressee input section R901. The time zone from 18:00 to 20:00 is input as the predetermined time zone. Therefore, "18:00-20:00" is displayed in the time zone input section R902.

1.3.10 Input Unit 212

The input unit 212 outputs input contents to the condition setting unit 211 in response to a user's input of the predetermined condition for use in transmitting a mail transmission notification from the portable terminal 200 to the server 100.

1.4 Household Appliance 300

Figure 10:
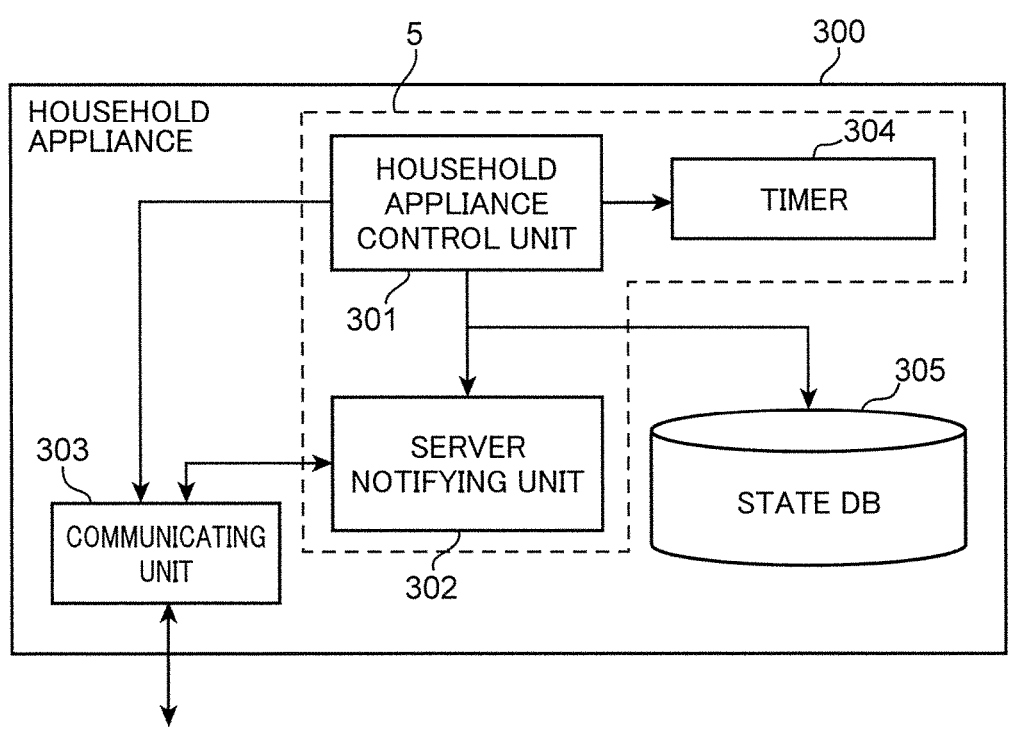
FIG. 10 is a block diagram illustrating a configuration of a household appliance in the household appliance control system in the first embodiment.

FIG. 10 is a block diagram illustrating a configuration of the household appliance 300 in the household appliance control system 10. The configurations of the household appliances 400 and 500 are the same as the configuration of the household appliance 300, and therefore, description of the configurations of the household appliances 400 and 500 is omitted herein. The household appliance 300 is provided with a household appliance control unit 301, a server notifying unit 302, a communicating unit 303, a timer 304, and a state database 305. Alternatively, the household appliance control unit 301, the server notifying unit 302, and the timer 304 may be implemented by providing a controller 4 in the household appliance 300 with the functions of these elements.

1.4.1 Household Appliance Control Unit 301

The household appliance control unit 301 outputs, to the server notifying unit 302, an operation state ON, OFF, or COMPLETE, and the time at which the household appliance 300 is brought to the operation state, together with the name of the household appliance, each time the household appliance 300 is brought to the operation state ON, OFF, or COMPLETE. Specifically, the household appliance control unit 301 outputs, to the server notifying unit 302, information indicating a time at which the operation state of the household appliance 300 has changed, and information indicating an operation state after the change, together with the name of the household appliance 300. Concurrently, the household appliance control unit 301 records the operation state of the household appliance 300 in a state file F110 (see FIG. 11 and FIG. 12) stored in the state database 305.

Further, when the server 110 controls the household appliance, the household appliance control unit 301 receives an ON control signal from the server 100 to start operating the household appliance 300, and changes the state of the state file F110 in the state database 305 to ON. In response to receiving an OFF control signal, the household appliance control unit 301 turns off the household appliance 300, and changes the state of the state file F110 in the state database 305 to OFF. The household appliance control unit 301 outputs a state after the change to the server notifying unit 302, each time the state is changed.

1.4.2 Server Notifying Unit 302

The server notifying unit 302 transmits an operation state of the household appliance 300 after the change, which is input from the household appliance control unit 301, to the server 100 via the communicating unit 303.

1.4.3 Communicating Unit 303

The communicating unit 303 transmits, to the server 100, information indicating a time at which the operation state of the household appliance 300 has changed, and information indicating an operation state after the change. Further, the communicating unit 303 receives an ON control notification and an OFF control notification from the server 100.

1.4.4 Timer 304

The timer 304 counts the current time. The timer 304 is used for acquiring information indicating a time at which the operation state of the household appliance 300 has changed by the household appliance control unit 301.

1.4.5 State Database 305

The state database 305 stores the state file F110, in which the name, an operation state (ON, OFF, or COMPLETE), a current state, and a set state of the household appliance 300 are recorded. FIG. 11 and FIG. 12 are respectively diagrams illustrating an example of the state file F110 in the state database 305.

FIG. 11 illustrates an example of the state file F110 when the household appliance 300 is a water heater. In the example of FIG. 11, the operation state is ON, the current state is a state such that 100 L water at a water temperature of 30° C. is in the bathtub, and the set state is a state such that 160 L water at a water temperature of 39° C. is in the bathtub. In this case, when the current state has reached the set state, the operation state of the household appliance 300 is changed to the operation state COMPLETE.

FIG. 12 illustrates an example of the state file F110 when the household appliance 400 is an air conditioner. In the example of FIG. 12, the operation state is ON, and the current state illustrates that the room temperature is 8° C. FIG. 12 illustrates that a flag indicating setting of the current operation mode such as warming or cooling is set, and the setting of the current operation mode is warming. FIG. 12 illustrates that the set state of warming is such that the room temperature is 20° C., the air volume is strong, and the wind direction is automatic. In this state, when the room temperature indicated by the current state has reached the room temperature indicated by the set state, the operation state of the household appliance 400 is changed to the operation state COMPLETE.

1.5 Operations of Household Appliance Control System 10

The operations of the household appliance control system 10 include three operations, specifically, condition setting, generation of a life pattern file F500, and household appliance control on the basis of a generated life pattern file F500. Condition setting designates an operation of storing the input contents in the predetermined condition database 207 when the user sets the predetermined condition for use in transmitting a mail transmission notification from the portable terminal 200 to the server 100. Generation of a life pattern file F500 designates analyzing ON and OFF timings of the household appliance 300 and the like by the user on daily basis, generating a life pattern file F500 of the user, and storing the life pattern file F500 in the life pattern database 109 of the server 100. Household appliance control on the basis of a generated life pattern file F500 designates controlling the household appliance 300 and the like by the server 100 on the basis of a generated life pattern file F500. In the following, the three operations are described referring to the drawings.

1.5.1 Condition Setting

Figure 13:
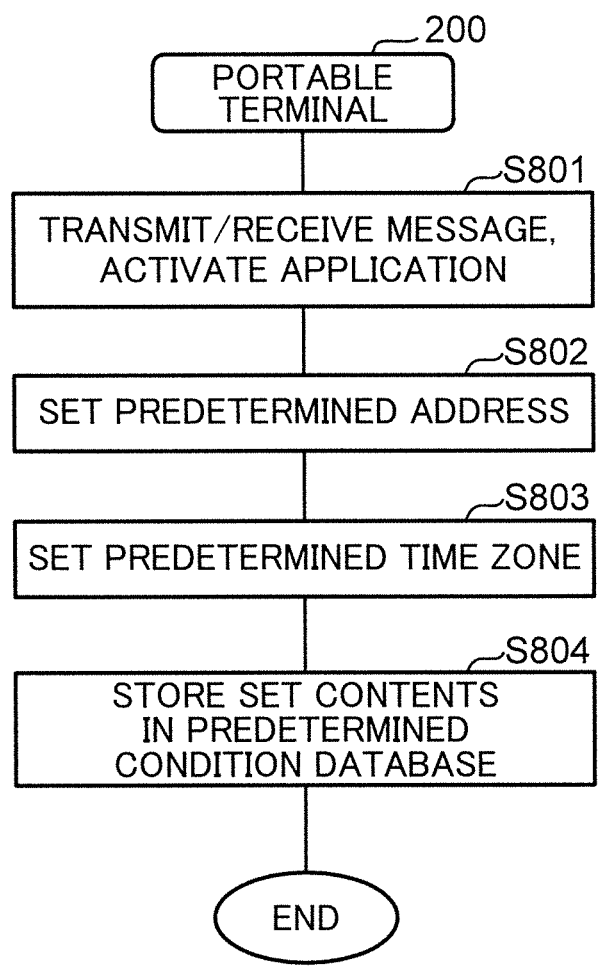
FIG. 13 is a flowchart illustrating a condition setting operation to be performed in the household appliance control system in the first embodiment.

FIG. 13 is a flowchart illustrating a condition setting operation to be performed in the household appliance control system 10.

The portable terminal 200 activates the message transmitting/receiving application 215 (Step S801). Subsequently, the condition setting unit 211 of the portable terminal 200 sets a predetermined addressee in response to a user's input through the input unit 211 (Step S802). Subsequently, the condition setting unit 211 of the portable terminal 200 sets a predetermined time zone in response to a user's input through the input unit 212 (Step S803). Subsequently, the condition setting unit 211 of the portable terminal 200 stores the predetermined condition file F800 recorded with the set contents in the predetermined condition database 207 (Step S804).

1.5.2 Generation of Life Pattern File

Figure 14:
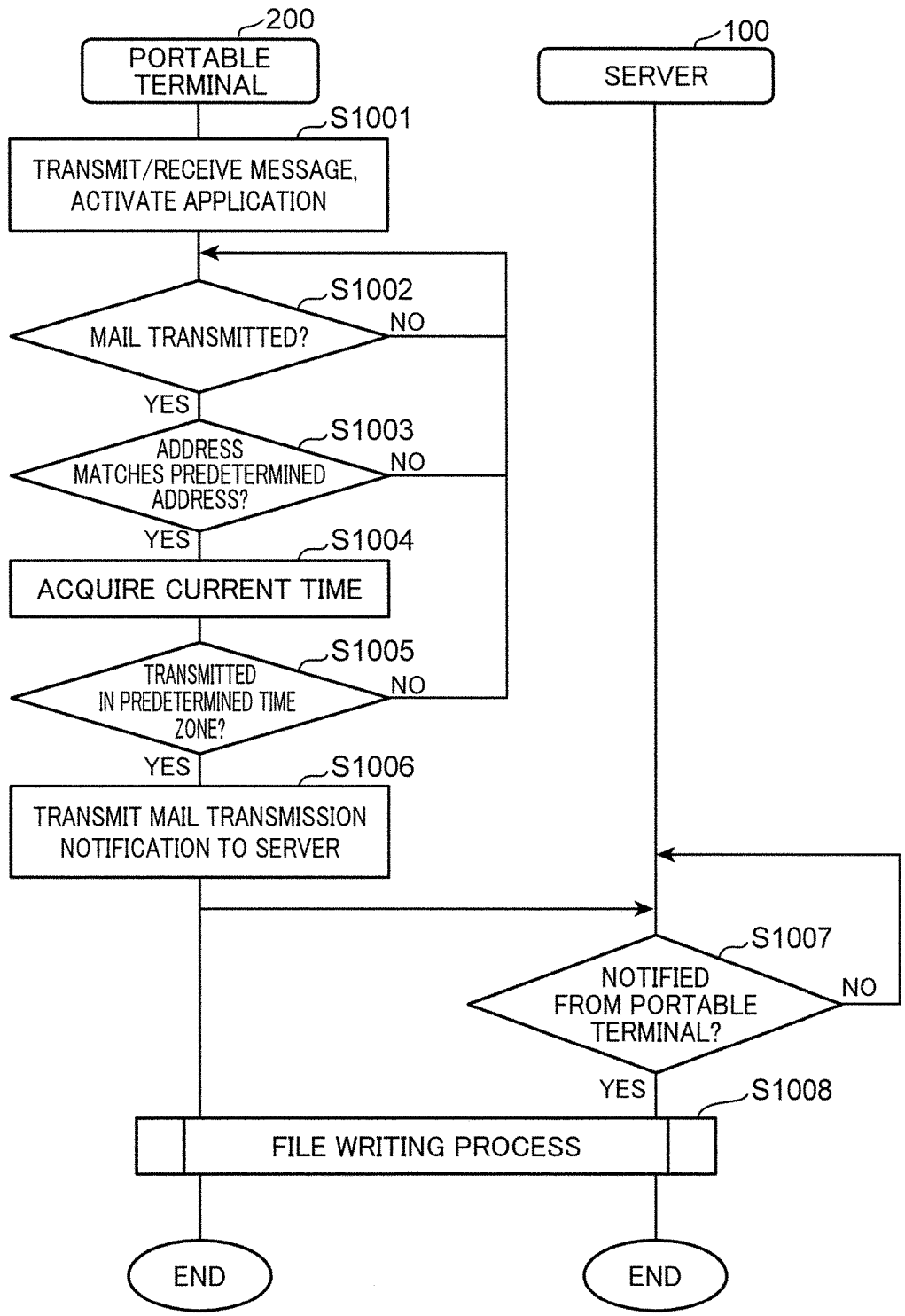
FIG. 14 is a sequence diagram illustrating a life pattern file generating operation to be performed when a mail is transmitted in the first embodiment.

An operation of generating a life pattern file F500 when a mail is transmitted in the household appliance control system 10 is described using the sequence diagram illustrated in FIG. 14. Further, an operation to be performed after a mail is transmitted is described using the sequence diagrams illustrated in FIG. 18 and FIG. 19. FIG. 14 illustrates that an operation state of the household appliance is recorded after the portable terminal 200 transmits a mail. Alternatively, all the operation states of the household appliance for a day may be recorded.

FIG. 14 is a sequence diagram illustrating an operation of generating a life pattern file F500 when a mail is transmitted. The analyzing unit 102 of the server 100 collects the times at which mails are transmitted from the portable terminal 200, and analyzes the life pattern.

The portable terminal 200 activates the message transmitting/receiving application 215 (Step S1001). The mail transmission detecting unit 201 of the portable terminal 200 checks whether a mail was transmitted (Step S1002). When it is impossible to confirm that a mail was transmitted (NO in Step S1002), the portable terminal 200 checks whether a mail was transmitted in Step S1002. When it is confirmed that a mail was transmitted (YES in Step S1002), the mail property checking unit 202 checks whether the addressee of the transmitted mail matches a predetermined addressee recorded in the predetermined condition file F800 (Step S1003).

When the addressee of the transmitted mail does not match the predetermined addressee (NO in Step S1003), the portable terminal 200 checks whether a mail was transmitted in Step S1002. When the addressee matches the predetermined addressee (YES in Step S1003), the mail property checking unit 202 acquires the current time to be measured by the timer 205 as the transmission time of the mail (Step S1004). Subsequently, the mail property checking unit 202 checks whether the mail transmission time is within the predetermined time zone recorded in the predetermined condition file F800 (Step S1005). Specifically, the mail property checking unit 202 compares the current time acquired in Step S1004 with the predetermined time zone recorded in the predetermined condition file F800.

When the current time acquired in Step S1004 is not within the predetermined time zone (NO in Step S1005), the portable terminal 200 checks whether a mail was transmitted in Step S1002. When the current time is within the predetermined time zone (YES in Step S1005), the server notifying unit 203 of the portable terminal 200 transmits a mail transmission notification to the server 100 (Step S1006).

The collecting unit 101 of the server 100 checks whether there is a mail transmission notification from the portable terminal 200 (Step S1007). FIG. 15 illustrates an example of a data configuration of a mail transmission notification to be transmitted from the portable terminal 200 to the server 100.

FIG. 15 is a diagram illustrating an example of a data configuration of notification data 1500 to be transmitted and received between the devices in the household appliance control system. The upper row in FIG. 15 illustrates a general data configuration of the notification data 1500, and the lower row in FIG. 15 illustrates a data configuration of the notification data 1500 to be used as a mail transmission notification.

As illustrated in the upper row in FIG. 15, the notification data 1500 to be used in the household appliance control system is provided with "DEVICE NAME", "TYPE OF NOTIFICATION", and "TIME". The name of the device as a transmission source of the notification data 1500 is described in "DEVICE NAME". In this example, household appliances and the portable terminal 200 are included in the device. Therefore, the identifier of the household appliance and the identifier of the portable terminal are described as "DEVICE NAME". The type of the notification data 1500 is described in "TYPE OF NOTIFICATION". The transmission time of the notification data 1500 is described in "TIME". In this example, a mail transmission notification transmitted at 18:10 is illustrated in the lower row in FIG. 15. Therefore, "PORTABLE TERMINAL" is described in "HOUSEHOLD APPLIANCE NAME", "MAIL TRANSMITTED" is described in "TYPE OF NOTIFICATION", and "18:10" is described in "TIME".

When a mail transmission notification was not received from the portable terminal 200 (NO in Step S1007), the collecting unit 101 of the server 100 returns the process to Step S1007, and checks whether a mail transmission notification was received. When a mail transmission notification is received from the portable terminal 200 (YES in Step S1007), the portable terminal 200 and the server 100 perform a file writing process (Step S1008). The file writing process is a process of writing a change in the state of a household appliance and a time at which the change has occurred in the day-based household appliance control file F400 within the day-based household appliance control database 108.

Figure 16:
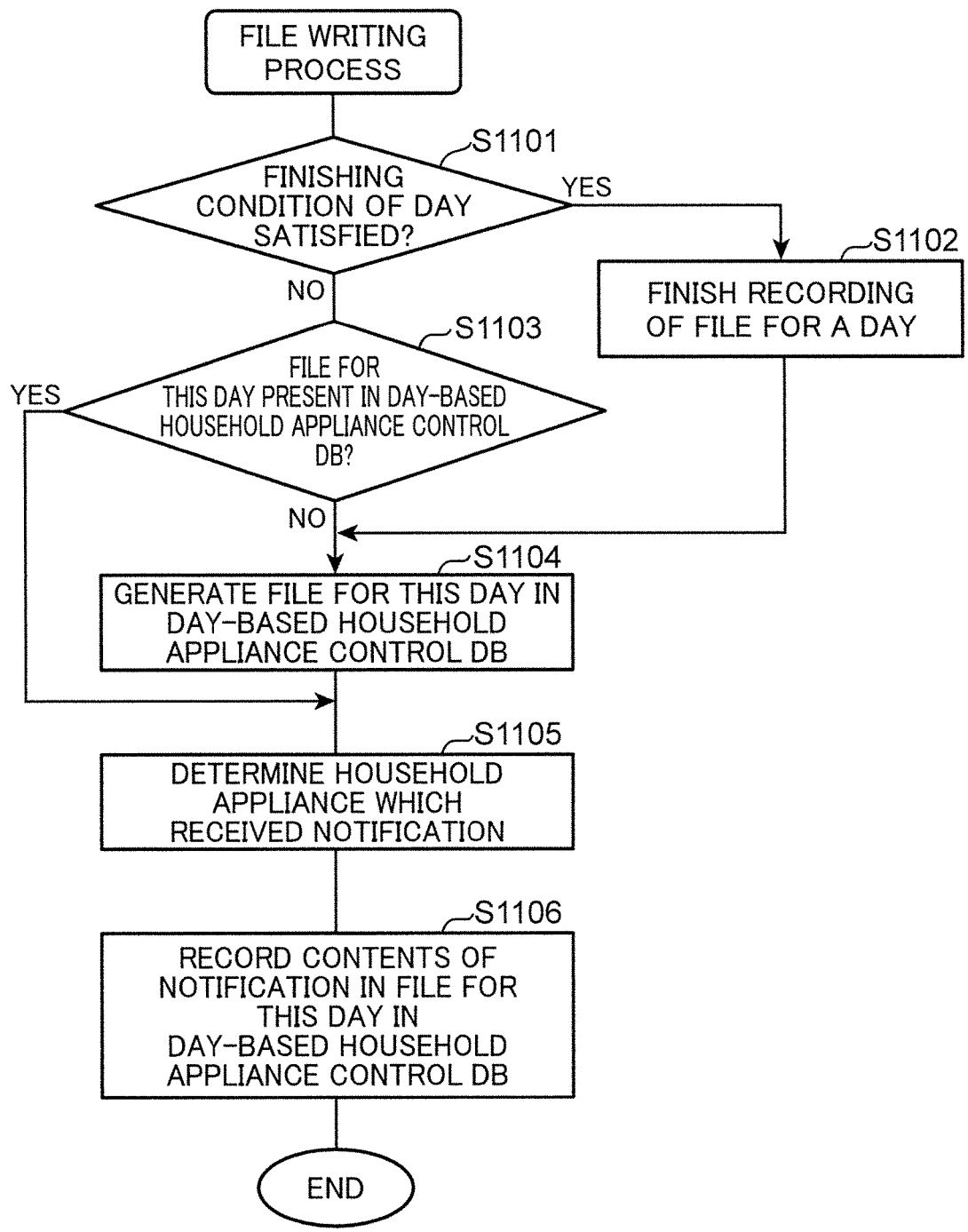
FIG. 16 is a flowchart illustrating a file writing process.

FIG. 16 is a flowchart illustrating the file writing process.

The collecting unit 101 of the server 100 checks whether the finishing condition of a day is satisfied (Step S1101). When the finishing condition of a day is satisfied (YES in Step S1101), the collecting unit 101 finishes recording for the day in the day-based household appliance control file F400 (Step S1102). Subsequently, the collecting unit 101 generates a day-based household appliance control file F400 for this day in the day-based household appliance control database 108, and the process proceeds to Step S1105.

When the finishing condition of a day is not satisfied (NO in Step S1101), the collecting unit 101 checks whether the day-based household appliance control file 400 for this day is within the day-based household appliance control database 108 (Step S1103). When the day-based household appliance control file F400 for this day is not within the day-based household appliance control database 108 (NO in Step S1103), the collecting unit 101 generates a day-based household appliance control file F400 for this day in the day-based household appliance control database 108 (Step S1104). In this way, a day-based household appliance control file F400 for use in recording the operation states of a device for a day is generated.

When a day-based household appliance control file for this day is within the day-based household appliance control database 108 (YES in Step S1103), or after a day-based household appliance control file for this day is generated in the day-based household appliance control database 108 (Step S1104), the collecting unit 101 determines the device which transmitted the notification data 1500 (Step S1105).

For instance, as illustrated in FIG. 15, the collecting unit 101 determines the device that transmitted the notification data 1500 and the operation state of the device from the information described in "DEVICE NAME" and in "TYPE OF NOTIFICATION" to be included in the notification data 1500. The identifier such as the ID attached to each of the devices may be described in "DEVICE NAME" to be included in the notification data 1500. The collecting unit 101 records "DEVICE NAME", "OPERATION STATE (MAIL TRANSMITTED, ON, OFF or COMPLETE)", and "TIME" of the device which transmitted the notification data 1500 in the day-based household appliance control file F400 for this day in the day-based household appliance control database 108 (Step S1106). In this way, the day-based household appliance control file F400 as illustrated in FIG. 4 is generated.

FIG. 17A is a diagram illustrating an example of the life of the user A. As illustrated in FIG. 17A, the time when the user A returns home is around 19:00 when the user returns home early, and is around 21:00 when the user returns home late. The user A sends a mail to wife B or to daughter C every day when the user transfers at the transfer station i.e. at station S. It takes thirty minutes from Station S to station T nearest to his house by train, and then, it takes fifteen minutes to his house on foot. Wife B calculates the time when the user A returns home, and controls the household appliances according to the behavior of the user A after the user returns home.

FIG. 17B illustrates an example when the user returns home early. The user A sends a mail to wife B from Station S at 18:10. Wife B turns on the water heater at 18:35 to fill the bathtub with hot water. Then, wife B starts cooking rice using the rice cooker. The user A returns home at 18:55, and takes a bath at 19:00. Rice is cooked at the same time when the user finishes taking a bath at 19:30. They take supper at 19:35.

Figure 18:
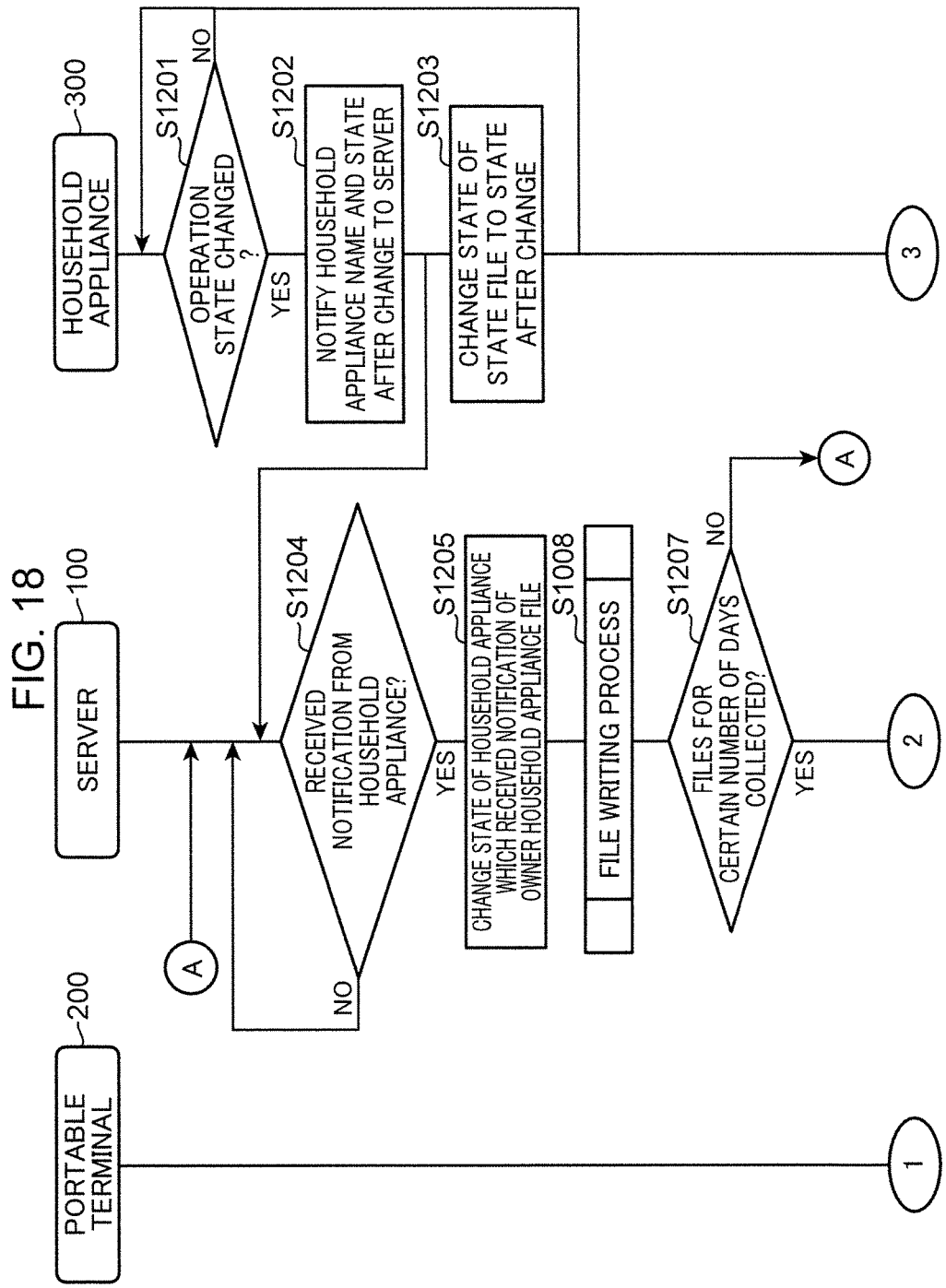
FIG. 18 is a sequence diagram illustrating a first half of a life pattern file generating operation after a mail is transmitted.
Figure 19:
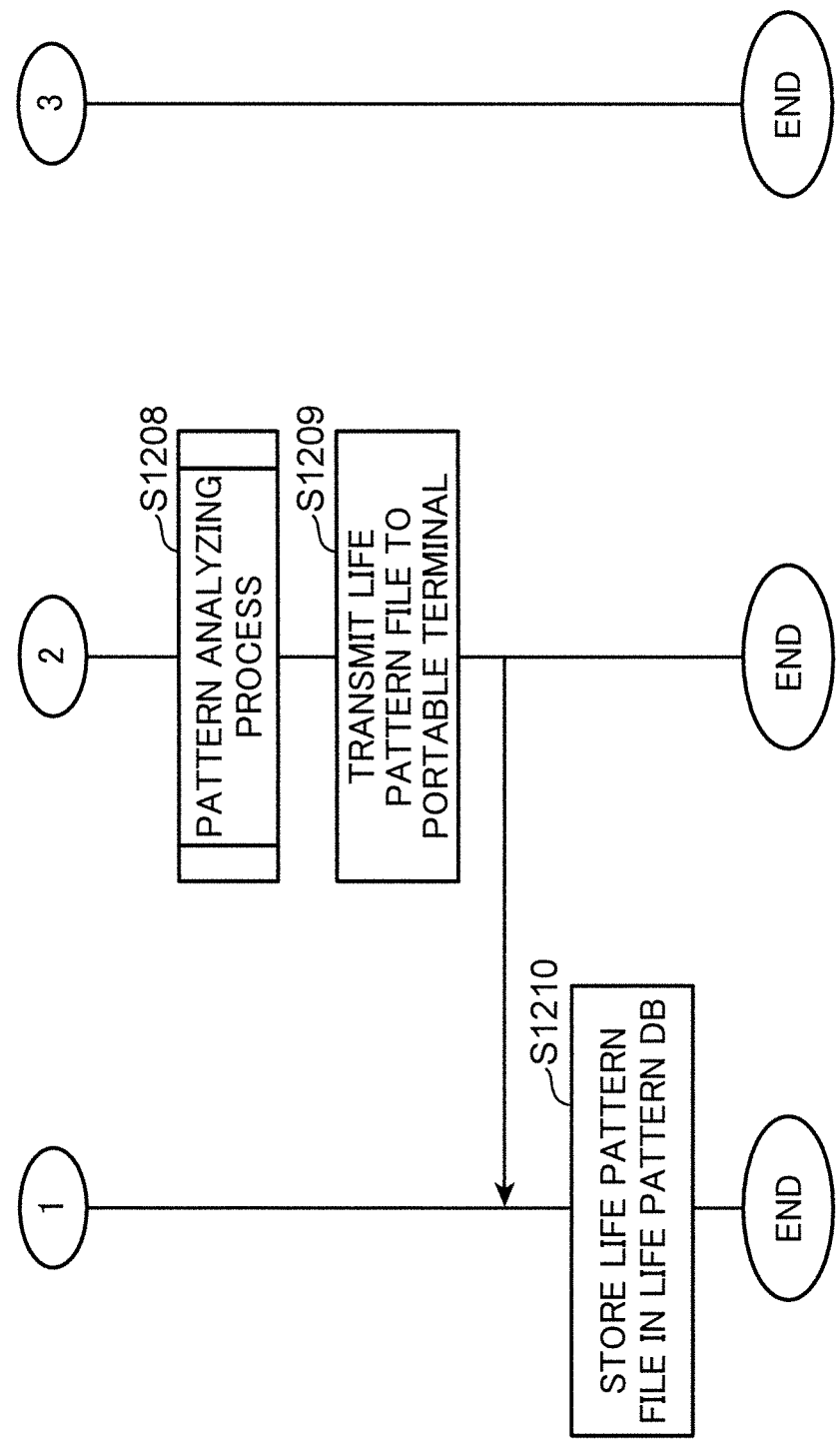
FIG. 19 is a sequence diagram illustrating a second half of the life pattern file generating operation after a mail is transmitted.

FIG. 18 and FIG. 19 are sequence diagrams illustrating an operation of generating a life pattern file F500 after a mail is transmitted. The analyzing unit 102 of the server 100 collects the states ON, OFF, and COMPLETE, and the times at which the operation state of the household appliance has changed to the respective states from the household appliance 300 and the like, and analyzes the life pattern. In this example, the analyzing unit 102 collects data from the household appliance 300.

The household appliance control unit 301 of the household appliance 300 checks whether the operation state has changed (Step S1201). The operation state is one of ON, OFF, and COMPLETE. When the operation state has not changed (NO in Step S1201), the household appliance control unit 301 checks whether the operation has changed in Step S1201. When the operation state has changed (YES in Step S1201), the household appliance control unit 301 notifies the server 100 of the notification data 1500 including "DEVICE NAME", "OPERATION STATE" after the change, and the time at which the change has occurred (Step S1202). Subsequently, the household appliance control unit 301 changes the state of the state file F110 in the state database 305 to the state after the change (Step S1203).

FIG. 20 is a diagram illustrating an example of a data configuration of the notification data 1500 to be transmitted from the household appliance 300 to the server 100. The notification data 1500 to be transmitted from the household appliance 300 to the server 100 is provided with "DEVICE NAME", "TYPE OF NOTIFICATION", and "TIME" as well as the notification data 1500 (see FIG. 15) to be transmitted from the portable terminal 200 to the server 100. The example of the upper row in FIG. 20 illustrates the notification data 1500 when the water heater is turned on at 18:35. Therefore, "WATER HEATER" is described in "HOUSEHOLD APPLIANCE DEVICE, "ON" is described in "TYPE OF NOTIFICATION", and "18:35" is described in "TIME". Further, the example of the lower row in FIG. 20 illustrates the notification data 1500 when the rice cooker is turned on at 18:45. Therefore, "RICE COOKER" is described in "DEVICE NAME", "ON" is described in "TYPE OF NOTIFICATION", and "18:45" is described in "TIME".

Referring back to FIG. 18, the collecting unit 101 of the server 100 checks whether the communicating unit 106 received the notification data 1500 from the household appliance 300 (Step S1204). When the communicating unit 106 did not receive the notification data 1500 from the household appliance 300 (NO in Step S1204), the collecting unit 101 returns the process to Step S1204, and checks whether the notification data 1500 was transmitted from the household appliance 300. When the notification data 1500 was transmitted from the household appliance 300 (YES in Step S1204), the collecting unit 101 changes the operation state of the household appliance 300 which transmitted the notification data 1500 in the owner household appliance file F300 within the owner household appliance database 107 (Step S1205).

Subsequently, the collecting unit 101 performs a file writing process (see FIG. 16) (Step S1008). Subsequently, the collecting unit 101 checks whether day-based household appliance control files F400 for a certain number of days were collected (Step S1207). When day-based household appliance control files F400 for a certain number of days were not collected (NO in Step S1207), the process returns to Step S1204. When day-based household appliance control files F400 for a certain number of days were collected (YES in Step S1207), the analyzing unit 102 of the server 100 performs a pattern analyzing process (Step S1208). Subsequently, the analyzing unit 102 transmits, to the portable terminal 200, a life pattern file F500 generated by the pattern analyzing process (Step S1209).

Subsequently, the server notifying unit 203 of the portable terminal 200 stores the life pattern file F500 transmitted from the server 100 in the life pattern database 210 (Step S1210).

Figure 21:
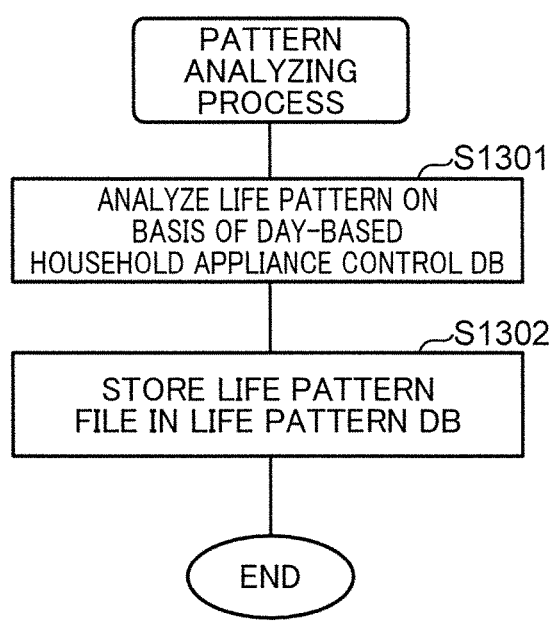
FIG. 21 is a flowchart illustrating a pattern analyzing process.

FIG. 21 is a flowchart illustrating the pattern analyzing process illustrated in FIG. 19.

The analyzing unit 102 of the server 100 analyzes the life pattern on the basis of the day-based household appliance control file F400 in the day-based household appliance control database 108 (Step S1301). Subsequently, the analyzing unit 102 generates a life pattern file F500 from the analysis result, and stores the generated life pattern file F500 in the life pattern database 109 (Step S1302).

In the following, an example of generating a life pattern file F500 is described using the day-based household appliance control file F400 illustrated in FIG. 4. FIG. 4 illustrates the day-based household appliance control file F400 on Feb. 21, 2013. When day-based household appliance control file F400 for a certain number of days were collected as described above, the pattern analyzing process is executed. First of all, when day-based household appliance control files F400 for a certain number of days were collected, the analyzing unit 102 obtains a control start time period on the basis of a mail transmission time as a reference, and obtains a COMPLETE required time period from each of the collected day-based household appliance control files F400. In the example of FIG. 4, regarding the water heater, the mail transmission time is 18:10, and the time at which the water heater is turned on is 18:35. Therefore, the control start time period is calculated to be twenty-five minutes. Further, the water heater is brought to an operation state ON at 18:35, and is brought to an operation state COMPLETE at 18:55. Therefore, the COMPLETE required time period is calculated to be twenty minutes. Further, regarding the rice cooker, the mail transmission time is 18:10, and the rice cooker is brought to an operation state ON at 18:45. Therefore, the control start time period is calculated to be thirty-five minutes. Further, the rice cooker is brought to an operation state ON at 18:45, and is brought to an operation state COMPLETE at 19:30. Therefore, the COMPLETE required time period is calculated to be forty-five minutes. Further, regarding the illumination device 2, the mail transmission time is 18:10, and the illumination device 2 is brought to an operation state ON at 19:00. Therefore, the control start time period is calculated to be fifty minutes.

Next, the analyzing unit 102 obtains frequencies of a COMPLETE required time period and of a control start time period for each of the household appliances. Then, the analyzing unit 102 writes the COMPLETE required time period and the control start time period whose frequencies are largest in the life pattern file F500 illustrated in FIG. 5. In the example of FIG. 5, a COMPLETE required time period and a control start time period whose frequencies are largest are written for each of the water heater and the rice cooker.

1.5.3 Household Appliance Control Based on Generated Life Pattern File

Figure 22:
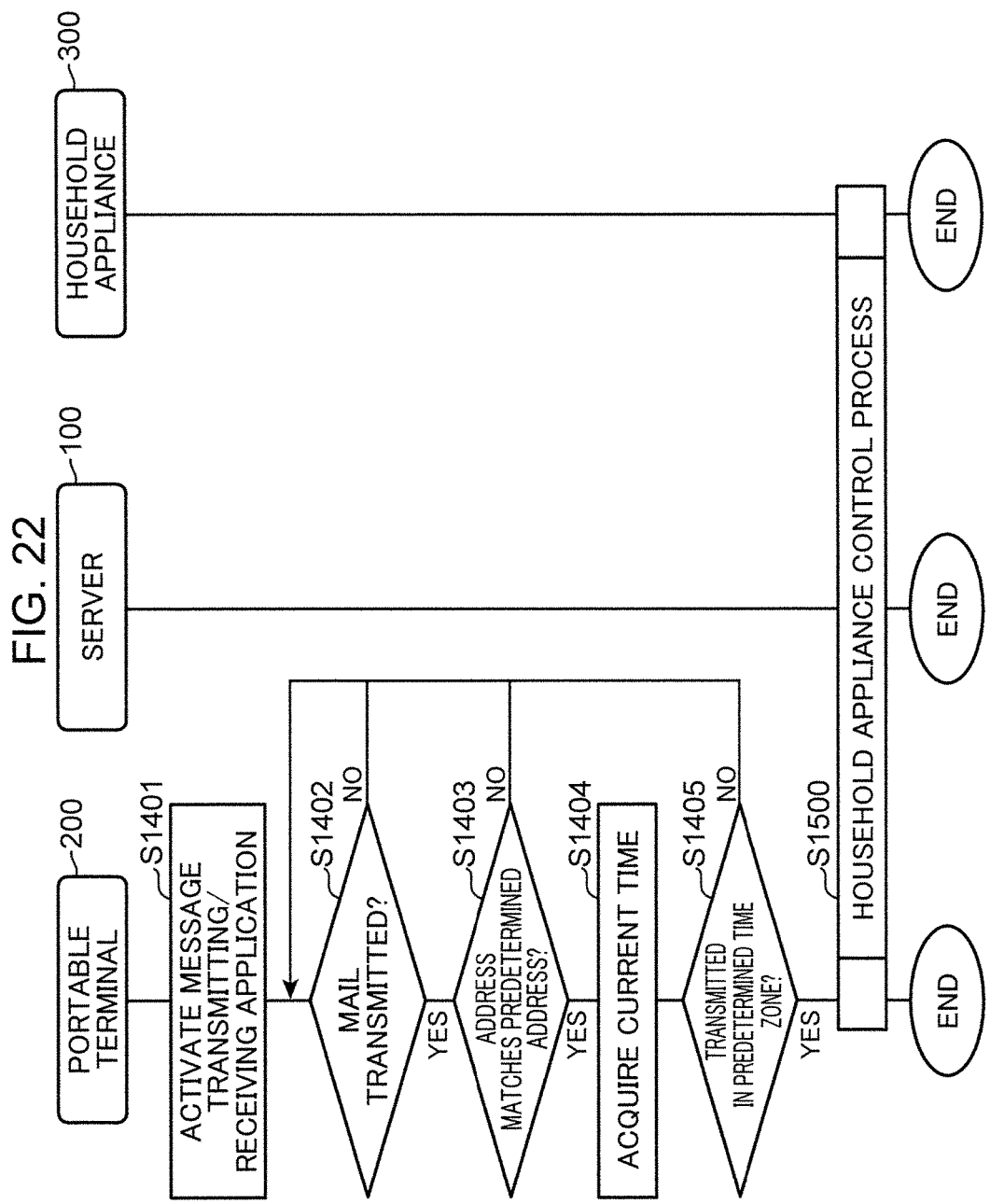
FIG. 22 is a sequence diagram illustrating a household appliance control operation on the basis of a generated life pattern file in the household appliance control system.

FIG. 22 is a sequence diagram illustrating a household appliance control operation to be performed on the basis of a generated life pattern file F500 in the household appliance control system 10.

The portable terminal 200 activates the message transmitting/receiving application 215 (Step S1401). Subsequently, the mail transmission detecting unit 201 of the portable terminal 200 checks whether a mail was transmitted (Step S1402). When it is impossible to confirm that a mail was transmitted (NO in Step S1402), the mail transmission detecting unit 201 checks whether a mail was transmitted in Step S1402. When it is confirmed that a mail was transmitted (YES in Step S1402), the mail property checking unit 202 of the portable terminal 200 checks whether the addressee of the transmitted mail matches the predetermined addressee recorded in the predetermined condition file F800 (Step S1403). When the addressee of the transmitted mail does not match the predetermined addressee (NO in Step S1403), the portable terminal 200 checks whether a mail was transmitted in Step S1402.

When the addressee matches the predetermined addressee (YES in Step S1403), the mail property checking unit 202 acquires the current time to be measured by the timer 205 as the transmission time of the mail (Step S1404). Subsequently, the mail property checking unit 202 checks whether the mail transmission time is within the predetermined time zone recorded in the predetermined condition file F800 (Step S1405). When the mail transmission time is not within the predetermined time zone (NO in Step S1405), the portable terminal 200 checks whether a mail was transmitted in Step S1402. When the mail transmission time is within the predetermined time zone (YES in Step S1405), the portable terminal 200, the server 100, and the household appliance 300 perform a household appliance control process (Step S1500).

Figure 23:
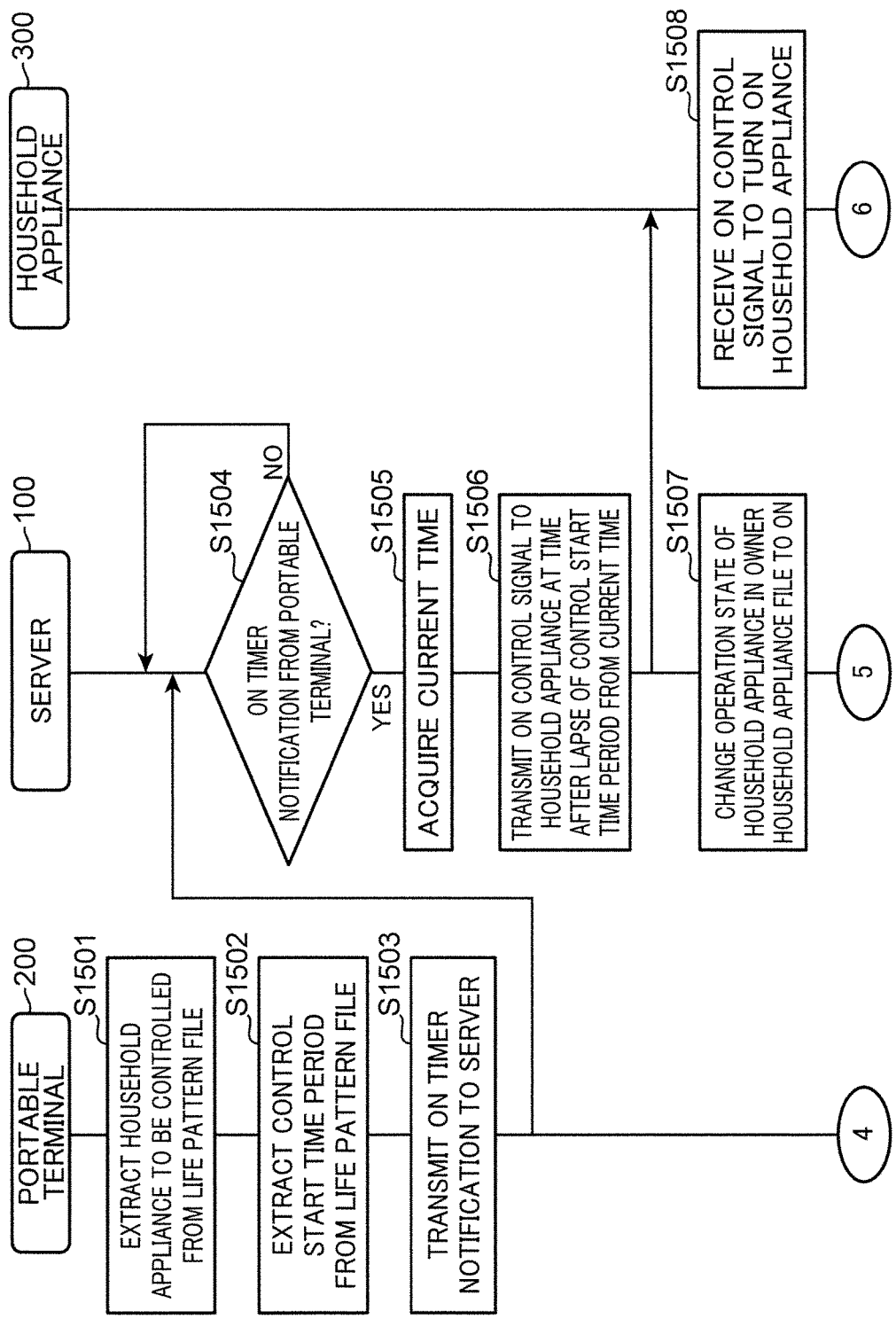
FIG. 23 is a sequence diagram illustrating a first half of a household appliance control process.
Figure 24:
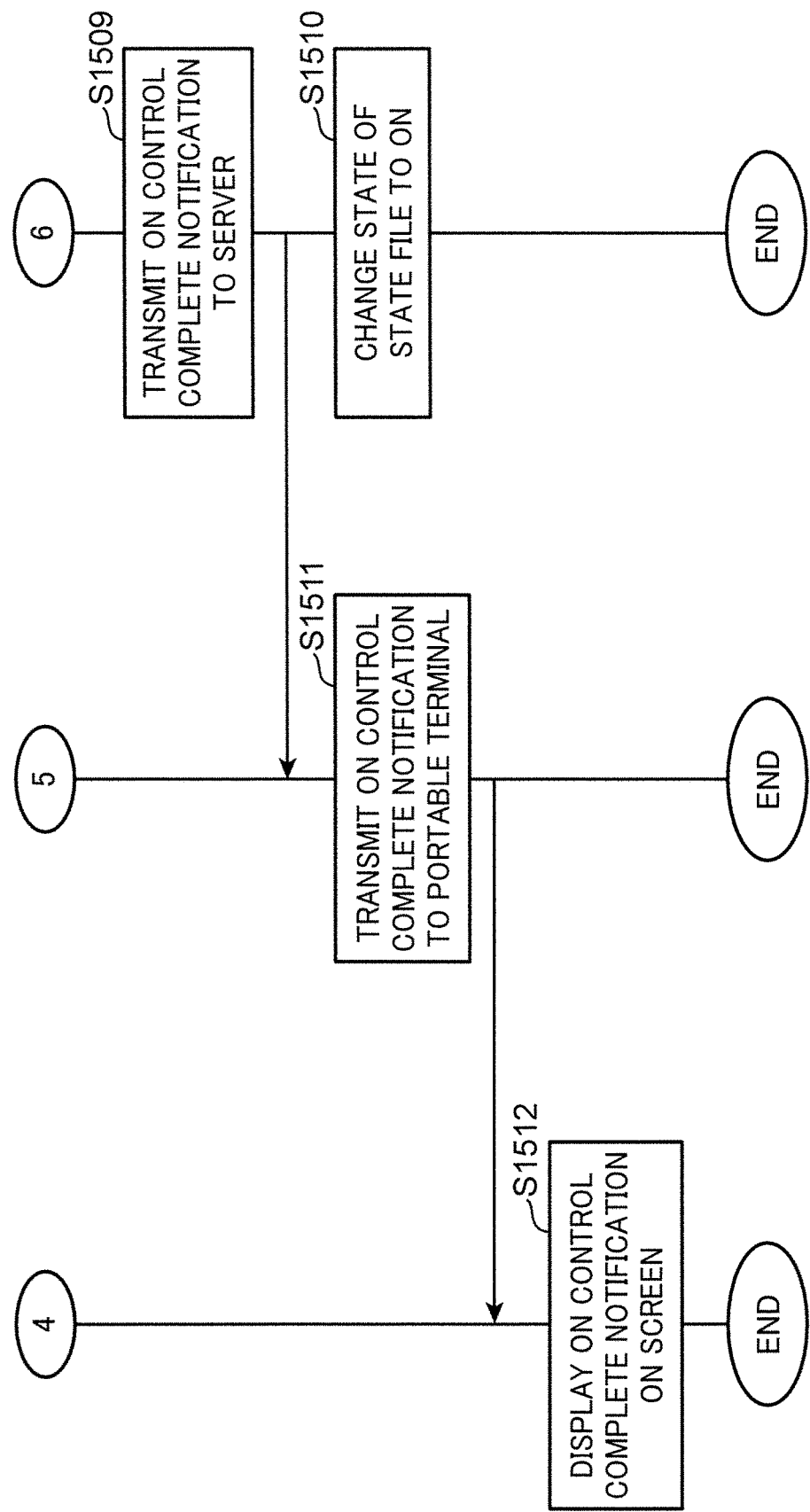
FIG. 24 is a sequence diagram illustrating a second half of the household appliance control process.

The household appliance control process is described using the sequence diagrams illustrated in FIG. 23 and FIG. 24. FIG. 23 and FIG. 24 are sequence diagrams illustrating the household appliance control process.

The condition setting unit 211 of the portable terminal 200 extracts a household appliance to be controlled, referring to the life pattern file F500 (Step S1501). Subsequently, the condition setting unit 211 extracts the control start time period of the extracted household appliance, referring to the life pattern file F500 (Step S1502). Subsequently, the portable terminal 200 transmits an ON timer notification to the server 100 (Step S1503).

FIG. 25A is a diagram illustrating an example of a data configuration of an ON timer notification 2500 to be transmitted from the portable terminal 200 to the server 100. The ON timer notification 2500 is an example of a control command. The upper row in FIG. 25A illustrates a general data configuration of the ON timer notification 2500, and the lower row in FIG. 25A illustrates a data configuration of the ON timer notification 2500 when the water heater is turned on 25 minutes later.

The ON timer notification 2500 is provided with "DEVICE NAME", "TYPE OF NOTIFICATION", "CONTROL START TIME PERIOD", "SET TEMPERATURE", and "HOUSEHOLD APPLIANCE TO BE TURNED ON". The name of the household appliance as a transmission source is described in "DEVICE NAME". Information indicating the type of the notification is described in "TYPE OF NOTIFICATION". In this example, the type of the notification is an ON timer notification. Therefore, "ON TIMER NOTIFICATION" is described in "TYPE OF NOTIFICATION". "CONTROL START TIME PERIOD" describes a time period, in other words, how many minutes, it takes to start household appliance control. The temperature of water to be supplied to the bathtub is described in "SET TEMPERATURE". "HOUSEHOLD APPLIANCE TO BE TURNED ON" describes a household appliance to be controlled, namely, a household appliance that receives an ON timer notification 2500. The lower row in FIG. 15 illustrates an ON timer notification 2500 to be transmitted from the portable terminal 200, which notifies that the water heater is turned on 25 minutes later, and water of 39° C. is supplied. Therefore, "PORTABLE TERMINAL" is described in "HOUSEHOLD APPLIANCE NAME", "ON TIMER NOTIFICATION" is described in "TYPE OF NOTIFICATION", "25" is described in "CONTROL START TIME PERIOD", "39° C." is described in "SET TEMPERATURE", and "WATER HEATER" is described in "HOUSEHOLD APPLIANCE TO BE TURNED ON".

Referring back to FIG. 23, the setting unit 104 of the server 100 checks whether an ON timer notification was transmitted from the portable terminal 200 (Step S1504). When it is impossible to confirm that an ON timer notification was transmitted (NO in Step S1504), the server 100 checks whether an ON timer notification was transmitted in Step S1504. When it is confirmed that an ON timer notification was transmitted (YES in Step S1504), the setting unit 104 acquires the current time to be measured by the timer 105 (Step S1505). Subsequently, the server 100 transmits an ON control signal to the household appliance indicated by "HOUSEHOLD APPLIANCE TO BE TURNED ON" in the ON timer notification after elapse of the control start time period indicated by "CONTROL START TIME PERIOD" in the ON timer notification from the current time acquired in Step S1505 (Step S1506). In the example of the ON timer notification 2500 in the lower row in FIG. 25A, the setting unit 104 transmits an ON control signal to the water heater 25 minutes later from the current time acquired in Step S1505. Alternatively, a communication address of each of the household appliances may be recorded in advance in the owner household appliance file F300, and the setting unit 104 may specify the communication address of the water heater from the owner household appliance file F300. Subsequently, the setting unit 104 changes the state of the household appliance 300 in the owner household appliance file F300 within the owner household appliance database 107 to ON (Step S1507). In the aforementioned example of the water heater, the operation state of the water heater in the owner household appliance F300 illustrated in FIG. 3 is changed from OFF to ON.

The household appliance control unit 301 of the household appliance 300 receives an ON control signal through the communication unit 303, and turns on the household appliance 300 (Step S1508). The household appliance 300 transmits an ON control complete notification to the server 100 (Step S1509). Subsequently, the household appliance 300 changes the state of the state file F110 (see FIG. 11 and FIG. 12) in the state database 305 to ON (Step S1510). In the example of the state file F110 illustrated in FIG. 11, "OPERATION STATE" is changed to ON, and the current state (current water level, current temperature) is changed to (0 L, 25° C.), for instance.

Subsequently, the setting unit 104 of the server 100 transmits the ON control complete notification received from the household appliance 300 to the portable terminal 200 (Step S1511).

FIG. 26 is a diagram illustrating an example of a data configuration of notification data 2600 to be transmitted from the household appliance 300 to the server 100. The upper row in FIG. 26 illustrates a general data configuration of the notification data 2600, and the lower row in FIG. 26 illustrates a data configuration of the notification data 2600 when the water heater is turned on. The notification data 2600 is provided with "HOUSEHOLD APPLIANCE NAME" and "TYPE OF NOTIFICATION". The name of a household appliance to be controlled is described in "HOUSEHOLD APPLIANCE NAME", and data representing the type of the notification data 2600 is described in "TYPE OF NOTIFICATION". The lower row in FIG. 26 illustrates the notification data 2600 when the water heater is turned on. Therefore, "WATER HEATER" is described in "HOUSEHOLD APPLIANCE NAME", and "ON CONTROL COMPLETE" is described in "TYPE OF NOTIFICATION".

The communicating unit 204 of the portable terminal 200 receives an ON control complete notification from the server 100, and displays a screen notifying the ON control complete notification on the display (Step S1512).

Figure 27B:
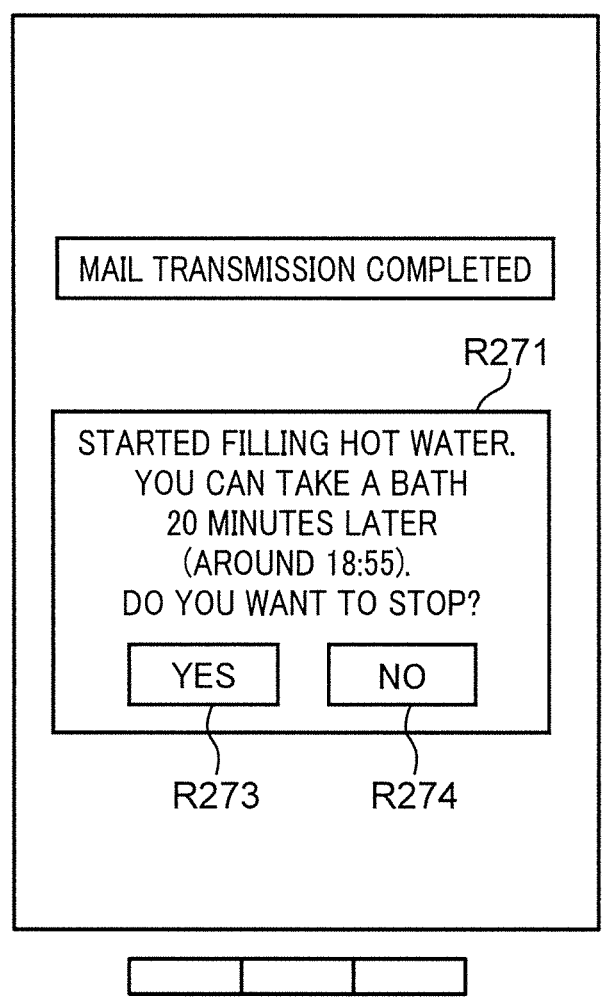
FIG. 27B is a diagram illustrating an example of a confirmation screen.

In response to receiving an ON control complete notification, the portable terminal 200 may display, on the display, a confirmation screen, in which information indicating that transmission of a mail was completed, and information indicating start of household appliance control on the basis of a generated life pattern file F500, as confirmation for the user. FIG. 27B is a diagram illustrating an example of a confirmation screen G272. For instance, it is assumed that a life pattern file F500 is generated so as to start filling hot water on the basis of a transmission time of a mail, and household appliance control is performed on the basis of the life pattern file F500. In this case, when the control start time period has elapsed after the portable terminal 200 transmitted a mail that satisfies the predetermined condition, the confirmation screen G272 illustrated in FIG. 27B is displayed on the display. The upper part of the confirmation screen G272 describes "MAIL TRANSMISSION COMPLETED". This clearly notifies the user that transmission of a mail has completed. A display section R271 describing "STARTED FILLING HOT WATER. YOU CAN TAKE A BATH 20 MINUTES LATER (AROUND 18:55). DO YOU WANT TO STOP?" is displayed below the message "MAIL TRANSMISSION COMPLETED". The user is asked whether household appliance control is to be started by the description in the display section R271.

A button B273 "YES" and a button B274 "NO" are disposed in the display section R271. The user is allowed to press the button B273 "YES" when the user agrees to perform household appliance control described in the display section R271, and is allowed to press the button B274 "NO" when the user does not agree to perform household appliance control. According to this configuration, it is possible to perform household appliance control after the user confirms whether household appliance control is to be performed. This makes it possible to prevent household appliance control against the user's will. Alternatively, the user may be allowed to select in advance whether the confirmation screen G272 is to be displayed on the portable terminal 200. When the user selects in advance not to display the confirmation screen G272, household appliance control according to the life pattern file F500 is automatically started without displaying the confirmation screen G272 when household appliance control is started.

1.6 Advantageous Effects of First Embodiment

In the first embodiment, the user's life pattern is analyzed; the time at which a household appliance is turned on before or after the user returns home, and a COMPLETE required time period of the household appliance are calculated; and household appliance control according to the user's life pattern is started. When the aforementioned operations are performed, a user's habitual behavior of sending a mail to the family when the user returns home is used as a trigger for starting household appliance control. This makes it possible to efficiently turn on an intended household appliance according to the user's behavior after the user returns home by a user's habitual behavior to be performed when the user returns home, without a cumbersome operation.

As described above, in the first embodiment, it is possible to start household appliance control according to the user's life pattern, using a user's habitual behavior to be performed when the user returns home. This allows for the user to act efficiently without the need of household appliance control by the user.

Further, in the first embodiment, the portable terminal 200 includes the life pattern file F500. Therefore, it is possible for the portable terminal 200 to remote control the household appliances only by transmitting an ON timer notification to the server 100 on the basis of the contents of the life pattern file F500. Thus, in the first embodiment, with use of the portable terminal 200, it is possible to remote control the household appliances according to the user's life pattern, using a user's habitual behavior to be performed when the user returns home.

Second Embodiment

In this section, a household appliance control system 10a in the second embodiment is described referring to the drawings. In the first embodiment, the addressee of a mail and a time zone when the mail is transmitted are used as the predetermined condition that satisfies a mail, based on which household appliance control is started. In the second embodiment, a keyword in the text of a mail and a time zone when the mail is transmitted are used as the predetermined condition that satisfies a mail, based on which household appliance control is started. The second embodiment is described by the mail screen G271 illustrated in FIG. 27A as an example. It is assumed that a predetermined keyword as the predetermined condition is "RETURN", and a predetermined time zone as the predetermined condition is "18:00-20:00". The mail illustrated on the mail screen G271 includes a keyword "RETURN" in the text, and the transmission time of the mail is "18:10". Therefore, the mail satisfies the predetermined condition, and household appliance control is started on the basis of transmission of the mail.

2.1 Overall Configuration of Household Appliance Control System 10a

Figure 28:
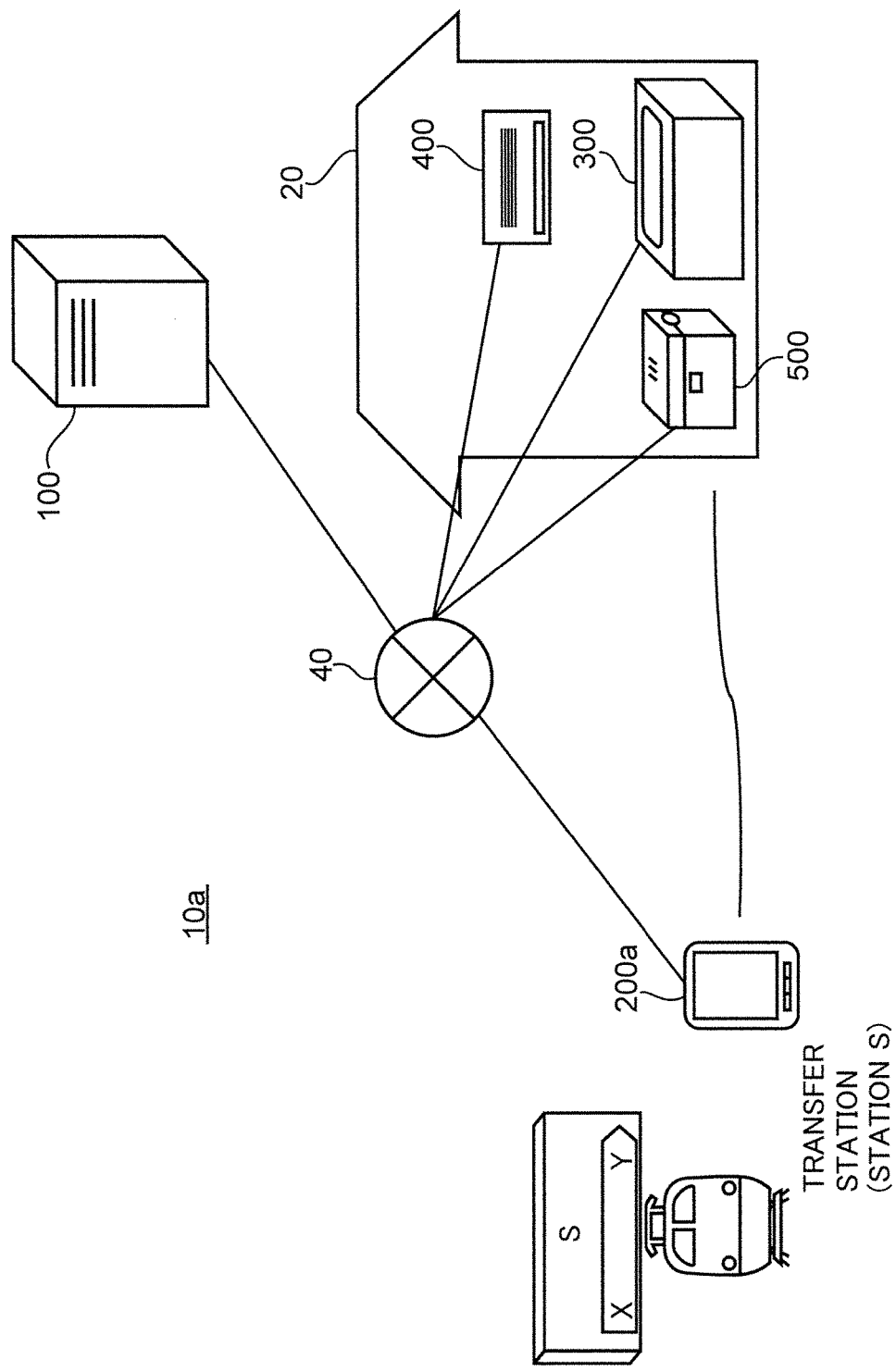
FIG. 28 is a diagram illustrating an overall configuration of a household appliance control system in a second embodiment.

FIG. 28 is a diagram illustrating an overall configuration of a household appliance control system 10a in the second embodiment. The household appliance control system 10a is provided with a server 100 and household appliances 300 to 500, as well as the first embodiment, and is further provided with a portable terminal 200a, which is different from the portable terminal 200 in the first embodiment. In this embodiment, the same elements as those in the first embodiment are indicated with the same reference signs, and description thereof is omitted.

2.2 Configuration of Portable Terminal 200a

Figure 29:
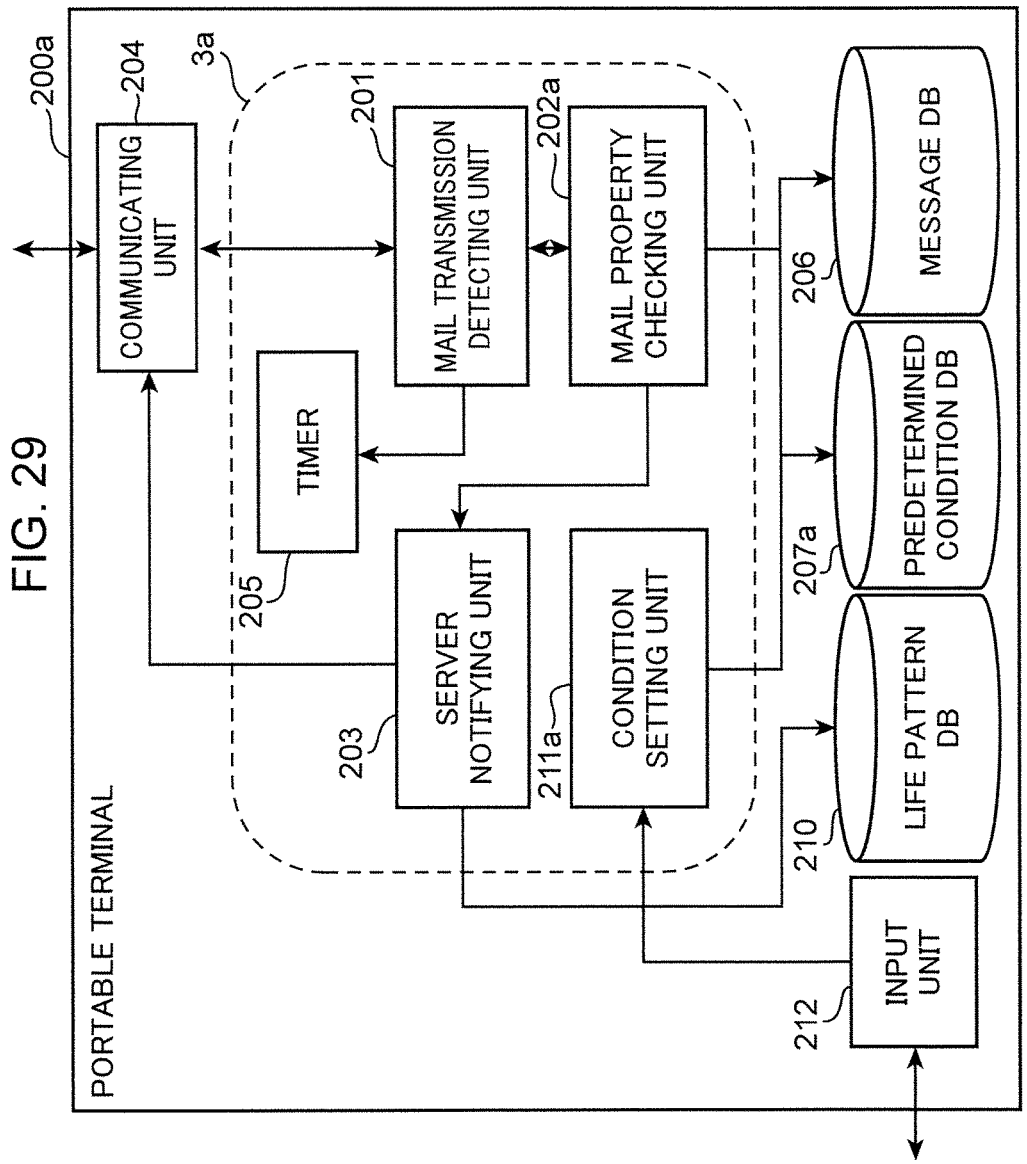
FIG. 29 is a block diagram illustrating a configuration of a portable terminal in the household appliance control system in the second embodiment.

FIG. 29 is a block diagram illustrating a configuration of the portable terminal 200a in the household appliance control system 10a. The second embodiment is different from the first embodiment in that the portable terminal 200a is provided with a mail property checking unit 202a, a condition setting unit 211a, and a predetermined condition database 207a. Alternatively, a mail transmission detecting unit 201, a server communicating unit 203, a timer 205, the mail property checking unit 202a, and the condition setting unit 211a may be implemented by providing a controller 3a in the portable terminal 200a with the functions of these elements. In the embodiment, the portable terminal 200a corresponds to an example of the portable information terminal.

2.2.1 Mail Property Checking Unit 202a

The mail property checking unit 202a checks the property of a mail in response to input of a mail transmission notification from the mail transmission detecting unit 201. When checking the mail property, the mail property checking unit 202a checks whether the latest mail in a message database 206 satisfies the contents of a predetermined condition file F801 (see FIG. 30) in the predetermined condition database 207a. When a predetermined keyword is included in the text of the mail, and when the transmission time of the mail is within a predetermined time zone, the predetermined condition is satisfied. When the predetermined condition is satisfied, the mail property checking unit 202a outputs a mail transmission notification to the server notifying unit 203.

2.2.2 Predetermined Condition Database 207a

Figure 30:
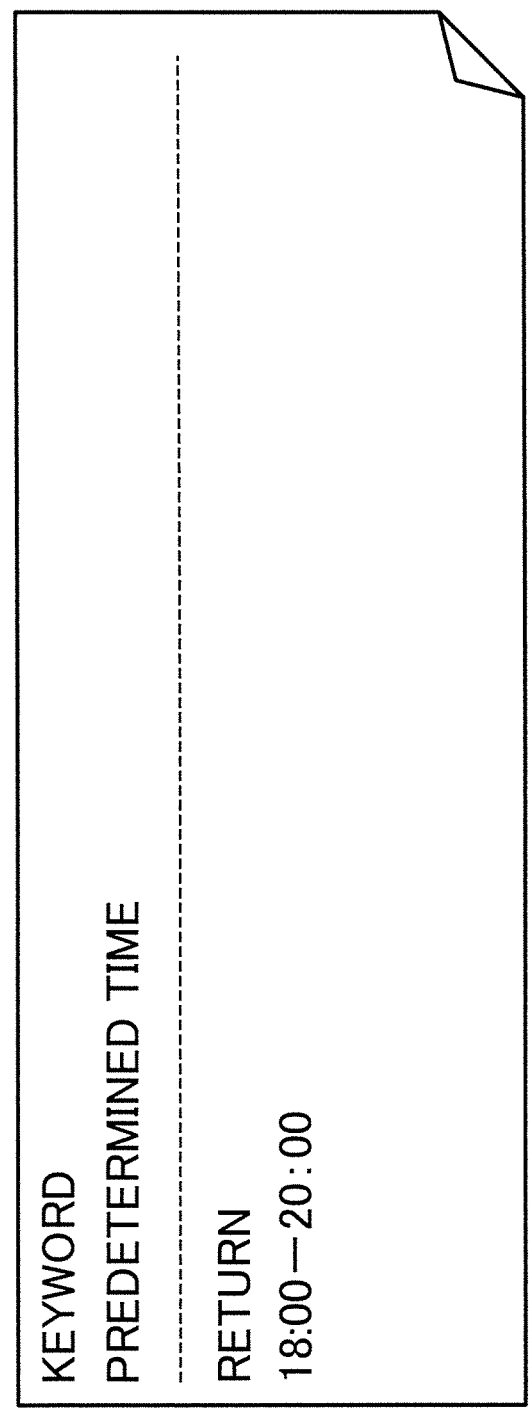
FIG. 30 is a diagram illustrating an example of a predetermined condition file.

The predetermined condition database 207a stores a predetermined condition file F801, in which a predetermined keyword that is set in advance by the user, and a predetermined time zone are stored. FIG. 30 is a diagram illustrating an example of the predetermined condition file F801. In FIG. 30, the predetermined keyword is "RETURN", and the predetermined time zone is "18:00-20:00".

2.2.3 Condition Setting Unit 211a

Figure 31A:
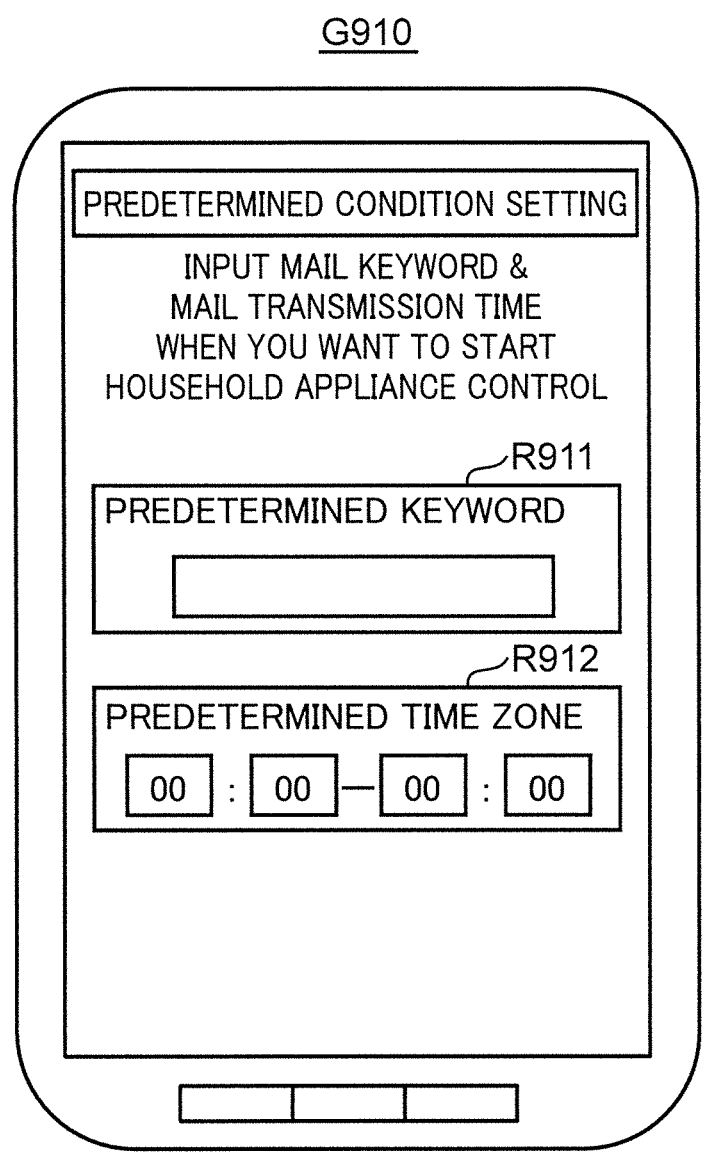
FIG. 31A is a diagram illustrating an example of a predetermined condition setting screen for use when the user inputs a predetermined condition.

The condition setting unit 211a generates a predetermined condition file F801, in which information input by the user through an input unit 212 is recorded, as the predetermined condition for use in transmitting a mail transmission notification from the portable terminal 200a to a server 100, and stores the generated predetermined condition file F801 in the predetermined condition database 207a. FIG. 31A is a diagram illustrating an example of a predetermined condition setting screen G910 for use in inputting the predetermined condition by the user. The predetermined condition setting screen G910 is provided with a keyword input section R911 for use in inputting a predetermined keyword, and a time zone input section R912 for use in inputting a predetermined time zone. The user is allowed to input a predetermined keyword in the keyword input section R911, and is allowed to input a predetermined time zone in the time zone input section R912. The user directly inputs a predetermined keyword through the input unit 212.

Figure 31B:
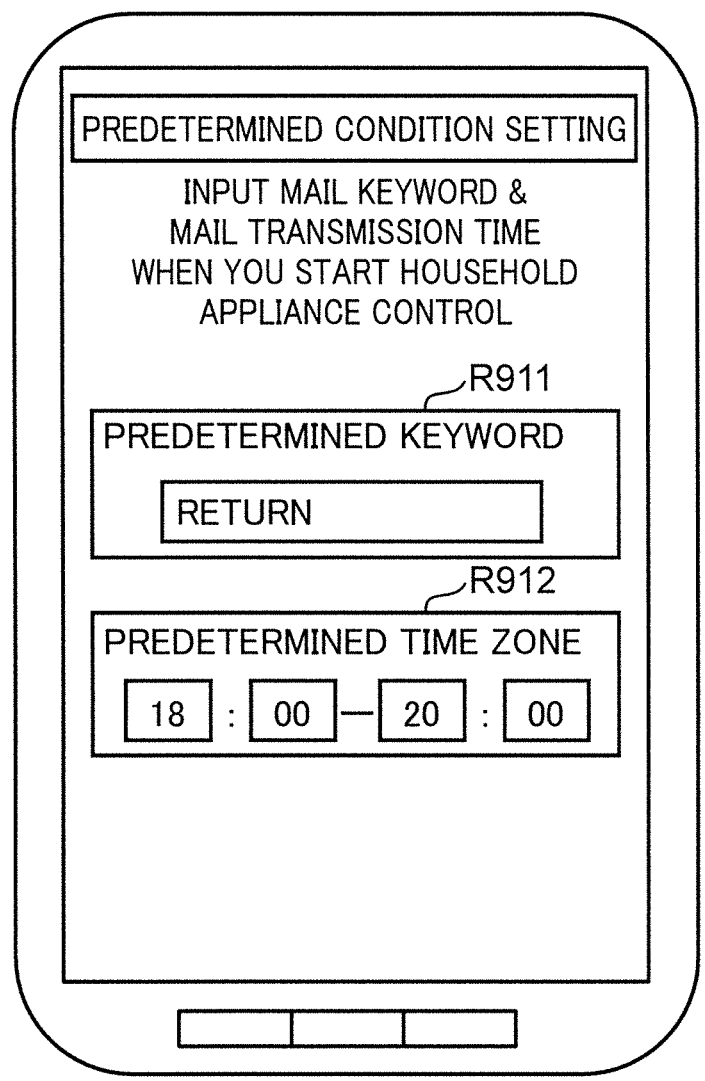
FIG. 31B is a diagram illustrating an example of a predetermined condition setting screen after input.

FIG. 31B is a diagram illustrating an example of a predetermined condition setting screen G910 after input. In the example illustrated in FIG. 31B, "RETURN" is input as a predetermined keyword. Therefore, "RETURN" is displayed in the keyword input section R911. A time zone 18:00-20:00 is input as a predetermined time zone. Therefore, "18:00-20:00" is displayed in the time zone input section R912.

2.3 Operations of Household Appliance Control System 10a

As well as the first embodiment, the operations of the household appliance control system 10a include three operations, specifically, condition setting, generation of a life pattern file, and household appliance control on the basis of a generated life pattern file. Generation of a life pattern file in the second embodiment is the same as in the first embodiment. Therefore, description about generation of a life pattern file is omitted herein. In the following, condition setting, and household appliance control on the basis of a generated life pattern file are described referring to the drawings.

2.3.1 Condition Setting

Figure 32:
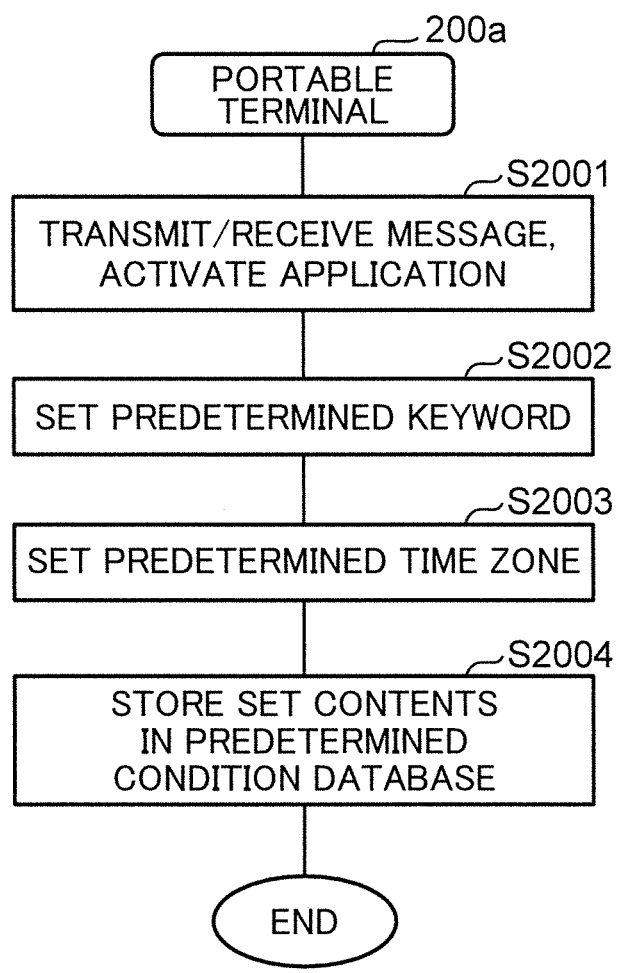
FIG. 32 is a flowchart illustrating a condition setting process operation to be performed in the household appliance control system in the second embodiment.

FIG. 32 is a flowchart illustrating a condition setting operation to be performed in the household appliance control system 10a.

The portable terminal 200a activates a message transmitting/receiving application 215 (Step S2001). Subsequently, the condition setting unit 211a of the portable terminal 200a sets a predetermined keyword in response to a user's input through the input unit 212 (Step S2002). Subsequently, the condition setting unit 211a of the portable terminal 200a sets a predetermined time zone in response to a user's input through the input unit 212 (Step S2003). Lastly, the condition setting unit 211a of the portable terminal 200a stores a predetermined condition file F801 recorded with the set contents in the predetermined condition database 207a (Step S2004).

2.3.2 Household Appliance Control on the Basis of Generated Life Pattern File

Figure 33:
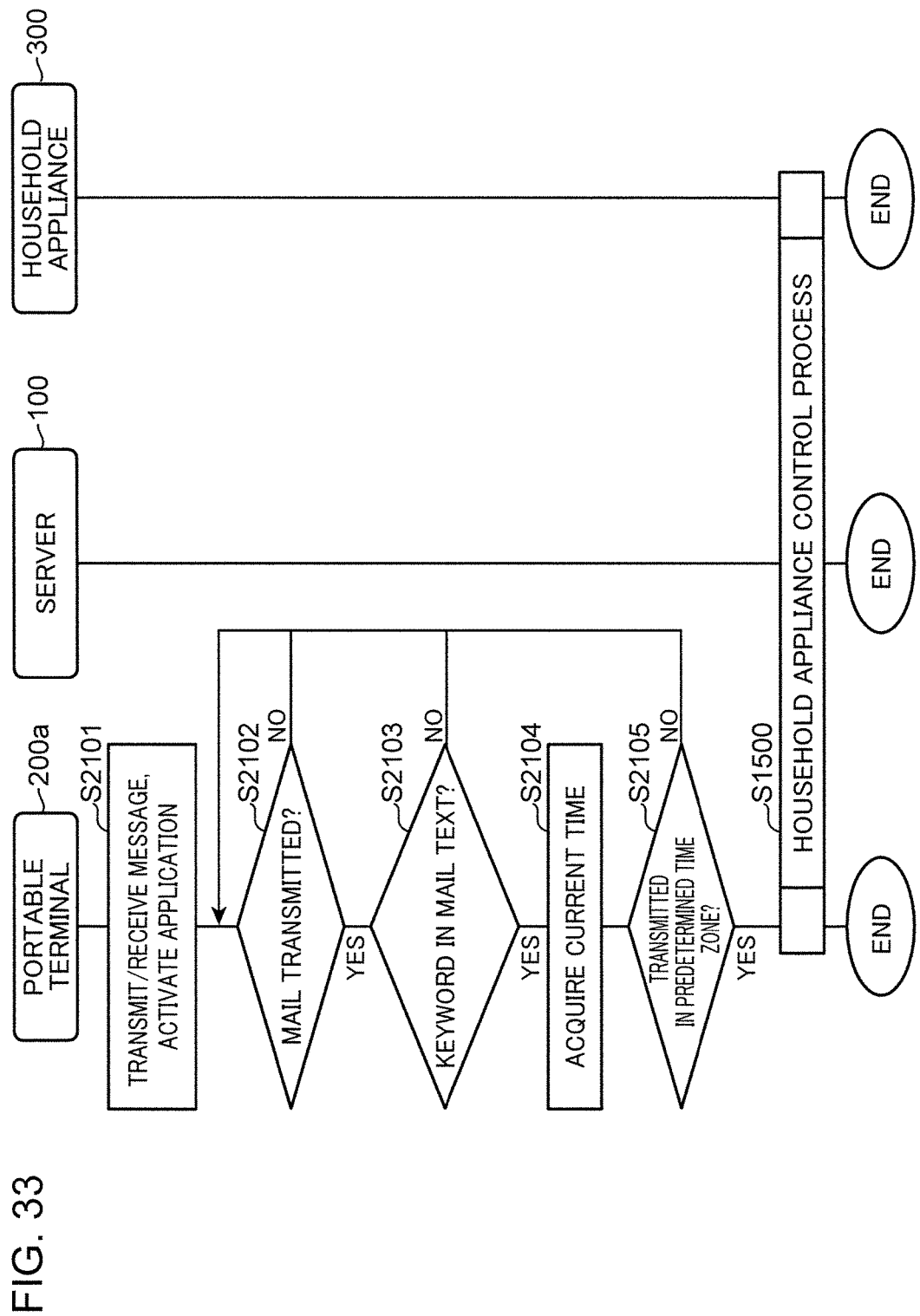
FIG. 33 is a sequence diagram illustrating a household appliance control operation on the basis of a generated life pattern file.

FIG. 33 is a sequence diagram illustrating a household appliance control operation on the basis of a generated life pattern file F500 in the household appliance control system 10a.

The portable terminal 200a activates the message transmitting/receiving application 215 (Step S2101). Subsequently, the mail transmission detecting unit 201 of the portable terminal 200a checks whether a mail was transmitted (Step S2102). When it is impossible to confirm that a mail was transmitted (NO in Step S2102), the mail transmission detecting unit 201 checks whether a mail was transmitted in Step S2102. When it is confirmed that a mail was transmitted (YES in Step S2102), the mail property checking unit 202a of the portable terminal 200a checks whether the text of the mail includes a predetermined keyword (Step S2103).

When the text of the mail does not include a predetermined keyword (NO in Step S2103), the portable terminal 200a checks whether a mail was transmitted in Step S2102. When the text of the mail includes a predetermined keyword (YES in Step S2103), the mail property checking unit 202a acquires the current time to be measured by the timer 205 as the transmission time of the mail (Step S2104). Subsequently, the mail property checking unit 202a checks whether the mail transmission time is within the predetermined time zone recorded in the predetermined condition file F801 (Step S2105). When the transmission time of the mail is not within the predetermined time zone (NO in Step S2105), the portable terminal 200a checks whether a mail was transmitted in Step S2102. When the transmission time of the mail is within the predetermined time zone (YES in Step S2105), the portable terminal 200a, the server 100, and the household appliance 300 perform a household appliance control process (Step S1500). The household appliance control process is the same as in the first embodiment.

2.4 Advantageous Effects of Second Embodiment

In the first embodiment, the addressee of a mail and a time zone when the mail is transmitted are used as the predetermined condition, based on which household appliance control is started. In the second embodiment, a keyword in the text of a mail and a time zone when the mail is transmitted are used as the predetermined condition that satisfies a mail, based on which household appliance control is started.

According to this configuration, when the user always sends a mail including a fixed message when the user returns home, it is possible to start household appliance control on the basis of transmission of a mail, as far as the text of the mail includes a predetermined keyword.

Further, as well as the first embodiment, in the second embodiment, the portable terminal 200a includes the life pattern file F500. Therefore, it is possible for the portable terminal 200a to remote control the household appliances only by transmitting an ON timer notification to the server 100 on the basis of the contents of the life pattern file F500.

As described above, in the second embodiment, when the user habitually sends a mail including a fixed message to the family when the user returns home, it is possible to start household appliance control on the basis of transmission of the mail as far as the text of the mail includes a predetermined keyword. Further, as well as the first embodiment, with use of the portable terminal 200a, it is possible to remote control the household appliances according to the user's life pattern, using a user's habitual behavior when the user returns home.

3. Third Embodiment

In this section, a household appliance control system 10b in the third embodiment is described referring to the drawings. In the first embodiment, a predetermined addressee and a predetermined time zone are used as the predetermined condition that satisfies a mail, based on which household appliance control is started. Further, in the second embodiment, a predetermined keyword and a predetermined time zone are used as the predetermined condition that satisfies a mail, based on which household appliance control is started. In the third embodiment, a portable terminal 200b is not provided with the predetermined condition database 207, 207a. The portable terminal 200b searches a keyword that indicates a certain place from the text of a mail, calculates a required home returning time period from the position of the place, and starts household appliance control.

3.1 Overall Configuration of Household Appliance Control System 10b

Figure 34:
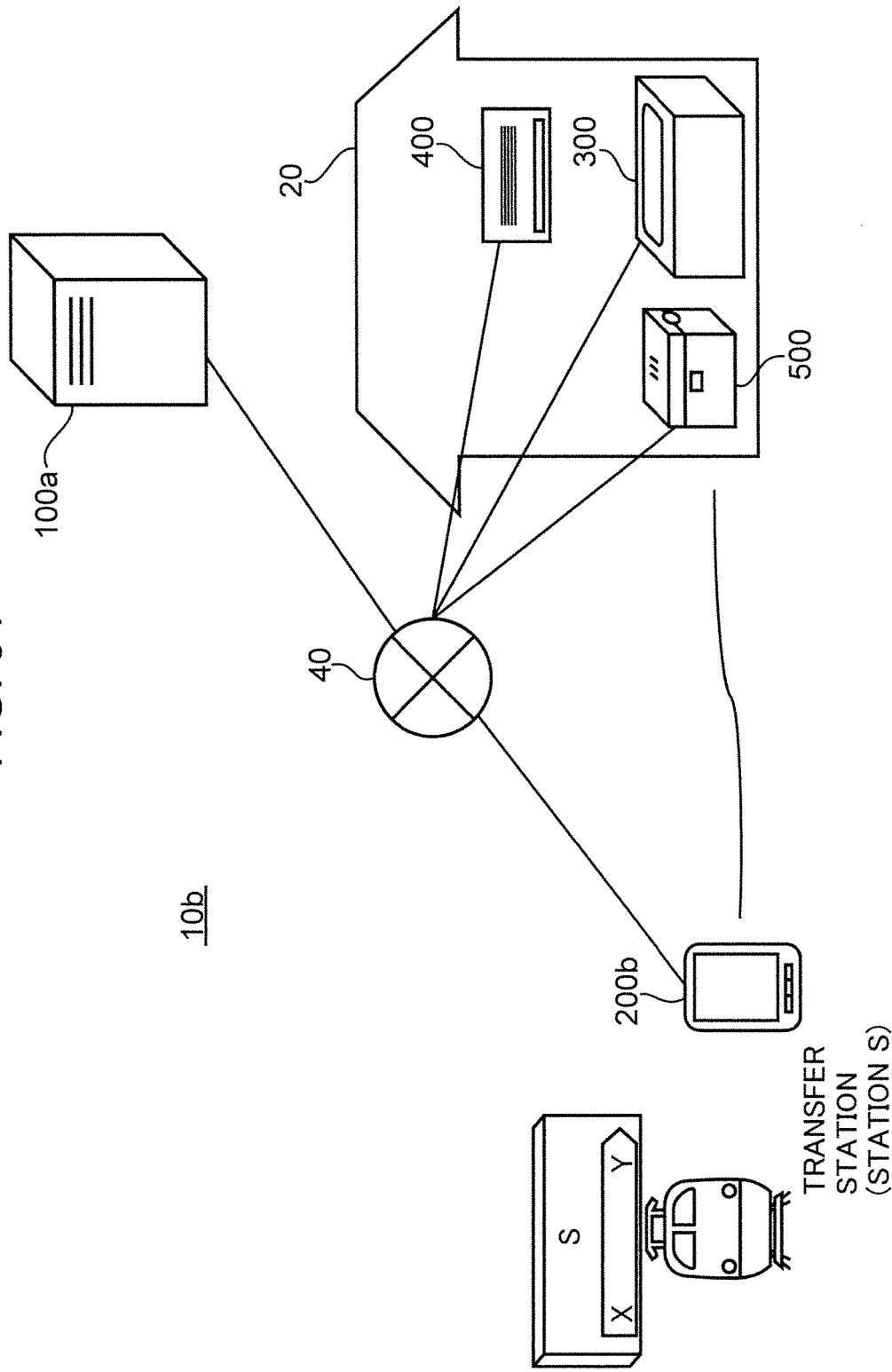
FIG. 34 is a diagram illustrating an overall configuration of a household appliance control system in a third embodiment.

FIG. 34 is a diagram illustrating an overall configuration of the household appliance control system 10b in the third embodiment. As well as the first embodiment, the household appliance control system 10b is provided with a household appliance 300, a household appliance 400, and a household appliance 500; and is further provided with a server 100a and the portable terminal 200b which are different from those in the first and second embodiments. The same constituent elements in the embodiment as those in the first and second embodiments are indicated with the same reference signs, and description thereof is omitted herein.

3.2 Configuration of Server 100a

Figure 35:
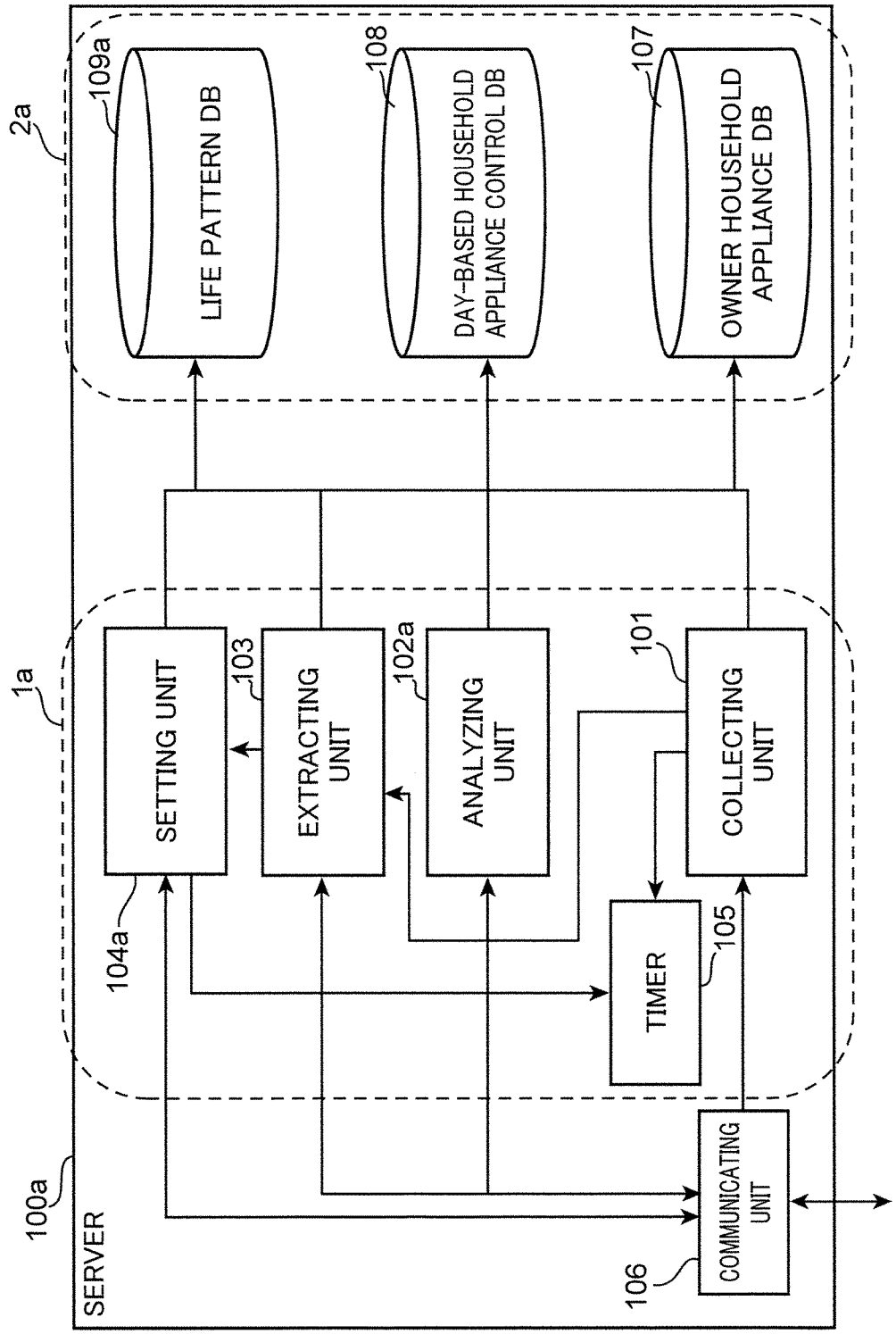
FIG. 35 is a block diagram illustrating a configuration of a server in the household appliance control system in the third embodiment.

FIG. 35 is a block diagram illustrating a configuration of the server 100a in the household appliance control system 10b. The server 100a is different from the server 100 in the first embodiment in that the server 100a is provided with an analyzing unit 102a, a setting unit 104a, and a life pattern database 109a. Alternatively, a collecting unit 101, an extracting unit 103, a timer 105, the analyzing unit 102a, and the setting unit 104a may be implemented by providing a controller 1a in the server 100a with the functions of these elements. Further alternatively, a memory 2a in the server 100a may be provided with an owner household appliance database 107, a day-based household appliance control database 108, and the life pattern database 109a.

3.2.1 Analyzing Unit 102a

As well as the first embodiment, the analyzing unit 102a analyzes the user's life pattern on the basis of a day-based household appliance control file F400 in the day-based household appliance control database 108, and generates a life pattern file. In the embodiment, the analyzing unit 102a generates a life pattern file F501 illustrated in FIG. 36. The analyzing unit 102a stores the generated life pattern file F501 in the life pattern database 109a. The life pattern file F501 will be described in details in the section 3.2.3.

3.2.2 Setting Unit 104a

As well as the first embodiment, the setting unit 104a turns on a household appliance on the basis of a life pattern file F501 input from the extracting unit 103, and on the basis of an ON timer notification to be transmitted from the portable terminal 200b. Further, as well as the first embodiment, the setting unit 104a receives an interrupt notification and a resume notification from the portable terminal 200, and turns off and on the household appliance.

3.2.3 Life Pattern Database 109a

The life pattern database 109a stores a life pattern file F501 to be generated by the analyzing unit 102. FIG. 36 is a diagram illustrating an example of the life patter file F501 in the third embodiment. The life pattern file F501 in the embodiment is different from the life pattern file F500 in the first embodiment in that a control start time period is omitted, only a COMPLETE required time period of each of the household appliances is recorded, and a time period required from a transmission time of a mail until the time at which a household appliance is brought to COMPLETE is used as a COMPLETE required time period. In the example of the life pattern file F501 in FIG. 36, a COMPLETE required time period is recorded for each of a water heater and a rice cooker. In this example, "20 MIN" and "45 MIN" are respectively recorded as COMPLETE required time periods of the water heater and of the rice cooker. A control start time period is omitted in the life pattern file F501, because in the embodiment, a control start time period of a household appliance is calculated from a required home returning time period.

3.3 Configuration of Portable Terminal 200b

Figure 37:
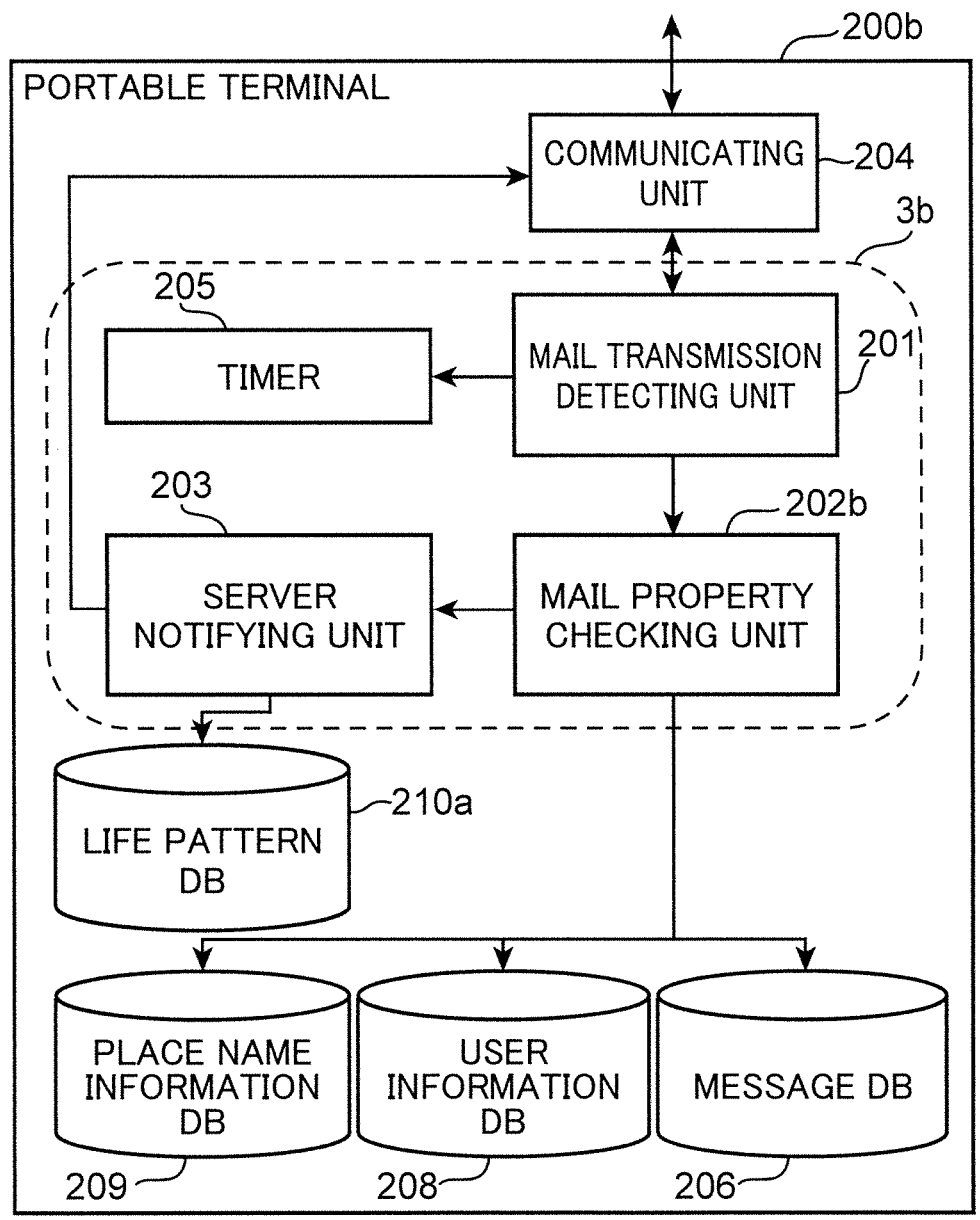
FIG. 37 is a block diagram illustrating a configuration of a portable terminal in the household appliance control system in the third embodiment.

FIG. 37 is a block diagram illustrating a configuration of the portable terminal 200b in the household appliance control system 10b in the third embodiment. The portable terminal 200b in the embodiment is different from the portable terminals 200 and 200a in the first and second embodiments in that the predetermined condition database 207, 207a is omitted, and that a mail property checking unit 202b is provided. Further, the portable terminal 200b is provided with a user information database 208 and a place name information database 209. Alternatively, a mail transmission detecting unit 201, a timer 205, the mail property checking unit 202b, and a server notifying unit 203 may be implemented by providing a controller 3b in the portable terminal 200b with the functions of these elements. In the embodiment, the portable terminal 200b corresponds to an example of a portable information terminal.

3.3.1 Mail Property Checking Unit 202b

The mail property checking unit 202b checks the property of a mail in response to a mail transmission notification from the mail transmission detecting unit 201. In checking the mail property, the mail property checking unit 202b checks whether the text of a latest mail in a message database 206 includes a word indicating a place. When it is confirmed that the text includes a word indicating a place, the mail property checking unit 202b calculates a required home returning time period from the place to the user's house, whose position information is recorded in a user information file stored in the user information database 208. Then, the mail property checking unit 202b calculates a control start time period of a household appliance, using the calculated required home returning time period, and the COMPLETE required time period recorded in the life pattern file F501.

3.3.2 User Information Database 208

The user information database 208 stores information indicating the physical address of the user, as a user information file.

3.3.3 Place Name Information Database 209

The place name information database 209 stores information indicating the names of places on a map.

3.4 Operations of Household Appliance Control System 10*b*

The operations of the household appliance control system 10*b* includes two operations, specifically, generation of a life pattern file, and household appliance control on the basis of a generated life pattern file. Generation of a life pattern file is the same as in the first embodiment. Therefore, description about generation of a life pattern file is omitted herein. In the following, operations of household appliance control on the basis of a generated life pattern file F501 is described referring to the drawings.

FIG. 38 is a sequence diagram illustrating a household appliance control operation on the basis of a generated life pattern file F501.

The portable terminal 200*b* activates a message transmitting/receiving application 215 (Step S3001). Subsequently, the mail transmission detecting unit 201 of the portable terminal 200*b* checks whether a mail was transmitted (Step S3002). When it is impossible to confirm that a mail was transmitted (NO in Step S3002), the mail transmission detecting unit 201 checks whether a mail was transmitted in Step S3002. When it is confirmed that a mail was transmitted (YES in Step S3002), the mail property checking unit 202*b* of the portable terminal 200*b* checks whether the text of the mail includes a word indicating a place, referring to a place name information file stored in the place name information database 209 (Step S3003).

The place name information file is recorded with words indicating certain places on a map, particularly, places which are likely to be described in the text of a mail by the user. Therefore, as far as any of the words recorded in the place name information file is included in the text of a mail, the mail property checking unit 202*b* determines that the text of the mail includes a word indicating a place.

When it is confirmed that the text of the mail does not include a word indicating a place (NO in Step S3003), the portable terminal 200*b* checks whether a mail was transmitted in Step S3002. When it is confirmed that the text of the mail includes a word indicating a place (YES in Step S3003), the mail property checking unit 202*b* determines the current position from the word (Step S3004). Subsequently, the mail property checking unit 202*b* calculates a required home returning time period from the current position to the house.

The place name information stored in the place name information database 209 is such that place names and positions are recorded in association with each other. The positions may be latitudes and longitudes, or may be physical addresses. Thus, the mail property checking unit 202*b* may specify a position associated with a word as the current position.

Subsequently, the mail property checking unit 202*b* may transmit, to an external server which provides services for calculating a required home returning time period, the current position, and the position of the user's house (the physical address, or the latitude and the longitude) so that the external server calculates the required home returning time period. The external server may be implemented with a route searching system for use in searching a best route of public transportation, or a road searching system for use in searching a best road on a map. The external server specifies the nearest station from the received position of the user's house, using the road searching system. For instance, if the current position is a railway station, the external server inputs the names of the station indicating the current position and of the nearest station in the route searching system, and calculates a required time period from the station indicating the current position to the nearest station. Then, the external server inputs the positions of the nearest station and of the house in the road searching system, and calculates a required time period for the user to walk home from the nearest station, for instance. Then, the external server may sum up the required time periods, calculate a required home returning time period, and transmit the calculated time period to the portable terminal 200.

Subsequently, the mail property checking unit 202*b* calculates a control start time period of each of the household appliances, using the required home returning time period calculated in Step S3005, and the COMPLETE required time period of each of the household appliances recorded in the life pattern file F501 (Step S3006). For instance, when the required home returning time period is calculated to be ten minutes, in the example illustrated in FIG. 36, the control start time period of the water heater is calculated to be 20 min−10 min=10 min, and the control start time period of the rice cooker is calculated to be 45 min−10 min=35 min. Then, the mail property checking unit 202*b* may record the calculated control start time period of each of the household appliances in the life pattern file F501 stored in the life pattern database 210*a*.

Subsequently, the portable terminal 200*b*, the server 100*a*, and the household appliance 300 perform a household appliance control process (Step S1500). The household appliance control process in the embodiment is the same as in the first embodiment.

3.5 Advantageous Effects of Third Embodiment

In the first and second embodiments, the predetermined condition recorded in the predetermined condition file F800, F801 is used as the predetermined condition, based on which household appliance control is started. In the third embodiment, a required home returning time period is calculated from a word indicating a place to be included in the text of a mail, and a control start time period is calculated on the basis of the calculated required home returning time period. According to this configuration, even if the user sends a mail from a place where the user usually does not send a mail when the user returns home, it is possible to calculate a control start time period of a household appliance by calculating a required home returning time period from a COMPLETE required time period so as to control the household appliances. Further, as well as the first embodiment, in the third embodiment, the portable terminal 200*b* also includes a life pattern file F501. According to this configuration, it is possible for the portable terminal 200*b* to remote control the household appliances merely by transmitting an ON timer notification to the server 100 on the basis of the contents of the life pattern file F501.

As described above, in the third embodiment, even if the user sends a mail from a place where the user usually does not send a mail when the user returns home, it is possible to control the household appliances according to the user's behavior after the user returns home. Further, as well as the first embodiment, with use of the portable terminal 200*b*, it is possible to remote control the household appliances according to the user's life pattern, using a user's habitual behavior to be performed when the user returns home.

The techniques described in the foregoing aspects can be implemented in the following types of cloud services. However, the types of cloud services in which the techniques described in the foregoing aspects can be implemented are not limited to the above.

(Service Type 1: A Cloud Service Provided by a Datacenter of the Applicant's Company)

FIG. 40 is a diagram illustrating an overview of services to be provided by a household appliance control system of service type 1 (a cloud service provided by a datacenter of the applicant's company). In this type, a service provider 1020 acquires information from a group 1000, and provides services to the user. In this type, the service provider 1020 has the functions of a datacenter operating company. Specifically, the service provider 1020 owns a cloud server 1011 which manages big data. Therefore, actually, a datacenter operating company does not exist.

In this type, the service provider 1020 operates and manages a datacenter (cloud server) 2003. Further, the service provider 1020 manages an operating system OS 2002 and an application 2001. The service provider 1020 provides services with use of the OS 2002 and the application 2001 to be managed by the service provider 1020 (see the arrow 2004).

(Service Type 2: A Cloud Service Utilizing IaaS)

FIG. 41 is a diagram illustrating an overview of services to be provided by a household appliance control system of service type 2 (a cloud service utilizing IaaS). IaaS stands for Infrastructure as a Service. IaaS is a cloud service providing model configured to provide a foundation, based on which a computer system is configured and operated, as services via the Internet.

In this type, a datacenter operating company 1010 operates and manages a datacenter 2003 (cloud server). Further, a service provider 1020 manages an OS 2002 and an application 2001. The service provider 1020 provides services with use of the OS 2002 and the application 2001 to be managed by the service provider 1020 (see the arrow 2004).

(Service Type 3: A Cloud Service Utilizing PaaS)

Figure 42:
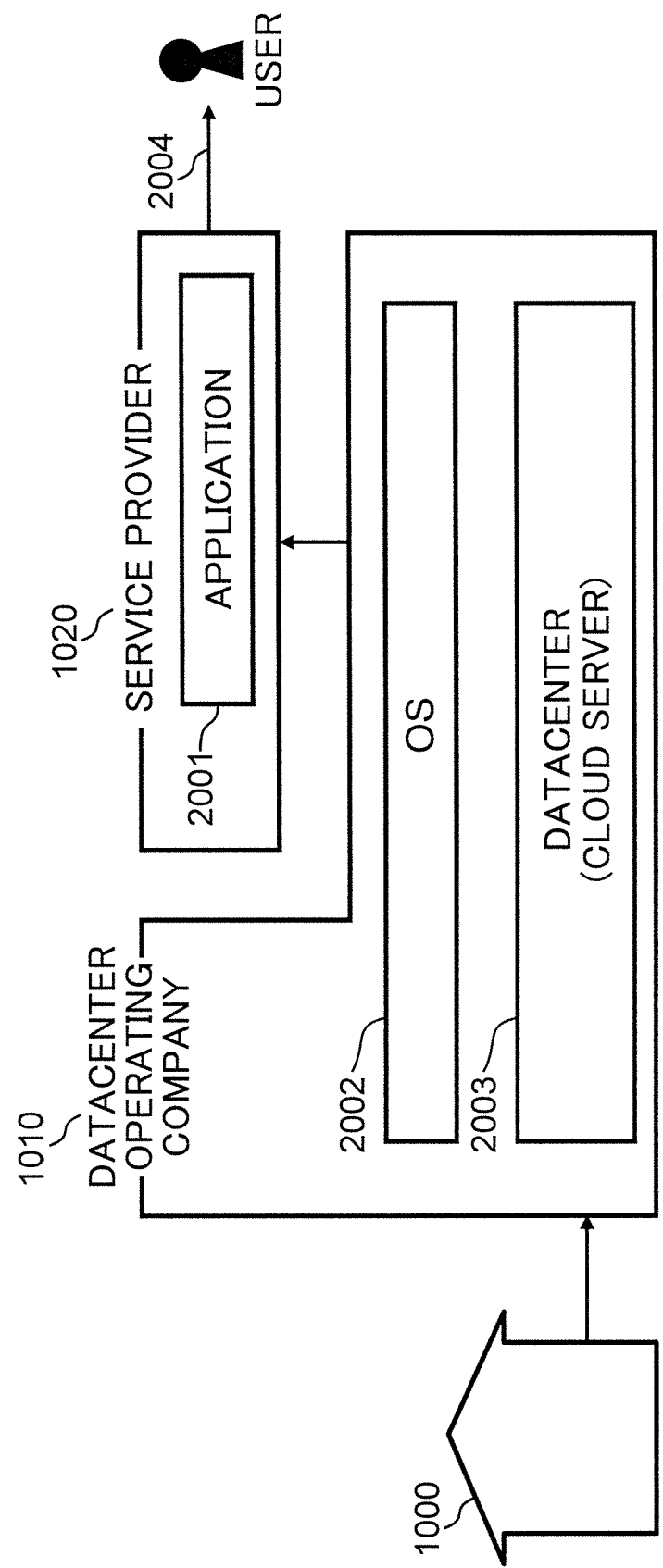
FIG. 42 is a diagram illustrating an overview of services to be provided by a household appliance control system of service type 3 (a cloud service utilizing PaaS)

FIG. 42 is a diagram illustrating an overview of services to be provided by a household appliance control system of service type 3 (a cloud service utilizing PaaS). PaaS stands for Platform as a Service. PaaS is a cloud service providing model configured to provide a platform, based on which a software is configured and operated, as services via the Internet.

In this type, a datacenter operating company 1010 manages an OS 2002, and operates and manages a datacenter 2003 (cloud server). Further, a service provider 1020 manages an application 2001. The service provider 1020 provides services with use of the OS 2002 to be managed by the datacenter operating company 1010 and the application 2001 to be managed by the service provider 1020 (see the arrow 2004).

(Service Type 4: A Cloud Service Utilizing SaaS)

FIG. 43 is a diagram illustrating an overview of services to be provided by a household appliance control system of service type 4 (a cloud service utilizing SaaS). SaaS stands for Software as a Service. A cloud service utilizing SaaS is e.g. a cloud service providing model having functions, with which the user such as a company or a person who does not own a datacenter (a cloud server) is allowed to use an application provided by a platform provider who owns the datacenter (a cloud server) via a network such as the Internet.

In this type, a datacenter operating company 1010 manages an application 2001, manages an OS 2002, and operates and manages a datacenter (a cloud server) 2003. Further, a service provider 1020 provides services, with use of the OS 2002 and the application 2001 to be managed by the datacenter operating company 1010 (see the arrow 2004).

As described above, in any of the cloud service types, the service provider 1020 provides services. Further, for instance, a service provider or a datacenter operating company may develop an OS, an application, or a database for big data by themselves, or may outsource the development to a third party.

4. Modifications

The invention has been described on the basis of each of the embodiments. It is needless to say that the invention is not limited by the embodiments. The following modifications are included in the invention.

(1) In the first to third embodiments, the confirmation screen G272 is displayed on the display of the portable terminal when the control start time period of a household appliance has elapsed. Alternatively, the confirmation screen G272 may be displayed on the display of the portable terminal before the portable terminal 200 transmits an ON timer notification to the server. When a user's consent to household appliance control is input through the confirmation screen G272, the portable terminal may transmit an ON timer notification to the server.

In this case, an ON timer notification is transmitted after the user's consent is obtained so as to start measuring a time by the timer. This makes it possible to prevent power consumption when the user does not intend to start household appliance control.

(2) A predetermined keyword to be set in the second embodiment may be plural keywords. For instance, the user may set predetermined keywords such as Ueno" and "return". In this case, "Ueno" is the name of the station where the user always sends a mail when the user returns home. In this case, as fax as the text of a mail includes all of the keywords or at least one of the keywords, the portable terminal may judge that the predetermined condition is satisfied. According to this configuration, when the user always sends a mail from one station when the user returns home, the portable terminal may accurately judge whether the received mail is a mail, based on which household appliance control is started.

(3) In the second embodiment, a keyword to be used in the text of a mail is set as the predetermined condition. Alternatively, the text of a mail itself may be set as the predetermined condition. According to this configuration, when the user always sends a mail including a fixed message when the user returns home, the portable terminal may easily judge whether the received mail satisfies the predetermined condition, without judging the keyword.

(4) In the first to third embodiments, when a gateway is installed in the house 20, a part of the control to be performed by the server may be performed by the gateway. For instance, analysis of the life pattern may be performed by the server, and control of household appliances and management of the operation states of the household appliances may be performed by the gateway. This is advantageous in reducing the use amount of a memory in the server, and in reducing the processing load of the server.

(5) In the first and second embodiments, when the predetermined condition is confirmed, the user uses a predetermined time zone that is set in advance. Alternatively, the server may analyze the user's life pattern, and may update a predetermined set time zone. In this case, the server analyzes a time at which a mail transmission notification is received, and updates the predetermined time zone by setting a margin before and after the predetermined time zone that is set by the user, on the basis of the analysis result. According to this configuration, the user can start household appliance control even when the user sends a mail at a time earlier than the time zone set by the user in advance by several minutes.

(6) In the first to third embodiments, the finishing condition of a day to be used in generating a day-based household appliance control file is set in advance by the system. Alternatively, the user may set in advance the finishing condition of a day according to the bedtime or the like. According to this configuration, it is possible to divide the user's life pattern at the bedtime, even if the user goes to bed later than 0:00.

(7) In the modification (6), when the finishing condition of a day is set, if the user's wakeup time and the user's bedtime are punctual, it is possible to generate a day-based household appliance control file by dividing the user's life pattern at the wakeup time and at the bedtime, and by collecting data on the household appliances during a time period from the wakeup time to the bedtime. For instance, the user may set a time period from the wakeup time "6:00" to the bedtime "0:30" as a day. This makes it possible to collect only the operation states of the household appliances necessary for analysis of the life pattern.

(8) In the first and second embodiments, a predetermined time zone set in advance by the user is used. When the analysis result of the life pattern indicates an approximate time of a mail transmission time on daily basis, a margin may be set for the predetermined time zone. Even when the mail transmission time is out of the predetermined time zone, the portable terminal may determine that the mail transmission time is included in the predetermined time zone, as far as the deviation from the predetermined time zone is not larger than a threshold value. This makes it possible to start household appliance control on the basis of a mail, which is transmitted at a time deviated from the predetermined time zone to some extent.

(9) In the first to third embodiments, the portable terminal controls the household appliances via the server. When a gateway is installed in the house 20, it is possible to control the household appliances via the gateway, in place of the server. This makes it possible to control the household appliances in the house without connecting a portable terminal to a server.

(10) FIG. 25A illustrates an ON timer notification 2500 for the water heater. ON timer notifications 2500 for the other household appliances are described as follows. FIG. 25B is a diagram illustrating an example of a data configuration of ON timer notifications 2500 for a variety of types of household appliances. In FIG. 25B, the first row illustrates an ON timer notification 2500 for the air conditioner, the second row illustrates an ON timer notification 2500 for the rice cooker, the third row illustrates an ON timer notification 2500 for the microwave oven, and the fourth row illustrates an ON timer notification 2500 for the steam cooker.

In any of the ON timer notifications 2500, "PORTABLE TERMINAL" indicating the name of the household appliance as a transmission source, "ON TIMER NOTIFICATION" indicating that the notification is an ON timer notification, and "CONTROL START TIME PERIOD" are described. Further, in the ON timer notification 2500 for the air conditioner, "SET TEMPERATURE" indicating the set temperature of the air conditioner, and "AIR CONDITIONER" indicating the name of the household appliance as a transmission destination are described. Further, in the ON timer notifications 2500 for the rice cooker, the microwave oven, and the steam cooker, "RICE COOKER", "MICROWAVE OVEN", and "STEAM COOKER" are described as the names of the household appliances as transmission destinations, respectively. Regarding the rice cooker, the microwave oven, and the steam cooker, the user may dispose food materials to be cooked in the respective vessels in advance prior to start of the control.

(11) In the first to third embodiments, each of the life pattern files F500 and F501 has only one type. Alternatively, two or more types of life pattern files may be generated according to the user's life pattern. For instance, it is possible to generate a life pattern file representing the life pattern on weekdays, and a life pattern file representing the life pattern on weekends. In this case, the analyzing unit 102 in the server 100 may generate a life pattern file on weekends by analyzing a day-based household appliance control file F400 on weekends, and may generate a life pattern file on weekdays by analyzing a day-based household appliance control file F400 on weekdays. Then, in the case where the date when a mail that satisfies the predetermined condition is transmitted corresponds to a weekend, the condition setting unit 211 of the portable terminal 200 may control the household appliances with use of the life pattern file on weekends, and in the case where the date when a mail that satisfies the predetermined condition is transmitted corresponds to a weekday, the condition setting unit 211 of the portable terminal 200 may control the household appliances with use of the life pattern file on weekdays.

Further, the analyzing unit 102 may classify a day-based household appliance control file F400 by an early time zone when the user returns home early, and by a late time zone when the user returns home late depending on a mail transmission time; and may generate a life pattern file when the user returns home early by analyzing the day-based household appliance control file F400 belonging to the early time zone when the user returns home early, and generate a life pattern file when the user returns home late by analyzing the day-based household appliance control file F400 belonging to the late time zone when the user returns home late. Then, when the transmission time of a mail that satisfies the predetermined condition belongs to the early time zone when the user returns home early, the condition setting unit 211 of the portable terminal 200 may control the household appliances with use of the life pattern file to be used when the user returns home early, and when the transmission time of a mail that satisfies the predetermined condition belongs to the late time zone when the user returns home late, the condition setting unit 211 of the portable terminal 200 may control the household appliances with use of the life pattern file to be used when the user returns home late. The early time zone when the user returns home early is, for instance, a time zone earlier than the average time when the user returns home or earlier than the median of times when the user returns home. The late time zone when the user returns home late is, for instance, a time zone later than the average time when the user returns home or later than the median of times when the user returns home. Further, the number of time zones after classification is not limited to two i.e. an early time zone when the user returns home early and a late time zone when the user returns home late. For instance, the time zone may be classified into three or more time zones i.e.

an early time zone when the user returns home early, an ordinary time zone when the user returns home as usual, and a late time zone when the user returns home late.

(12) A part or all of the constituent elements constituting each of the devices may be configured by one system LSI (Large Scale Integration). The system LSI is an ultra-multi-functional LSI fabricated by integrating a plurality of components on one chip. Specifically, a system LSI is a computer system constituted by a microprocessor, an ROM, and an RAM. The RAM stores a computer program thereon. The functions of the system LSI are accomplished by causing the microprocessor to operate in accordance with the computer program.

Further, each of the constituent elements constituting each of the devices may be individually configured into a one-chip device, or a part or all of the constituent elements may be configured into a one-chip device.

Further, in this example, the integrated circuit is a system LSI. The integrated circuit may also be called as an IC (Integrated Circuit), an LSI, a super LSI, or an ultra LSI depending on the degree of integration of the circuit. Further, the circuit integration method is not limited to an LSI method. The integrated circuit may be implemented by a dedicated circuit or a general-purpose processor. Further, an FPGA (Field Programmable Gate Array) capable of programming after fabricating an LSI, or a reconfigurable processor capable of reconfiguring connection or setting of circuit cells within an LSI after fabricating the LSI may also be used.

Further, if an integration circuit technology substantially equivalent to the LSI technology is developed in the future by the progress of a semiconductor technology or by another technology derived from the semiconductor technology, it is needless to say that the functional blocks are integrated by using the technology. Further, a bio-technology may be applied.

(13) A part or all of the constituent elements constituting each of the aforementioned devices may be constituted by an IC card detachably mounted on each of the devices, or by a single module. The IC card or the module is a computer system provided with a microprocessor, an ROM, and an RAM. The IC card or the module may include the ultra-multi-functional LSI. The functions of the IC card or of the module are accomplished by causing a microprocessor to operate in accordance with a computer program. The IC card or the module may have a tampering resistance.

(14) The invention may be directed to the aforementioned methods. Further, the invention may be directed to a computer program that implements one of these methods on a computer, or may be directed to digital signals constituted by the computer program.

Further, the invention may be directed to a computer-readable recording medium recorded with the computer program or the digital signals such as a flexible disk, a hard disk, a CD-ROM, an MO, a DVD, a DVD-ROM, a DVD-RAM, a BD (Blu-ray (registered trademark) Disc), or a semiconductor memory. Further, the invention may be directed to digital signals recorded on one of these recording media.

Further, the invention may be directed to a configuration, in which the computer program or the digital signals are transmitted via a telecommunication line, a wireless communication line, a wired communication line, a network as represented by the Internet, or data broadcasting.

Further, the invention may be directed to a computer system provided with a microprocessor and a memory, wherein the memory stores the computer program, and the microprocessor is operated in accordance with the computer program.

Further, the invention may be implemented by another independent computer system by recording the computer program or the digital signals on the recording medium for transferring, or by transferring the computer program or the digital signals via the network or the like.

(15) The invention may be combination of any one of the embodiments and any one of the modifications.

INDUSTRIAL APPLICABILITY

The present disclosure is advantageously used in a device system for remote controlling household appliances in a house via a network.

The invention claimed is:

1. A method for controlling a portable information terminal connectable to a network, to which a target device in a house, or a server for controlling the target device, is connected, the portable information terminal being provided with a mail communication function, the controlling method causing a computer of the portable information terminal to:
   extract, from a mail to be transmitted by the mail communication function, address information of the mail to be transmitted when it is detected that the mail communication function is activated;
   extract a transmission time of the mail to be transmitted from the portable information terminal;
   judge whether the address information matches predetermined address information, with use of a first database in which the predetermined address information is registered, the predetermined address information indicating a mail address of a first user to be notified of a returning home of a second user, who is a sender of the transmitted mail, to the house by the second user;
   judge whether the transmission time belongs to a predetermined time zone, with use of a second database in which the predetermined time zone is registered, the predetermined time zone being set, by the second user, as a time zone during which the second user transmits the mail, to notify the first user of the returning home of the second user to the house; and
   determine an activation time at which the target device is to be activated on the basis of the transmission time, and transmit, to the network, a control command for activating the target device at the activation time when it is judged that the address information matches the predetermined address information and that the transmission time belongs to the predetermined time zone.

2. The control method according to claim 1, wherein
   the portable information terminal includes a memory which manages management information indicating that the target device is to be activated after elapse of a predetermined time period from the transmission time of the mail including the predetermined address information, and
   the activation time at which the target device is to be activated on the basis of the transmission time is determined on the basis of the management information.

3. The control method according to claim 2, wherein
   the management information is received from the server via the network.

4. The control method according to claim 3, further comprising:

collecting control start time periods, each of which indicates a time period from the transmission time of the mail until the time at which the target device is to be activated, and recording a control start time period having a high frequency among the collected control start time periods in the management information.

5. The control method according to claim 1, wherein the control command is transmitted to the target device via the network through the server.

6. The control method according to claim 1, wherein the control command is transmitted to the target device via the network.

7. The control method according to claim 1, wherein the target device in the house is a water heater for supplying water to a bathtub in the house, and the control command is an instruction to supply water from the water heater to the bathtub.

8. The control method according to claim 7, wherein the control command includes information indicating a set temperature of the water to be supplied.

9. The control method according to claim 7, wherein the control command includes information indicating a time at which supplying water from the water heater to the bathtub is started.

10. The control method according to claim 1, wherein the target device in the house is an air conditioner which adjusts a temperature of at least one room in the house, and the control command is an instruction to adjust the temperature of the one room to a predetermined temperature by the air conditioner.

11. The control method according to claim 10, wherein the control command includes information indicating a time at which adjusting the temperature of the one room is started by the air conditioner.

12. The control method according to claim 1, wherein the target device in the house is a cooking heater which performs heat-controlled cooking, and the control command is an instruction to start the heat-controlled cooking by the cooking heater.

13. The control method according to claim 12, wherein the control command includes information indicating a time at which the heat-controlled cooking by the cooking heater is started.

14. The control method according to claim 12, wherein the cooking heater is a rice cooker.

15. The control method according to claim 12, wherein the cooking heater is provided with a microwave generating means.

16. The control method according to claim 12, wherein the cooking heater is a steam cooker provided with a steam generating means.

17. A method for controlling a portable information terminal connectable to a network, to which a target device in a house, or a server for controlling the target device, is connected, the portable information terminal being provided with a mail communication function, the controlling method causing a computer of the portable information terminal to:

judge whether a mail to be transmitted by the mail communication function includes a predetermined word, with use of a first database in which the predetermined word is registered, when it is detected that the mail communication function is activated, the predetermined word being a keyword indicating a returning home of a user, who is a sender of the mail, to the house;

extract a transmission time of the mail to be transmitted from the portable information terminal;

judge whether the transmission time belongs to a predetermined time zone, with use of a second database in which the predetermined time zone is registered, the predetermined time zone being set, by the user, as a time zone during which the user transmits the mail, to notify the returning home of the user to the house; and determine an activation time at which the target device is to be activated on the basis of the transmission time, and transmit, to the network, a control command for activating the target device at the activation time when it is judged that the mail includes the predetermined word and that the transmission time belongs to the predetermined time zone.

18. A method for controlling a portable information terminal connectable to a network, to which a target device in a house, or a server for controlling the target device, is connected, the portable information terminal being provided with a mail communication function, the control method causing a computer of the portable information terminal to:

judge whether a mail to be transmitted by the mail communication function includes a predetermined place name which is to be described, by a user of the portable information terminal, in a text of the mail, with use of a first database in which the predetermined place name is registered, when it is detected that the mail communication function is activated;

extract a transmission time of the mail to be transmitted from the portable information terminal;

determine a position of the portable information terminal at the transmission time of the mail on the basis of the predetermined place name indicating the place, with use of a second database which manages the predetermined place name and positon information in association with each other;

calculate a time period required for the user to return home on the basis of the transmission time and on the basis of the position information;

calculate an activation time of the target device for use in setting the target device to a predetermined state at a predetermined time after elapse of the required time period, on the basis of the transmission time and on the basis of the required time period; and transmit, to the network, a control command for activating the target device at the calculated activation time.

19. A non-transitory computer-readable recoding medium which stores a program which causes a computer of a portable information terminal that is provided with a mail communication function and is connectable to a network, to which a target device in a house, or a server for controlling the target device, is connected, to execute the following:

extracting, from a mail to be transmitted by the mail communication function, address information of the mail to be transmitted when it is detected that the mail communication function is activated;

extracting a transmission time of the mail to be transmitted from the portable information terminal;

judging whether the address information matches predetermined address information, with use of a first database in which the predetermined address information is registered, the predetermined address information indicating a mail address of a first user to be notified of a returning home of a second user, who is a sender of the transmitted mail, to the house by the second user;

judging whether the transmission time belongs to a predetermined time zone, with use of a second database in which the predetermined time zone is registered, the predetermined time zone being set, by the second user, as a time zone during which the second user transmits the mail, to notify the first user of the returning home of the second user to the house; and determining an activation time at which the target device is to be activated on the basis of the transmission time, and transmitting, to the network, a control command for activating the target device at the activation time when it is judged that the address information matches the predetermined address information and that the transmission time belongs to the predetermined time zone.

* * * * *